US012112698B2

(12) United States Patent
Uchino et al.

(10) Patent No.: US 12,112,698 B2
(45) **Date of Patent: *Oct. 8, 2024**

(54) PIXEL CIRCUIT, DISPLAY DEVICE, AND METHOD OF DRIVING PIXEL CIRCUIT

(71) Applicant: Sony Group Corporation, Tokyo (JP)

(72) Inventors: Katsuhide Uchino, Kanagawa (JP); Junichi Yamashita, Tokyo (JP); Tetsuro Yamamoto, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,023

(22) Filed: Oct. 31, 2022

(65) Prior Publication Data

US 2023/0048033 A1 Feb. 16, 2023

Related U.S. Application Data

(63) Continuation of application No. 17/136,845, filed on Dec. 29, 2020, now abandoned, which is a (Continued)

(30) Foreign Application Priority Data

May 23, 2003 (JP) ................................ 2003-146758

(51) Int. Cl.
*G09G 3/3233* (2016.01)
*G09G 3/30* (2006.01)
(Continued)

(52) U.S. Cl.
CPC ............ *G09G 3/3233* (2013.01); *G09G 3/30* (2013.01); *G09G 3/3258* (2013.01);
(Continued)

(58) Field of Classification Search
CPC .... G09G 3/3233; G09G 3/325; G09G 3/3283; G09G 3/30; G09G 3/32; G09G 3/3208;
(Continued)

(56) References Cited

U.S. PATENT DOCUMENTS 6,072,450 A 6/2000 Yamada
6,229,506 B1 5/2001 Dawson et al.
(Continued)

FOREIGN PATENT DOCUMENTS

CN 1417767 A 5/2003
EP 1 094 438 A1 4/2001
(Continued)

OTHER PUBLICATIONS

European Search Report issued Mar. 8, 2016 in European Patent Application No. 15192807.4.
(Continued)

*Primary Examiner* — Stephen G Sherman
(74) *Attorney, Agent, or Firm* — Oblon, McClelland, Maier & Neustadt, L.L.P.

(57) ABSTRACT

A pixel circuit, display device, and method of driving a pixel circuit enabling source-follower output with no deterioration of luminance even with a change of the current-voltage characteristic of the light emitting element along with elapse, enabling a source-follower circuit of n-channel transistors, and able to use an n-channel transistor as an EL drive transistor while using current anode-cathode electrodes. The circuit includes a source of a TFT used as a drive transistor that is connected to an anode of a light emitting element, and a drain of the TFT is connected to a power source potential. A capacitor is connected between a gate and source of the TFT, and a source potential of the TFT is connected to a fixed potential through a TFT used as a switching transistor.

10 Claims, 38 Drawing Sheets

Related U.S. Application Data continuation of application No. 16/654,184, filed on Oct. 16, 2019, now abandoned, which is a continuation of application No. 15/971,661, filed on May 4, 2018, now Pat. No. 10,475,383, which is a continuation of application No. 15/799,091, filed on Oct. 31, 2017, now Pat. No. 9,984,625, which is a continuation of application No. 15/581,518, filed on Apr. 28, 2017, now Pat. No. 9,947,270, which is a continuation of application No. 14/279,936, filed on May 16, 2014, now Pat. No. 9,666,130, which is a continuation of application No. 13/960,229, filed on Aug. 6, 2013, now Pat. No. 8,760,373, which is a continuation of application No. 13/416,243, filed on Mar. 9, 2012, now Pat. No. 8,723,761, which is a continuation of application No. 10/557,800, filed as application No. PCT/JP2004/007304 on May 21, 2004, now Pat. No. 8,149,185.

(51) Int. Cl.

| | |
|---|---|
| ***G09G 3/3258*** | (2016.01) |
| ***G09G 3/34*** | (2006.01) |
| ***G09G 3/36*** | (2006.01) |
| ***H05B 45/60*** | (2022.01) |

(52) U.S. Cl.

CPC ............. *G09G 3/3426* (2013.01); *G09G 3/36* (2013.01); *G09G 3/3648* (2013.01); *H05B 45/60* (2020.01); *G09G 2300/043* (2013.01); *G09G 2300/0809* (2013.01); *G09G 2300/0819* (2013.01); *G09G 2300/0842* (2013.01); *G09G 2300/0861* (2013.01); *G09G 2310/0256* (2013.01); *G09G 2320/0233* (2013.01); *G09G 2320/043* (2013.01); *G09G 2320/045* (2013.01)

(58) Field of Classification Search

CPC ............... G09G 3/3225; G09G 3/3241; G09G 2300/0842; G09G 2300/0861; G09G 2300/0426; G09G 2300/0809; G09G 2300/0439; G09G 2300/0876; G09G 2320/0233; H01L 27/3244; H01L 27/3262; G11C 27/024

See application file for complete search history.

(56) References Cited

U.S. PATENT DOCUMENTS

| | | | |
|---|---|---|---|
| 6,348,906 | B1 | 2/2002 | Dawson et al. |
| 6,512,217 | B1 | 1/2003 | Kameshima |
| 6,661,180 | B2 | 12/2003 | Koyama |
| 6,661,397 | B2 | 12/2003 | Mikami et al. |
| 6,680,580 | B1 | 1/2004 | Sung |
| 7,236,149 | B2 | 6/2007 | Yamashita et al. |
| 7,714,813 | B2 | 5/2010 | Uchino et al. |
| 8,754,833 | B2 | 6/2014 | Uchino et al. |
| 8,760,373 | B2 | 6/2014 | Uchino |
| 9,666,130 | B2 | 5/2017 | Uchino |
| 9,984,625 | B2 | 5/2018 | Uchino |
| 10,475,383 | B2 | 11/2019 | Uchino et al. |
| 2002/0118150 | A1 | 8/2002 | Kwon |
| 2002/0195968 | A1 | 12/2002 | Sanford et al. |
| 2003/0016190 | A1 | 1/2003 | Kondo |
| 2003/0030603 | A1 | 2/2003 | Shimoda |
| 2003/0062524 | A1 | 4/2003 | Kimura |
| 2003/0063078 | A1 | 4/2003 | Hanari et al. |
| 2003/0090446 | A1 | 5/2003 | Tagawa et al. |
| 2003/0090481 | A1 | 5/2003 | Kimura |
| 2003/0098829 | A1 | 5/2003 | Chen et al. |
| 2003/0103022 | A1 | 6/2003 | Noguchi et al. |
| 2003/0142047 | A1 | 7/2003 | Inoue et al. |
| 2003/0178946 | A1 | 9/2003 | Nakamura et al. |
| 2004/0070557 | A1 | 4/2004 | Asano et al. |
| 2005/0007357 | A1 | 1/2005 | Yamashita et al. |

FOREIGN PATENT DOCUMENTS

| | | | |
|---|---|---|---|
| EP | 1 130 565 | A1 | 9/2001 |
| EP | 1 291 841 | A2 | 3/2003 |
| EP | 1 441 325 | A2 | 7/2004 |
| JP | 2002-297083 | | 10/2002 |
| JP | 2003-58106 | | 2/2003 |
| JP | 2003-108075 | | 4/2003 |
| JP | 2003-150105 | | 5/2003 |
| JP | 2003-173154 | | 6/2003 |
| JP | 2003-208127 | | 7/2003 |
| JP | 2003-255897 | | 9/2003 |
| JP | 2003-271095 | | 9/2003 |
| WO | 2002/075713 | | 9/2002 |
| WO | WO 02/075709 | A1 | 9/2002 |

OTHER PUBLICATIONS

S.M. Choi, et al., "A Self-compensated Voltage Programming Pixel Structure for Active-Matrix Organic Light Emitting Diodes", IDW, AMD/OELp-4, London UK, Jan. 1, 2003, XP007016141, pp. 535-538

European Office Action issued Jun. 8, 2016 in Patent Application No. 15 192 807.4.

Joon-Chul Goh et al., "P-72: A Novel Pixel Circuit for Active-Matrix Organic Light-Emitting Diodes", 2003 SID International Symposium—May 20, 2003, Baltimore, Maryland, vol. XXXIV, XP007008511, May 20, 2003, pp. 494-497.

Communication pursuant to Article 94(3) EPC issued May 17, 2017 in European Patent Application No. 15 192 807.4.

Extended European Search Report issued Jan. 16, 2019 in European Patent Application No. 18183422.7, 11 pages.

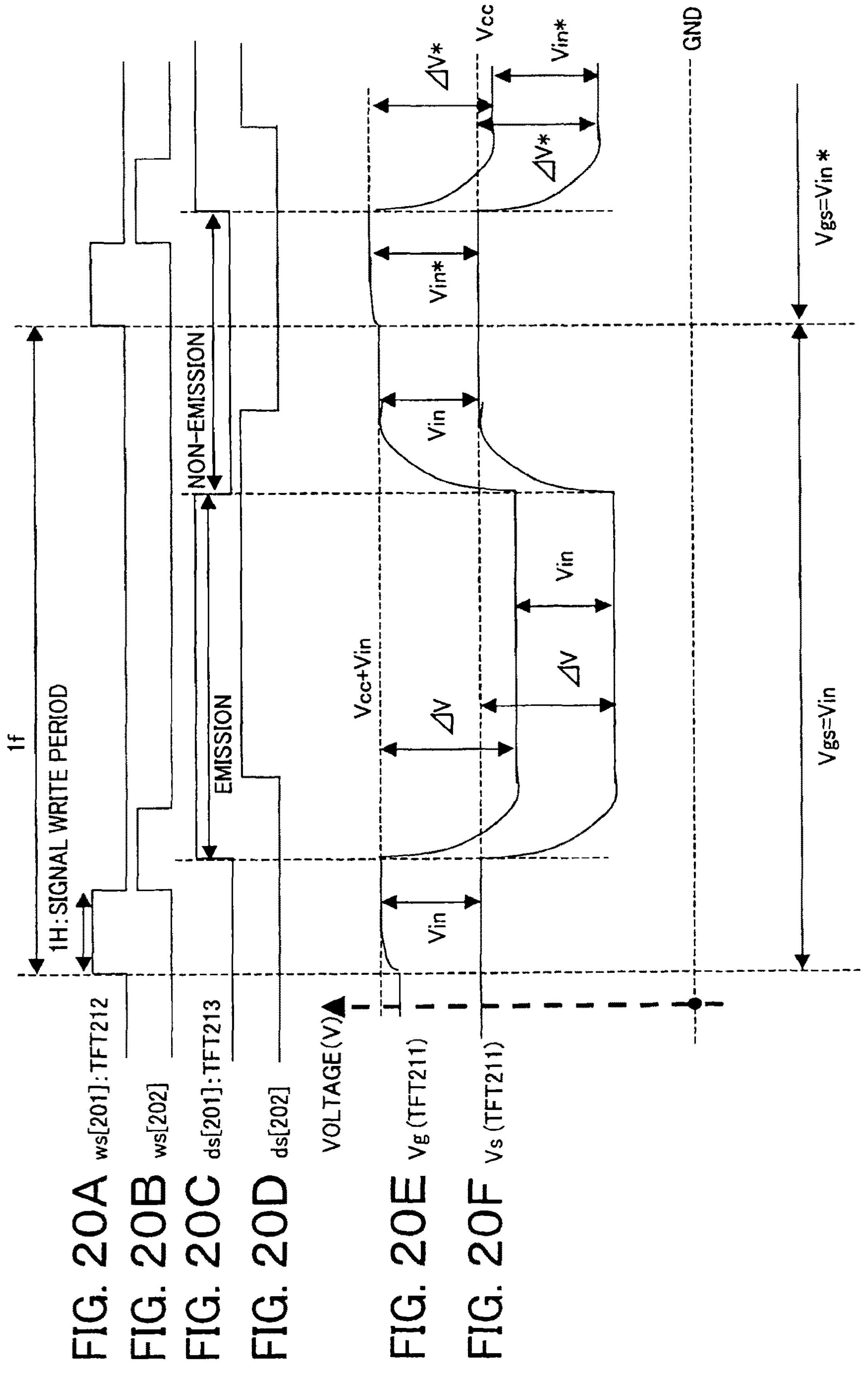
FIG. 20A ws[201]:TFT212
FIG. 20B ws[202]
FIG. 20C ds[201]:TFT213
FIG. 20D ds[202]
VOLTAGE(V)
FIG. 20E Vg (TFT211)
FIG. 20F Vs (TFT211)
1f
1H:SIGNAL WRITE PERIOD
EMISSION
NON-EMISSION
Vcc+Vin
Vcc
GND
Vin
ΔV
Vin*
ΔV*
Vgs=Vin
Vgs=Vin *

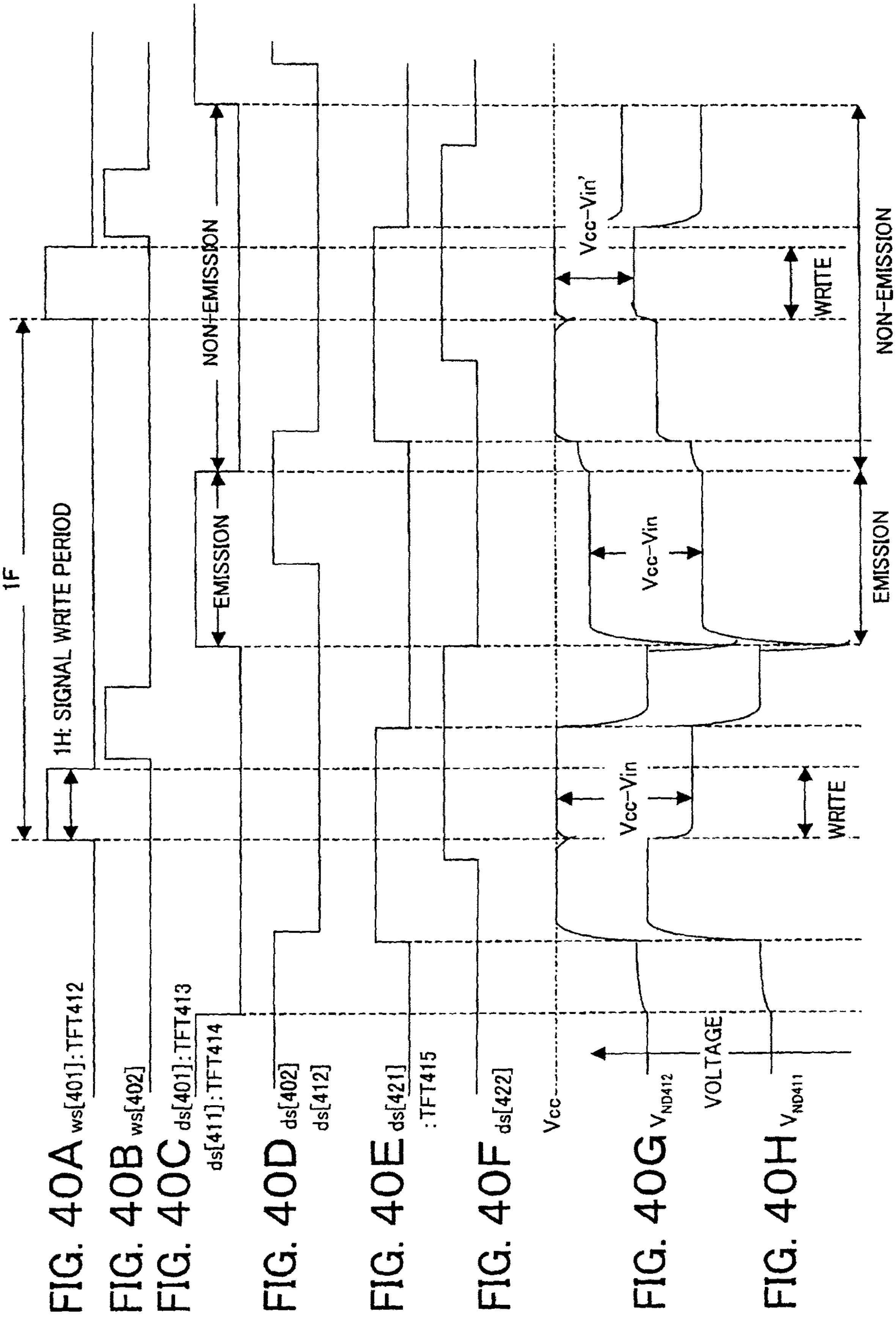
FIG. 40A ws[401]:TFT412
FIG. 40B ws[402]
FIG. 40C ds[401]:TFT413
ds[411]:TFT414
FIG. 40D ds[402]
ds[412]
FIG. 40E ds[421]
:TFT415
FIG. 40F ds[422]
Vcc
FIG. 40G $V_{ND412}$
VOLTAGE
FIG. 40H $V_{ND411}$
1F
1H: SIGNAL WRITE PERIOD
NON-EMISSION
EMISSION
Vcc-Vin
Vcc-Vin'
WRITE

PIXEL CIRCUIT, DISPLAY DEVICE, AND METHOD OF DRIVING PIXEL CIRCUIT

CROSS-REFERENCE TO RELATED APPLICATIONS

This application is a continuation of U.S. Ser. No. 17/136,845, filed Dec. 29, 2020, which is a continuation application of U.S. Ser. No. 16/654,184 filed Oct. 16, 2019, which a continuation application of U.S. Ser. No. 15/971,661 filed May 4, 2018, which a continuation application of U.S. Ser. No. 15/799,091 filed Oct. 31, 2017, which a continuation application of U.S. Ser. No. 15/581,518 filed Apr. 28, 2017, which is a continuation application of U.S. Ser. No. 14/279,936 filed May 16, 2014, which is a continuation application of U.S. Ser. No. 13/960,229 filed Aug. 6, 2013, which is a continuation application of U.S. Ser. No. 13/416,243 filed Mar. 9, 2012, which is a continuation application of U.S. Ser. No. 10/557,800 filed Nov. 16, 2006, the entire contents of each of which are incorporated herein by reference. U.S. Ser. No. 10/557,800 is a National Stage of PCT/JP04/07304 filed May 21, 2004, and claims priority to Japanese Application No. 2003-146758 filed May 23, 2003.

TECHNICAL FIELD

The present invention relates to a pixel circuit having an electro-optic element with a luminance controlled by a current value in an organic EL (electroluminescence) display etc., an image display device comprised of such pixel circuits arrayed in a matrix, in particular a so-called active matrix type image display device controlled in value of current flowing through the electro-optic elements by insulating gate type field effect transistors provided inside the pixel circuits, and a method of driving a pixel circuit.

BACKGROUND ART

In an image display device, for example, a liquid crystal display, a large number of pixels are arranged in a matrix and the light intensity is controlled for every pixel in accordance with the image information to be displayed so as to display an image.

This same is true for an organic EL display etc. An organic EL display is a so-called self-light emitting type display having a light emitting element in each pixel circuit and has the advantages that the viewability of the image is higher in comparison with a liquid crystal display, a backlight is unnecessary, the response speed is high, etc.

Further, it greatly differs from a liquid crystal display etc. in the point that the gradations of the color generation are obtained by controlling the luminance of each light emitting element by the value of the current flowing through the light emitting element, that is, each light emitting element is a current controlled type.

An organic EL display, in the same way as a liquid crystal display, may be driven by a simple matrix and an active matrix system. While the former has a simple structure, it has the problem that realization of a large sized and high definition display is difficult. For this reason, much effort is being devoted to development of the active matrix system of controlling the current flowing through the light emitting element inside each pixel circuit by an active element provided inside the pixel circuit, generally, a TFT (thin film transistor).

FIG. 1 is a block diagram of the configuration of a general organic EL display device.

This display device 1 has, as shown in FIG. 1, a pixel array portion 2 comprised of pixel circuits (PXLC) 2*a* arranged in an m×n matrix, a horizontal selector (HSEL) 3, a write scanner (WSCN) 4, data lines DTL1 to DTLn selected by the horizontal selector 3 and supplied with a data signal in accordance with the luminance information, and scanning lines WSL1 to WSLm selectively driven by the write scanner 4.

Note that the horizontal selector 3 and the write scanner 4 are sometimes formed around the pixels by MOSICs etc. when formed on polycrystalline silicon.

FIG. 2 is a circuit diagram of an example of the configuration of a pixel circuit 2*a* of FIG. 1 (refer to for example U.S. Pat. No. 5,684,365 and Patent Publication 2: Japanese Unexamined Patent Publication (Kokai) No. 8-234683).

The pixel circuit of FIG. 2 has the simplest circuit configuration among the large number of proposed circuits and is a so-called two-transistor drive type circuit.

The pixel circuit 2*a* of FIG. 2 has a p-channel thin film FET (hereinafter, referred to as TFT) 11 and TFT 12, a capacitor C11, and a light emitting element constituted by an organic EL element (OLED) 13. Further, in FIG. 2, DTL indicates a data line, and WSL indicates a scanning line.

An organic EL element has a rectification property in many cases, so sometimes is referred to as an OLED (organic light emitting diode). The symbol of a diode is used as the light emitting element in FIG. 2 and the other figures, but a rectification property is not always required for an OLED in the following explanation.

In the pixel circuit 2*a* of FIG. 2, a source of the TFT 11 is connected to a power source potential VCC, and a cathode of the light emitting element 13 is connected to a ground potential GND. The operation of the pixel circuit 2*a* of FIG. 2 is as follows.

<Step ST1>:

When the scanning line WSL is made a selected state (low level here) and a write potential Vdata is supplied to the data line DTL, the TFT 12 becomes conductive, the capacitor C11 is charged or discharged, and the gate potential of the TFT 11 becomes Vdata.

<Step ST2>:

When the scanning line WSL is made a non-selected state (high level here), the data line DTL and the TFT 11 are electrically separated, but the gate potential of the TFT 11 is held stably by the capacitor C11.

<Step ST3>:

The current flowing through the TFT 11 and the light emitting element 13 becomes a value in accordance with a gate-source voltage Vgs of the TFT 11, while the light emitting element 13 is continuously emitting light with a luminance in accordance with the current value.

As in the above step ST1, the operation of selecting the scanning line WSL and transmitting the luminance information given to the data line to the inside of a pixel will be referred to as "writing" below.

As explained above, in the pixel circuit 2*a* of FIG. 2, if once the Vdata is written, the light emitting element 13 continues to emit light with a constant luminance in the period up to the next rewrite operation.

As explained above, in the pixel circuit 2*a*, by changing a gate application voltage of the drive transistor constituted by the TFT 11, the value of the current flowing through the EL element 13 is controlled.

At this time, the source of the p-channel drive transistor is connected to the power source potential Vcc, so this TFT 11 is always operating in a saturated region. Accordingly, it becomes a constant current source having a value shown in the following equation 1.

$$Ids=1/2\cdot\mu(W/L)\mathrm{Cox}(Vgs-|Vth|)^2 \quad (1)$$

Here, μ indicates the mobility of a carrier, Cox indicates a gate capacitance per unit area, W indicates a gate width, L indicates a gate length, and Vth indicates the threshold value of the TFT 11.

In a simple matrix type image display device, each light emitting element emits light only at a selected instant, while in an active matrix, as explained above, each light emitting element continues emitting light even after the end of the write operation. Therefore, it becomes advantageous in especially a large sized and high definition display in the point that the peak luminance and peak current of each light emitting element can belowered in comparison with a simple matrix.

FIG. 3 is a view of the change along with elapse of the current-voltage (I-V) characteristic of an organic EL element. In FIG. 3, the curve shown by the solid line indicates the characteristic in the initial state, while the curve shown by the broken line indicates the characteristic after change with elapse.

In general, the I-V characteristic of an organic EL element ends up deteriorating along with elapse as shown in FIG. 3.

However, since the two-transistor drive system of FIG. 2 is a constant current drive system, a constant current is continuously supplied to the organic EL element as explained above. Even if the I-V characteristic of the organic EL element deteriorates, the luminance of the emitted light will not change along with elapse.

The pixel circuit 2*a* of FIG. 2 is comprised of p-channel TFTs, but if it were possible to configure it by n-channel TFTs, it would be possible to use an amorphous silicon (a-Si) process in the past in the fabrication of the TFTs. This would enable a reduction in the cost of TFT boards.

Next, consider a pixel circuit replacing the transistors with n-channel TFTs.

FIG. 4 is a circuit diagram of a pixel circuit replacing the p-channel TFTs of the circuit of FIG. 2 with n-channel TFTs.

The pixel circuit 2*b* of FIG. 4 has an n-channel TFT 21 and TFT 22, a capacitor C21, and a light emitting element constituted by an organic EL element (OLED) 23. Further, in FIG. 4, DTL indicates a data line, and WSL indicates a scanning line.

In the pixel circuit 2*b*, the drain side of the drive transistor constituted by the TFT 21 is connected to the power source potential Vcc, and the source is connected to the anode of the organic EL light emitting element 23, whereby a source-follower circuit is formed.

FIG. 5 is a view of the operating point of a drive transistor constituted by the TFT 21 and an EL element 23 in the initial state. In FIG. 5, the abscissa indicates the drain-source voltage Vds of the TFT 21, while the ordinate indicates the drain-source current Ids.

As shown in FIG. 5, the source voltage is determined by the operating point of the drive transistor constituted by the TFT 21 and the EL light emitting element 23. The voltage differs in value depending on the gate voltage.

This TFT 21 is driven in the saturated region, so a current Ids of the value of the above equation 1 is supplied for the Vgs for the source voltage of the operating point.

However, here too, similarly, the I-V characteristic of the organic EL element ends up deteriorating along with elapse. As shown in FIG. 6, the operating point ends up fluctuating due to this deteriorating along with elapse. The source voltage fluctuates even if supplying the same gate voltage.

Due to this, the gate-source voltage Vgs of the drive transistor constituted by the TFT 21 ends up changing and the value of the current flowing fluctuates. The value of the current flowing through the organic EL element 23 simultaneously changes, so if the I-V characteristic of the organic EL element 23 deteriorates, the luminance of the emitted light will end up changing along with elapse in the source-follower circuit of FIG. 4.

Further, as shown in FIG. 7, a circuit configuration where the source of the drive transistor constituted by the n-channel TFT 21 is connected to the ground potential GND, the drain is connected to the cathode of the organic EL light emitting element 23, and the anode of the organic EL light emitting element 23 is connected to the power source potential Vcc may be considered.

With this system, in the same way as when driven by the p-channel TFT of FIG. 2, the potential of the source is fixed, the drive transistor constituted by the TFT 21 operates as a constant current source, and a change in the luminance due to deterioration of the I-V characteristic of the organic EL element can be prevented.

With this system, however, the drive transistor has to be connected to the cathode side of the organic EL light emitting element. This cathodic connection requires development of new anode-cathode electrodes. This is considered extremely difficult with the current level of technology.

From the above, in the past systems, no organic EL light emitting element using a n-channel transistor free of change in luminance has been developed.

DISCLOSURE OF THE INVENTION

An object of the present invention is to provide a pixel circuit, display device, and method of driving a pixel circuit enabling source-follower output with no deterioration of luminance even with a change of the current-voltage characteristic of the light emitting element along with elapse, enabling a source-follower circuit of n-channel transistors, and able to use an n-channel transistor as an EL element transistor while using current anode-cathode electrodes.

To achieve the above object, according to a first aspect of the present invention, there is provided a pixel circuit for driving an electro-optic element with a luminance changing according to a flowing current, comprising a data line through which a data signal in accordance with luminance information is supplied; a first control line; first and second nodes; first and second reference potentials; a drive transistor forming a current supply line between the first terminal and the second terminal and controlling a current flowing through the current supply line in accordance with the potential of a control terminal connected to the second node; a pixel capacitance element connected between the first node and the second node; a first switch connected between the data line and either of a first terminal or second terminal of the pixel capacitance element and controlled in conduction by the first control line; and a first circuit for making a potential of the first node change to a fixed potential while the electro-optic element is not emitting light; the current supply line of the drive transistor, the first node, and the electro-optic element being connected in series between the first reference potential and second reference potential.

Preferably, the circuit further comprises a second control line; the drive transistor is a field effect transistor with a source connected to the first node, a drain connected to the first reference potential or second reference potential, and a gate connected to the second node; and the first circuit includes a second switch connected between the first node and fixed potential and is controlled in conduction by the second control line.

Preferably, when the electro-optic element is driven, as a first stage, the first switch is held in a non-conductive state by the first control line, the second switch is held in a conductive state by the second control line, and the first node is connected to a fixed potential; as a second stage, the first switch is held in a conductive state by the first control line, data to be propagated over the data line is written in the pixel capacitance element, then the first switch is held in a non-conductive state; and as a third stage, the second switch is held in a non-conductive state by the second control line.

Preferably, the circuit further comprises a second control line; the drive transistor is a field effect transistor with a drain connected to the first reference potential or second reference potential and a gate connected to the second node; and the first circuit includes a second switch connected between a source of the field effect transistor and an electro-optic element and is controlled in conduction by the second control line.

Preferably, when the electro-optic element is driven, as a first stage, the first switch is held in a non-conductive state by the first control line, and the second switch is held in a non-conductive state by the second control line; as a second stage, the first switch is held in a conductive state by the first control line, data to be propagated over the data line is written in the pixel capacitance element, then the first switch is held in a non-conductive state; and as a third stage, the second switch is held in a conductive state by the second control line.

Preferably, the circuit further comprises a second control line; the drive transistor is a field effect transistor with a source connected to the first node, a drain connected to the first reference potential or second reference potential, and a gate connected to the second node; and the first circuit includes a second switch connected between the first node and the electro-optic element and is controlled in conduction by the second control line.

Preferably, when the electro-optic element is driven, as a first stage, the first switch is held in a non-conductive state by the first control line, and the second switch is held in a non-conductive state by the second control line; as a second stage, the first switch is held in a conductive state by the first control line, data to be propagated over the data line is written in the pixel capacitance element, then the first switch is held in a non-conductive state; and as a third stage, the second switch is held in a conductive state by the second control line.

Preferably, the circuit further has a second circuit making the first node be held at a fixed potential when the first switch is held in a conductive state and writes data propagated through the data line.

Preferably, the circuit further comprises second and third control lines and a voltage supply; the drive transistor is a field effect transistor with a drain connected to the first reference potential or second reference potential and a gate connected to the second node; the first circuit includes a second switch connected between a source of the field effect transistor and the electro-optic element and is controlled in conduction by the second control line; and the second circuit includes a third switch connected between the first node and the voltage source and is controlled in conduction by the third control line.

Preferably, when the electro-optic element is driven, as a first stage, the first switch is held in a non-conductive state by the first control line, the second switch is held in a non-conductive state by the second control line, and the third switch is held in a non-conductive state by the third control line; as a second stage, the first switch is held in a conductive state by the first control line, the third switch is held in a conductive state by the third control line, the first node is held at a predetermined potential, and, in that state, data to be propagated over the data line is written in the pixel capacitance element, then the first switch is held in a non-conductive state by the first control line; and as a third stage, the third switch is held in a non-conductive state by the third control line and the second switch is held in a conductive state by the second control line.

Preferably, the circuit further has second and third control lines and a voltage source; the drive transistor is a field effect transistor with a source connected to the first node, a drain connected to the first reference potential or second reference potential, and a gate connected to the second node; the first circuit includes a second switch connected between the first node and the electro-optic element and controlled in conduction by the second control line; and the second circuit includes a third switch connected between the first node and the voltage source and is controlled in conduction by the third control line.

Preferably, when the electro-optic element is driven, as a first stage, the first switch is held in a non-conductive state by the first control line, the second switch is held in a non-conductive state by the second control line, and the third switch is held in a non-conductive state by the third control line; as a second stage, the first switch is held in a conductive state by the first control line, the third switch is held in a conductive state by the third control line, the first node is held at a predetermined potential, and, in that state, data to be propagated over the data line is written in the pixel capacitance element, then the first switch is held in a non-conductive state by the first control line; and as a third stage, the third switch is held in a non-conductive state by the third control line and the second switch is held in a conductive state by the second control line.

Preferably, the circuit further has a second circuit making the second node be held at a fixed potential when the first switch is held in a conductive state and writes data propagated through the data line.

Further, the fixed potential is the first reference potential or second reference potential.

Preferably, the circuit further comprises second, third, and fourth control lines; the drive transistor is a field effect transistor with a source connected to the first node, a drain connected to the first reference potential or second reference potential, and a gate connected to the second node; the first circuit includes a second switch connected between the first node and the electro-optic element and is controlled in conduction by the second control line and a third switch connected between a source of the field effect transistor and the first node and is controlled in conduction by the third control line; and the second circuit includes a fourth switch connected betweend the first node and the fixed potential and is controlled in conduction by the fourth control line.

Further, preferably when the electro-optic element is driven, as a first stage, the first switch is held in a non-conductive state by the first control line, the second switch is held in a non-conductive state by the second control line, the third switch is held in a non-conductive state by the third control line, and the fourth switch is held in a non-conductive state by the fourth control line; as a second stage, the first switch is held in a conductive state by the first control line, the fourth switch is held in a conductive state by the fourth control line, the second node is held at a fixed potential, and, in that state, data to be propagated over the data line is written in the pixel capacitance element, then the first switch is held in a non-conductive state by the first control line, and the fourth switch is held at a non-conductive state by the fourth control line; and as a third stage, the second switch is held in a conductive state by the second control line and the third switch is held in a conductive state by the third control line.

According to a second aspect of the present invention, there is provided a display device comprising a plurality of pixel circuits arranged in a matrix; a data line arranged for each column of the matrix array of pixel circuits and through which a data signal in accordance with luminance information is supplied; a first control line arranged for each row of the matrix array of pixel circuits; and first and second reference potentials; each pixel circuit further having an electro-optic element with a luminance changing according to a flowing current, first and second nodes, a drive transistor forming a current supply line between a first terminal and a second terminal and controlling a current flowing through the current supply line in accordance with the potential of a control terminal connected to the second node, a pixel capacitance element connected between the first node and the second node, a first switch connected between the data line and the second node and controlled in conduction by the first control line, and a first circuit for making a potential of the first node change to a fixed potential while the electro-optic element is not emitting light, the current supply line of the drive transistor, the first node, and the electro-optic element being connected in series between the first reference potential and second reference potential.

According to a third aspect of the present invention, there is provided a method of driving a pixel circuit having an electro-optic element with a luminance changing according to a flowing current; a data line through which a data signal in accordance with luminance information is supplied; first and second nodes; first and second reference potentials; a field effect transistor with a drain connected to the first reference potential or second reference potential, a source connected to the first node, and a gate connected to the second node; a pixel capacitance element connected between the first node and the second node; a first switch connected between the data line and either of a first terminal or a second terminal of the pixel capacitance element; and a first circuit for making a potential of the first node change to a fixed potential; the current supply line of the drive transistor, the first node, and the electro-optic element being connected in series between the first reference potential and second reference potential, comprising steps of making a potential of the first node change to a fixed potential by the first circuit in the state with the first switch held at a non-conductive state, holding the first switch at a conductive state, writing data propagated over the data line in the pixel capacitance element, then holding the first switch in the non-conductive, and stopping the operation for making a potential of the first node of said first circuit change to a fixed potential.

According to the present invention, since for example the source electrode of a drive transistor is connected to a fixed potential through a switch and there is a pixel capacitor between the gate and source of the drive transistor, the change in luminance due to the change in the I-V characteristic of a light emitting element along with elapse is corrected.

When the drive transistor is an n-channel transistor, by making the fixed potential a ground potential, the potential applied to the light emitting element is made the ground potential so as to create a non-emitting period of the light emitting element.

Further, by adjusting the off period of the second switch connecting the source electrode and ground potential, the emitting and non-emitting periods of the light emitting element are adjusted for duty driving.

Further, by making the fixed potential close to the ground potential or a potential lower than that or by raising the gate voltage, deterioration of the image quality due to fluctuation in the threshold voltage Vth of the switching transistor connected to the fixed potential is suppressed.

Further, when the drive transistor is a p-channel transistor, by making the fixed potential the potential of the power source connected to the cathode electrode of the light emitting element, the potential applied to the light emitting element is made the power source potential so as to create a non-emitting period of the EL element.

Further, by making the characteristic of the drive transistor an n-channel type, a source-follower circuit becomes possible and anodic connection becomes possible.

Further, making all of the drive transistors n-channel transistors becomes possible, introduction of a general amorphous silicon process becomes possible, and reduction of the cost becomes possible.

Further, since the second switching transistor is laid out between the light emitting element and the drive transistor, current is not supplied to the drive transistor in the non-emitting period and therefore power consumption of the panel is suppressed.

Further, by using a potential of the cathode side of the light emitting element as the ground potential, for example, the second reference potential, there is no need to provide a GND line at the TFT side inside the panel.

Further, by being able to delete the GND lines of the TFT boards in the panel, layout in the pixels and layout of the peripheral circuits become easy.

Further, by being able to delete the GND lines of the TFT boards in the panel, there is no overlap between the power source potential (first reference potential) and ground potential (second reference potential) of the peripheral circuits, the Vcc lines can be laid out with a lower resistance, and a high uniformity can be achieved.

Further, by connecting for example a pixel capacitance element to the source of a drive transistor and boosting one side of the capacitor to the power source while not emitting light, there is no longer a need for a GND line at the TFT side at the inside of the panel.

Further, by turning the fourth switch at the power source line side on when writing in a signal line so as to lower the impedance, the coupling effect on pixel writing is corrected in a short time and an image of a high uniformity is obtained.

Further, by making the potential of the power source line the same as the Vcc potential, it is possible to reduce the panel lines.

Further, according to the present invention, by connecting the gate electrode of the drive transistor to a fixed potential through a switch and providing a pixel capacitor between the gate and source of the drive transistor, change of the luminance due to deterioration of the I-V characteristic of the light emitting element along with elapse is corrected.

For example, when the drive transistor is an n-channel, by making the fixed potential the fixed potential to which the drain electrode of the drive transistor is connected, the fixed potential is made only the power source potential in the pixel.

Further, by raising the gate voltages of the switching transistors connected to the gate side and source side of the drive transistor or making the transistors larger in size, deterioration of the image quality due to variation in the threshold values of the switching transistors is suppressed. Further, when the drive transistor is a p-channel, by making the fixed potential the fixed potential to which the drain electrode of the driven is connected, the fixed potential is made only GND in the pixel.

Further, by raising the gate voltages of the switching transistors connected to the gate side and source side of the drive transistor or making the transistors larger in size, deterioration of the image quality due to variation in the threshold values of the switching transistors is suppressed.

BRIEF DESCRIPTION OF THE DRAWINGS

FIG. 20A is a timing chart for explaining the operation of the circuit of FIG. 18.

FIG. 20B is another timing chart for explaining the operation of the circuit of FIG. 18.

FIG. 20C is another timing chart for explaining the operation of the circuit of FIG. 18.

FIG. 20D is another timing chart for explaining the operation of the circuit of FIG. 18.

FIG. 20E is another timing chart for explaining the operation of the circuit of FIG. 18.

FIG. 20F is another timing chart for explaining the operation of the circuit of FIG. 18.

FIG. 40A is a timing chart for explaining the operation of the circuit of FIG. 37.

FIG. 40B is another timing chart for explaining the operation of the circuit of FIG. 37.

FIG. 40C is another timing chart for explaining the operation of the circuit of FIG. 37.

FIG. 40D is another timing chart for explaining the operation of the circuit of FIG. 37.

FIG. 40E is another timing chart for explaining the operation of the circuit of FIG. 37.

FIG. 40F is another timing chart for explaining the operation of the circuit of FIG. 37.

FIG. 40G is another timing chart for explaining the operation of the circuit of FIG. 37.

FIG. 40H is another timing chart for explaining the operation of the circuit of FIG. 37.

BEST MODE FOR WORKING THE INVENTION

Below, preferred embodiments of the present invention will be described with reference to the accompanying drawings.

First Embodiment

Figure 1:
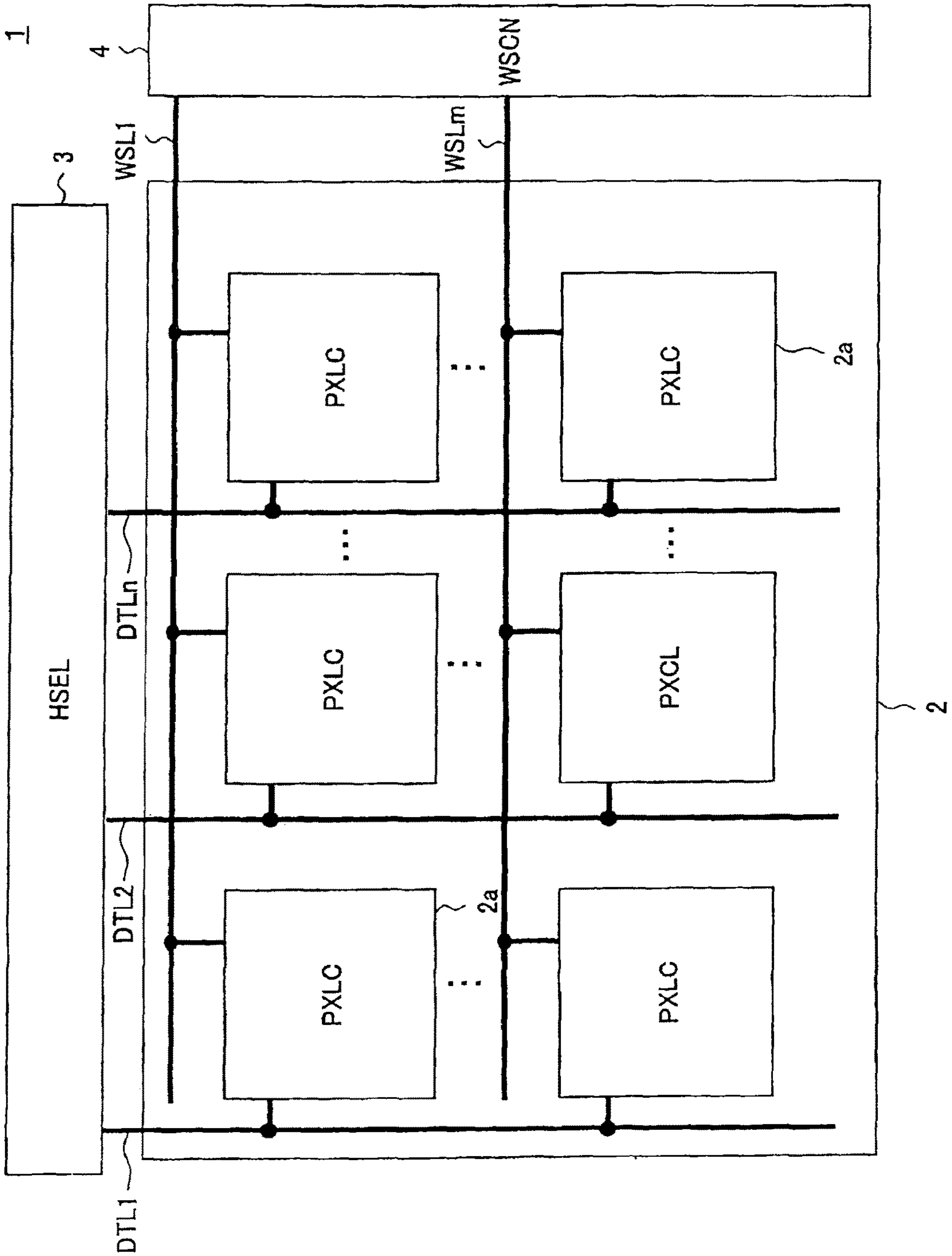
FIG. 1 Background Art
FIG. 1 is a block diagram of the configuration of a general organic EL display device.
Figure 2:
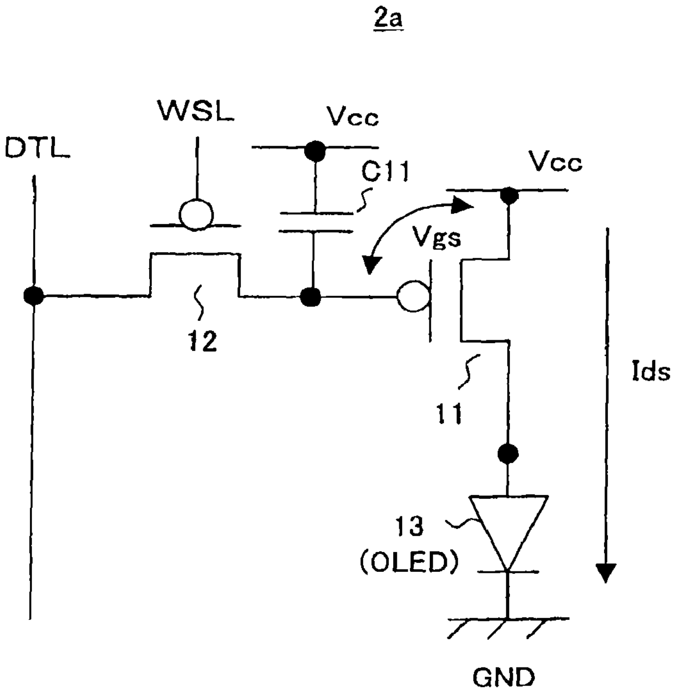
FIG. 2 Background Art
FIG. 2 is a circuit diagram of an example of the configuration of a pixel circuit of FIG. 1.
Figure 3:
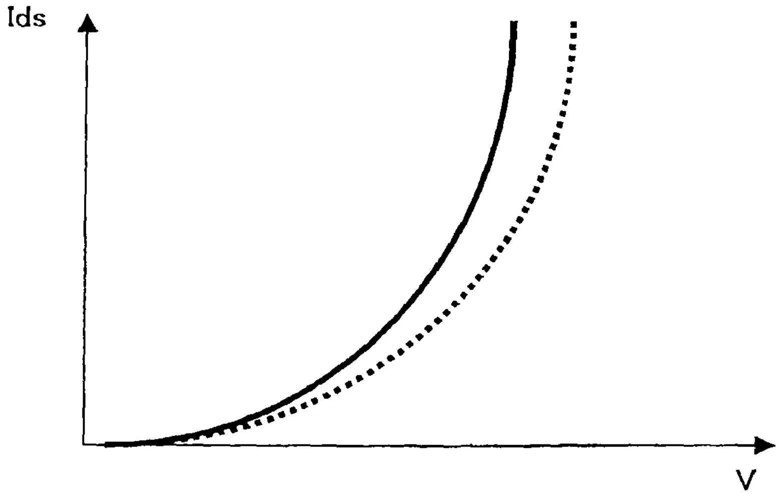
FIG. 3 Background Art
FIG. 3 is a graph of the change along with elapse of the current-voltage (I-V) characteristic of an organic EL device.
Figure 4:
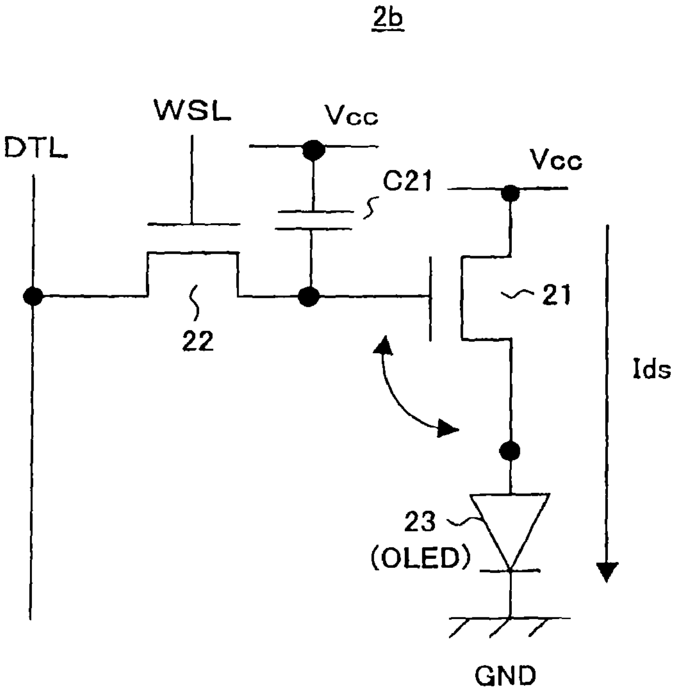
FIG. 4 Background Art
FIG. 4 is a circuit diagram of a pixel circuit in which p-channel TFTs of the circuit of FIG. 2 are replaced by n-channel TFTs.
Figure 5:
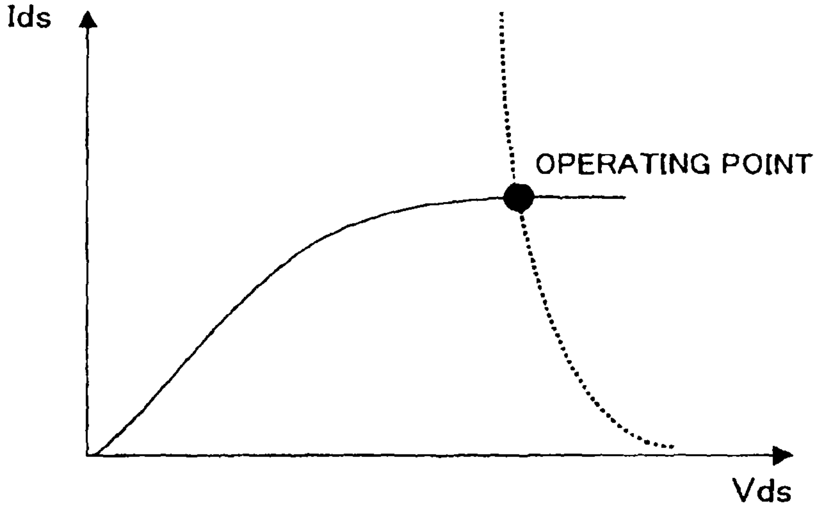
FIG. 5 Background Art
FIG. 5 is a graph showing the operating point of a drive transistor constituted by a TFT and an EL light emitting element in the initial state.
Figure 6:
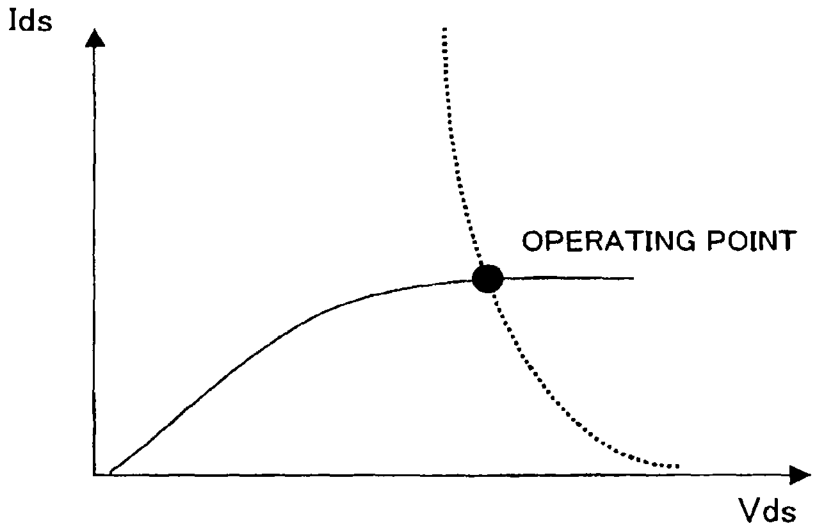
FIG. 6 Background Art
FIG. 6 is a graph showing the operating point of a drive transistor constituted by a TFT and an EL light emitting element after change along with elapse.
Figure 7:
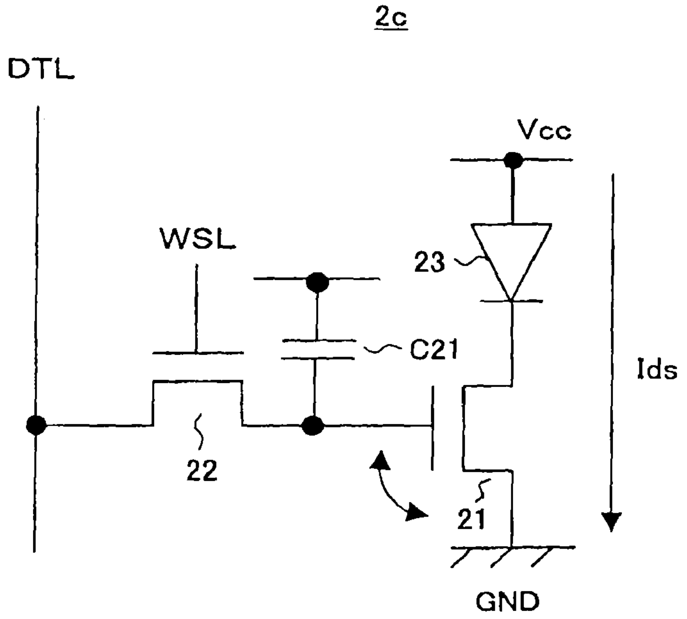
FIG. 7 Background Art
FIG. 7 is a circuit diagram of a pixel circuit connecting a source of a drive transistor constituted by an n-channel TFT to a ground potential.
Figure 8:
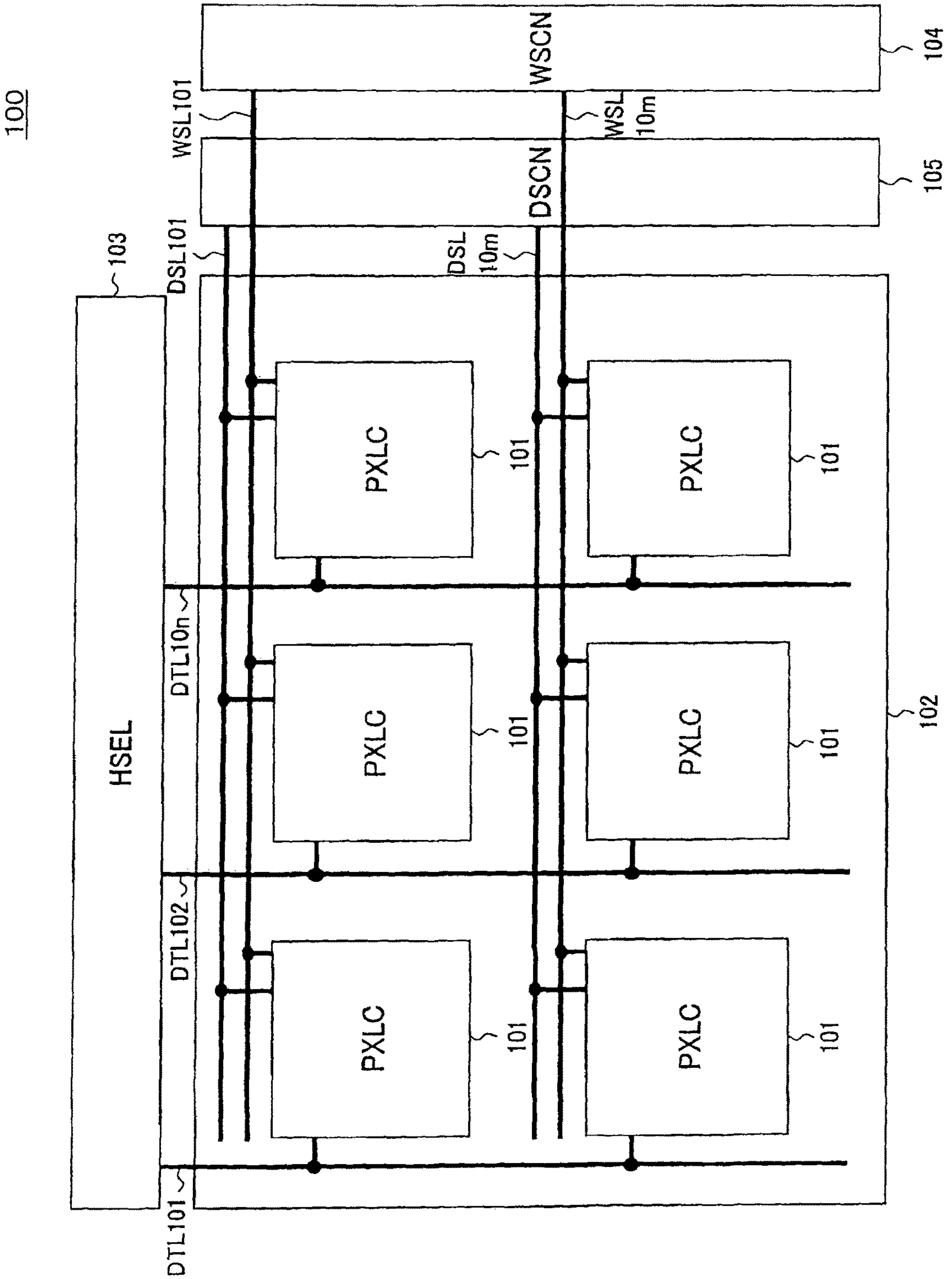
FIG. 8 is a block diagram of the configuration of an organic EL display device employing a pixel circuit according to a first embodiment.

FIG. 8 is a block diagram of the configuration of an organic EL display device employing pixel circuits according to the first embodiment.

Figure 9:
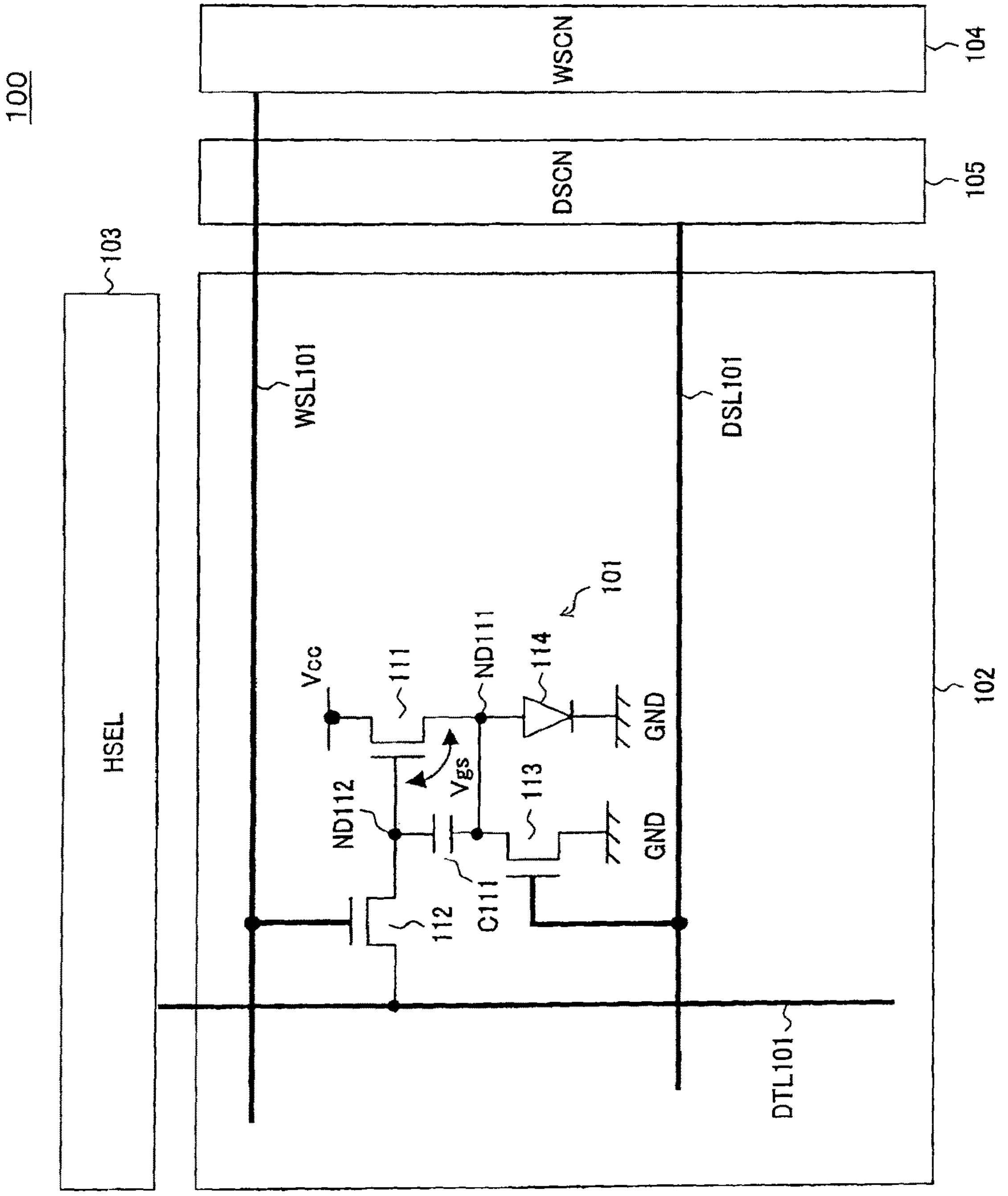
FIG. 9 is a circuit diagram of a specific configuration of a pixel circuit according to the first embodiment in the organic EL display device of FIG. 1.

FIG. 9 is a circuit diagram of the concrete configuration of a pixel circuit according to the first embodiment in the organic EL display device of FIG. 8.

This display device 100 has, as shown in FIG. 8 and FIG. 9, a pixel array portion 102 having pixel circuits (PXLC) 101 arranged in an m×n matrix, a horizontal selector (HSEL) 103, a write scanner (WSCN) 104, a drive scanner (DSCN) 105, data lines DTL101 to DTL10*n* selected by the horizontal selector 103 and supplied with a data signal in accordance with the luminance information, scanning lines WSL101 to WSL10*m* selectively driven by the write scanner 104, and drive lines DSL101 to DSL10*m* selectively driven by the drive scanner 105.

Note that while the pixel circuits 101 are arranged in an m×n matrix in the pixel array portion 102, FIG. 9 shows an example wherein the pixel circuits are arranged in a 2 (=m)×3 (=n) matrix for the simplification of the drawing.

Further, in FIG. 9, the concrete configuration of one pixel circuit is shown for simplification of the drawing.

The pixel circuit 101 according to the first embodiment has, as shown in FIG. 9, an n-channel TFT 111 to TFT 113, a capacitor C111, a light emitting element 114 made of an organic EL element (OLED), and nodes ND111 and ND112.

Further, in FIG. 9, DTL101 indicates a data line, WSL101 indicates a scanning line, and DSL101 indicates a drive line.

Among these components, TFT 111 configures the field effect transistor according to the present invention, TFT 112 configures the first switch, TFT 113 configures the second switch, and the capacitor C111 configures the pixel capacitance element according to the present invention.

Further, the scanning line WSL101 corresponds to the first control line according to the present invention, while the drive line DSL101 corresponds to the second control line.

Further, the supply line (power source potential) of the power source voltage Vcc corresponds to the first reference potential, while the ground potential GND corresponds to the second reference potential.

In the pixel circuit 101, a light emitting element (OLED) 114 is connected between a source of the TFT 111 and the second reference potential (in this present embodiment, the ground potential GND). Specifically, the anode of the light emitting element 114 is connected to the source of the TFT 111, while the cathode side is connected to the ground potential GND. The connection point of the anode of the light emitting element 114 and the source of the TFT 111 constitutes a node ND111.

The source of the TFT 111 is connected to a drain of the TFT 113 and a first electrode of the capacitor C111, while the gate of the TFT 111 is connected to a node ND112.

The source of the TFT 113 is connected to a fixed potential (in the present embodiment, a ground potential GND), while the gate of the TFT 113 is connected to the drive line DSL101. Further, a second electrode of the capacitor C111 is connected to the node ND112.

A source and a drain of the TFT 112 as first switch are connected to the data line DTL101 and node ND112. Further, a gate of the TFT 112 is connected to the scanning line WSL101.

In this way, the pixel cicuit 101 according to the present embodiment is configured with a capacitor C111 connected between the gate and source of the TFT 111 as the drive transistor and with a source potential of the TFT 111 connected to a fixed potential through the TFT 113 as the switching transistor.

Next, the operation of the above configuration will be explained focusing on the operation of a pixel circuit with reference to FIGS. 10A to 10F and FIGS. 11A to 11F.

Figures 11A, 11B, 11C, 11D, 11E, 11F:
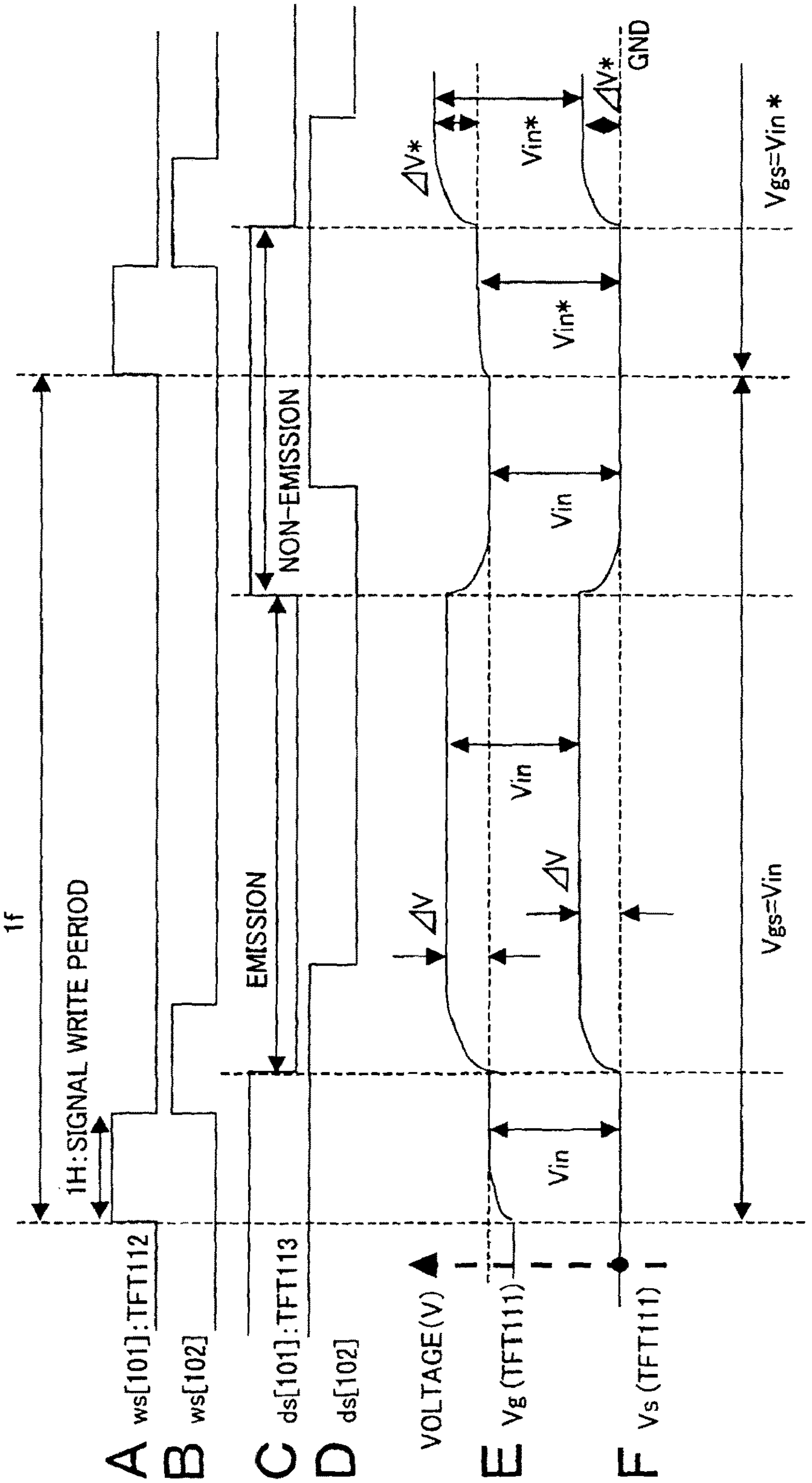
FIG. 11A is a timing chart for explaining the operation of the circuit of FIG. 9.
FIG. 11B is a timing chart for explaining the operation of the circuit of FIG. 9.
FIG. 11C is another timing chart for explaining the operation of the circuit of FIG. 9.
FIG. 11D is another timing chart for explaining the operation of the circuit of FIG. 9.
FIG. 11E is another timing chart for explaining the operation of the circuit of FIG. 9.
FIG. 11F is another timing chart for explaining the operation of the circuit of FIG. 9.

Note that FIG. 11A shows a scanning signal ws[101] applied to the first row scanning line WSL101 of the pixel array, FIG. 11B shows a scanning signal ws[102] applied to the second row scanning line WSL102 of the pixel array, FIG. 11C shows a drive signal ds[101] applied to the first row drive line DSL101 of the pixel array, FIG. 11D shows a drive signal ds[101] applied to the second row drive line DSL102 of the pixel array, FIG. 11E shows a gate potential Vg of the TFT 111, and FIG. 11F shows a source potential Vs of the TFT 111.

First, at the time of the ordinary emitting state of the EL light emitting element 114, as shown in FIGS. 11A to 11D, the scanning signals ws[101], ws[102], . . . to the scanning lines WSL101, WSL102, . . . are selectively set to the low level by the write scanner 104, and the drive signals ds[101], ds[102], . . . to the drive lines DSL101, DSL102, . . . are selectively set to the low level by the drive scanner 105.

Figures 10A, 10B, 10C, 10D, 10E, 10F:
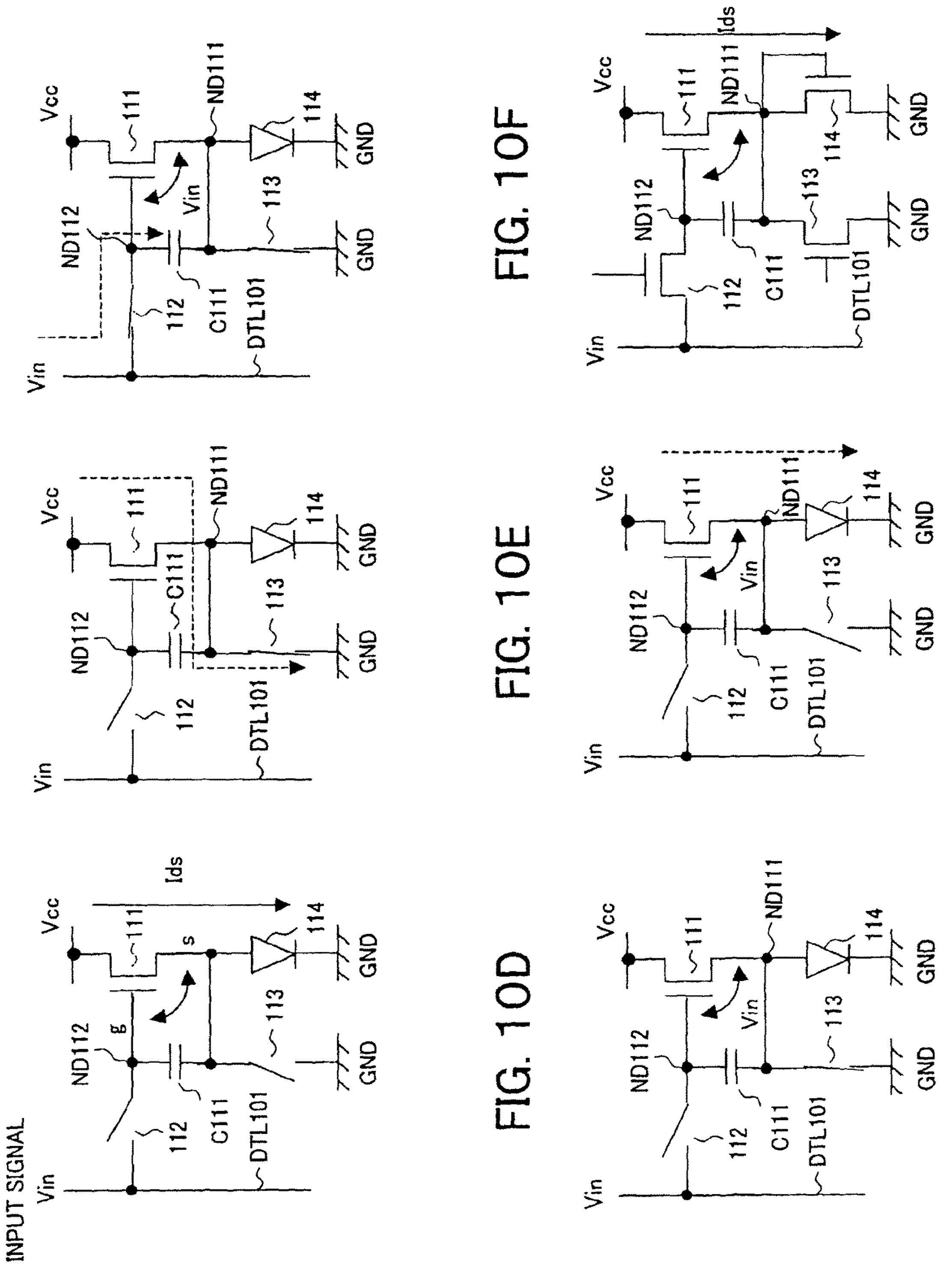
FIG. 10A is a view of an equivalent circuit for explaining the operation of the circuit of FIG. 9.
FIG. 10B is a view of another equivalent circuit for explaining the operation of the circuit of FIG. 9.
FIG. 10C is a view of another equivalent circuit for explaining the operation of the circuit of FIG. 9.
FIG. 10D is a view of another equivalent circuit for explaining the operation of the circuit of FIG. 9.
FIG. 10E is a view of another equivalent circuit for explaining the operation of the circuit of FIG. 9.
FIG. 10F is a view of another equivalent circuit for explaining the operation of the circuit of FIG. 9.

As a result, in the pixel circuits 101, as shown in FIG. 10A, the TFT 112 and TFT 113 are held in the off state.

Next, in the non-emitting period of the EL element 114, as shown in FIGS. 11A to 11D, the scanning signals ws[101], ws[102], . . . to the scanning lines WSL101, WSL102, . . . are held at the low level by the write scanner 104, and the drive signals ds[101], ds[102], . . . to the drive lines DSL101, DSL102, . . . are selectively set to the high level by the drive scanner 105.

As a result, in the pixel circuits 101, as shown in FIG. 10B, the TFT 112 is held in the off state and the TFT 113 is turned off.

At this time, current flows through the TFT 113 and, as shown in FIG. 11F, the source potential Vs of the TFT 111 falls to the ground potential GND. Therefore, the voltage applied to the EL light emitting element 114 also becomes 0V and the EL light emitting element 114 becomes non-emitting in state.

Next, in the non-emitting period of the EL light emitting element 114, as shown in FIGS. 11A to 11D, the drive signals ds[101], ds[102], . . . to the drive lines DSL101, DSL102, . . . are held at the high level by the drive scanner 105, and the scanning signals ws[101], ws[102], . . . to the scanning lines WSL101, WSL102, . . . are selectively set to the high level by the write scanner 104.

As a result, in the pixel circuits 101, as shown in FIG. 10C, the TFT 113 is held in the on state and the TFT 112 is turned on. Due to this, the horizontal selector 103 writes the input signal (Vin) propagated to the data line DTL101 into the capacitor C111 as the pixel capacitor.

At this time, as shown in FIG. 11F, the source potential Vs of the TFT 111 as the drive transistor is at the ground potential level (GND level), so, as shown in FIGS. 11E and 11F, the potential difference between the gate and source of the TFT 111 becomes equal to the voltage Vin of the input signal.

After this, in the non-emitting period of the EL light emitting element 114, as shown in FIGS. 11A to 11D, the drive signals ds[101], ds[102], . . . to the drive lines DSL101, DSL102, . . . are held at the high level by the drive scanner 105 and the scanning signals ws[101], ws[102], . . . to the scanning lines WSL101, WSL102, . . . are selectively set to the low level by the write scanner 104.

As a result, in the pixel circuit 101, as shown in FIG. 10D, the TFT 112 is turned off and the write operation of the input signal to the capacitor C111 as the pixel capacitor ends.

After this, as shown in FIGS. 11A to 11D, the scanning signals ws[101], ws[102], . . . to the scanning lines WSL101, WSL102, . . . are held at the low level by the write scanner 104 and the drive signals ds[101], ds[102], . . . to the drive lines DSL101, DSL102, . . . are selectively set to the low level by the drive scanner 104.

As a result, in the pixel circuit 101, as shown in FIG. 10E, the TFT 113 is turned off.

By turning the TFT 113 off, as shown in FIG. 11F, the source potential Vs of the TFT 111 as the drive transistor rises and current also flows to the EL light emitting element 114.

The source potential Vs of the TFT 111 fluctuates, but despite this, since there is a capacitor between the gate and source of the TFT 111, as shown in FIGS. 11E and 11F, the gate-source potential is constantly held at Vin.

At this time, the TFT 111 as the drive transistor drives in the saturated region, so the current Ids flowing through the TFT 111 becomes the value shown in the above equation 1. This value is determined by the gate source potential Vin of the TFT 111. This current Ids similarly flows to the EL light emitting element 114, whereby the EL light emitting element 114 emits light.

The equivalent circuit of the EL light emitting element 114 becomes as shown in FIG. 10F, so at this time the potential of the node ND111 rises to the gate potential by which the current Ids flows through the EL light emitting element 114.

Along with this rise in potential, the potential of the node ND112 also similarly rises through the capacitor 111 (pixel capacitor Cs). Due to this, as explained above, the gate-source potential of the TFT 111 is held at Vin.

Here, consider the problems in the past source-follower system in the circuit of the present invention. In this circuit as well, the EL light emitting element deteriorates in its I-V characteristic along with the increase in the emitting period. Therefore, even if the drive transistor sends the same current, the potential applied to the EL light emitting element changes and the potential of the node ND111 falls.

However, in this circuit, the potential of the node ND111 falls while the gate-source potential of the drive transistor is held constant, so the current flowing through the drive transistor (TFT 111) does not change. Accordingly, the current flowing through the EL light emitting element also does not change. Even if the I-V characteristic of the EL light emitting element deteriorates, a current corresponding to the input voltage Vin constantly flows. Therefore, the past problem can be solved.

As explained above, according to the present first embodiment, the source of the TFT 111 as the drive transistor is connected to the anode of the light emitting element 114, the drain is connected to the power source potential Vcc, a capacitor C111 is connected between the gate and source of the TFT 111, and the source potential of the TFT 111 is connected to a fixed potential through the TFT 113 as the switching transistor, so the following effects can be obtained.

Source-follower output with no deterioration in luminance even with a change in the I-V characteristic of an EL light emitting element along with elapse becomes possible.

A source-follower circuit of n-channel transistors becomes possible, so it is possible to use an n-channel transistor as a drive element of an EL light emitting element while using current anode-cathode electrodes.

Further, it is possible to configure transistors of a pixel circuit by only n-channel transistors and possible to use the a-Si process in the fabrication of the TFTs. Due to this, there is the advantage that a reduction of the cost of TFT boards becomes possible.

Second Embodiment

Figure 12:
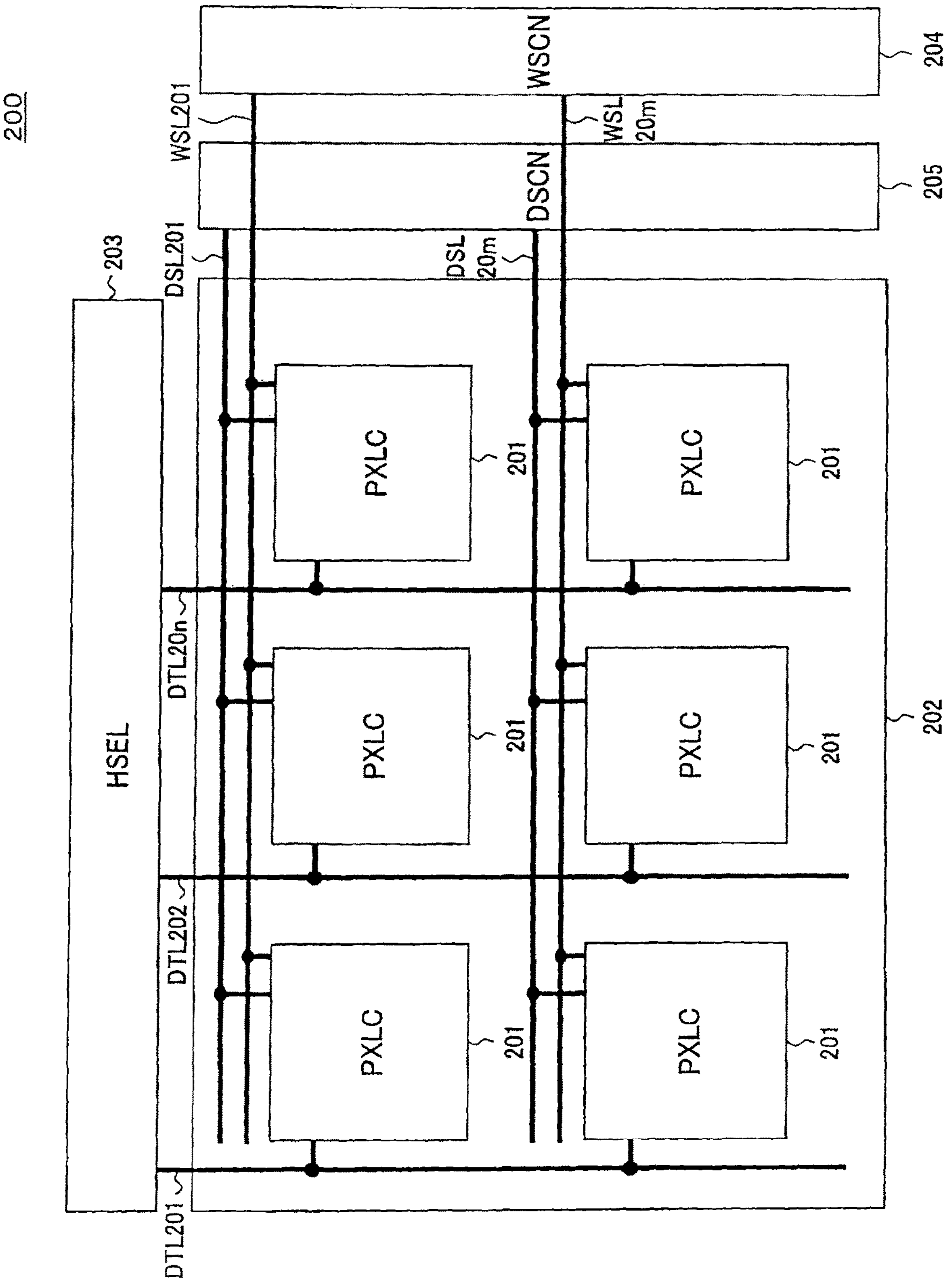
FIG. 12 is a block diagram of the configuration of an organic EL display device employing a pixel circuit according to a second embodiment.

FIG. 12 is a block diagram of the configuration of an organic EL display device employing pixel circuits according to a second embodiment.

Figure 13:
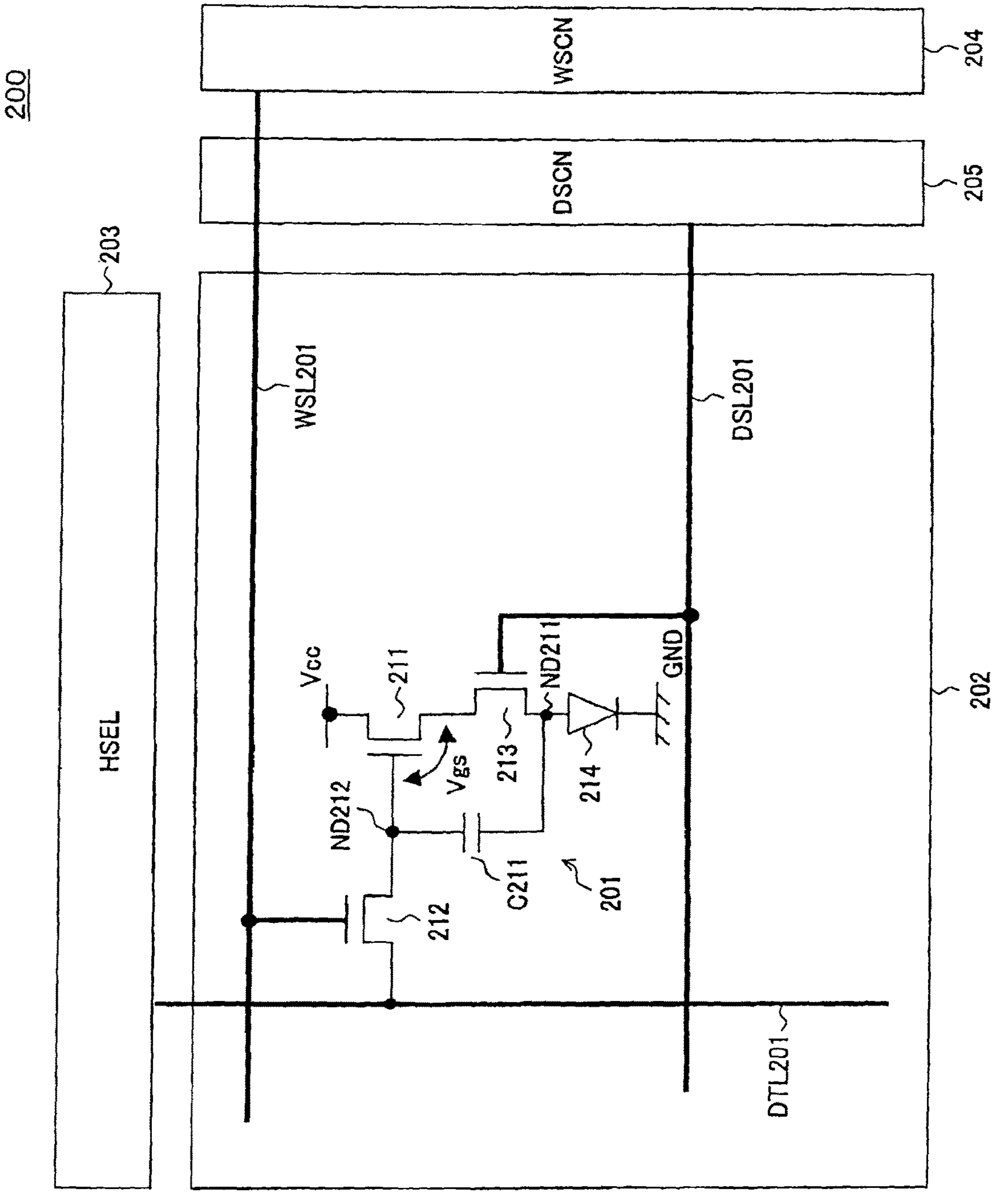
FIG. 13 is a circuit diagram of a specific configuration of a pixel circuit according to the second embodiment in the organic EL display device of FIG. 12.

FIG. 13 is a circuit diagram of the concrete configuration of a pixel circuit according to the second embodiment in the organic EL display device of FIG. 12.

The display device 200, as shown in FIG. 12 and FIG. 13, has a pixel array portion 202 having pixel circuits (PXLC) 201 arranged in an m×n matrix, a horizontal selector (HSEL) 203, a write scanner (WSCN) 204, a drive scanner (DSCN) 205, data lines DTL201 to DTL20*n* selected by the horizontal selector 203 and supplied with a data signal in accordance with the luminance information, scanning lines WSL201 to WSL20*m* selectively driven by the write scanner 204, and drive lines DSL201 to DSL20*m* selectively driven by the drive scanner 205.

Note that while the pixel circuits 201 are arranged in an m×n matrix in the pixel array portion 202, FIG. 12 shows an example wherein the pixel circuits are arranged in a 2 (=m)×3 (=n) matrix for the simplification of the drawing.

Further, in FIG. 13 as well, the concrete configuration of one pixel circuit is shown for simplification of the drawing.

Each pixel circuit 201 according to the second embodiment has, as shown in FIG. 13, an n-channel TFT 211 to TFT 213, a capacitor C211, a light emitting element 214 made of an organic EL element (OLED), and nodes ND211 and ND212.

Further, in FIG. 13, DTL201 indicates a data line, WSL201 indicates a scanning line, and DSL201 indicates a drive line.

Among these components, the TFT 211 configures the field effect transistor according to the present invention, the TFT 212 configures the first switch, the TFT 213 configures the second switch, and the capacitor C211 configures the pixel capacitance element according to the present invention.

Further, the scanning line WSL 201 corresponds to the first control line according to the present invention, while the drive line DSL201 corresponds to the second control line.

Further, the supply line of the power source voltage Vcc (power source potential) corresponds to the first reference potential, while the ground potential GND corresponds to the reference potential.

In each pixel circuit 201, a source and a drain of the TFT 213 are connected between a source of the TFT 211 and an anode of the light emitting element 214, a drain of the TFT 211 is connected to the power source potential Vcc, and a cathode of the light emitting element 214 is connected to the ground potential GND. That is, the TFT 211 as the drive transistor, the TFT 213 as the switching transistor, and the light emitting element 214 are connected in series between the power source potential Vcc and the ground potential GND. Further, the connection point of the anode of the light emitting element 214 and the source of the TFT 213 constitutes a node ND211.

A gate of the TFT 211 is connected to the node ND212. Further, the capacitor C211 as a pixel capacitor Cs connected between the nodes ND211 and ND212, that is, between the gate of the TFT 211 and the anode of the light emitting element 214. A first electrode of the capacitor C211 is connected to the node ND211, while a second electrode is connected to the node ND212.

A gate of the TFT 213 is connected to the drive line DSL201. Further, a source and a drain of the TFT 212 as the first switch are connected to the data line DTL201 and the node ND212. Further, a gate of the TFT 212 is connected to the scanning line WSL201.

In this way, the pixel circuit 201 according to the present embodiment is configured with the source of the TFT 211 as the drive transistor and the anode of the light emitting element 214 connected by the TFT 213 as the switching transistor, while a capacitor C211 connected between the gate of the TFT 211 and the anode of the light emitting element 214.

Next, the operation of the above configuration will be explained focusing on the operation of a pixel circuit with reference to FIGS. 14A to 14E and FIGS. 15A to 15F.

Figures 15A, 15B, 15C, 15D, 15E, 15F:
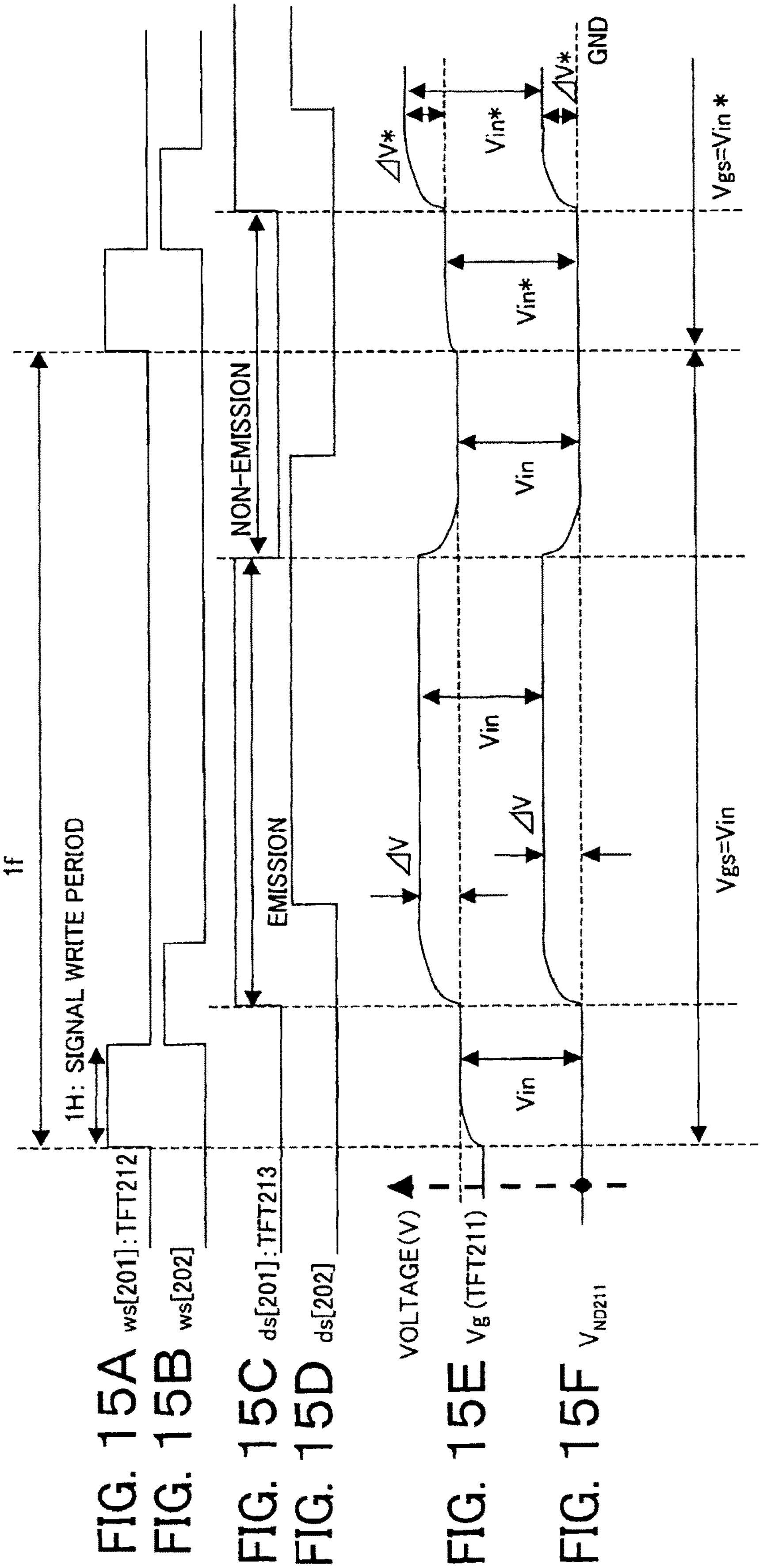
FIG. 15A is a timing chart for explaining the operation of the circuit of FIG. 13.
FIG. 15B is another timing chart for explaining the operation of the circuit of FIG. 13.
FIG. 15C is another timing chart for explaining the operation of the circuit of FIG. 13.
FIG. 15D is another timing chart for explaining the operation of the circuit of FIG. 13.
FIG. 15E is another timing chart for explaining the operation of the circuit of FIG. 13.
FIG. 15F is another timing chart for explaining the operation of the circuit of FIG. 13.

Note that FIG. 15A shows a scanning signal ws[201] applied to the first row scanning line WSL201 of the pixel array, FIG. 15B shows a scanning signal ws[202] applied to the second row scanning line WSL202 of the pixel array, FIG. 15C shows a drive signal ds[201] applied to the first row drive line DSL201 of the pixel array, FIG. 15D shows a drive signal ds[202] applied to the second row drivd line DSL202 of the pixel array, FIG. 15E shows a gate potential Vg of the TFT 211, and FIG. 15F shows an anode side potential of the TFT 211, that is, the potential VND211 of the node ND211.

First, at the ordinary emitting state of the EL light emitting element 214, as shown in FIGS. 15A to 15D, the scanning signals ws[201], ws[202], . . . to the scanning lines WSL201, WSL202, . . . are selectively set to the low level by the write scanner 204, and the drive signals ds[201], ds[202], . . . to the drive lines DSL201, DSL202, . . . are selectively set to the high level by the drive scanner 205.

Figures 14A, 14B, 14C, 14D, 14E:
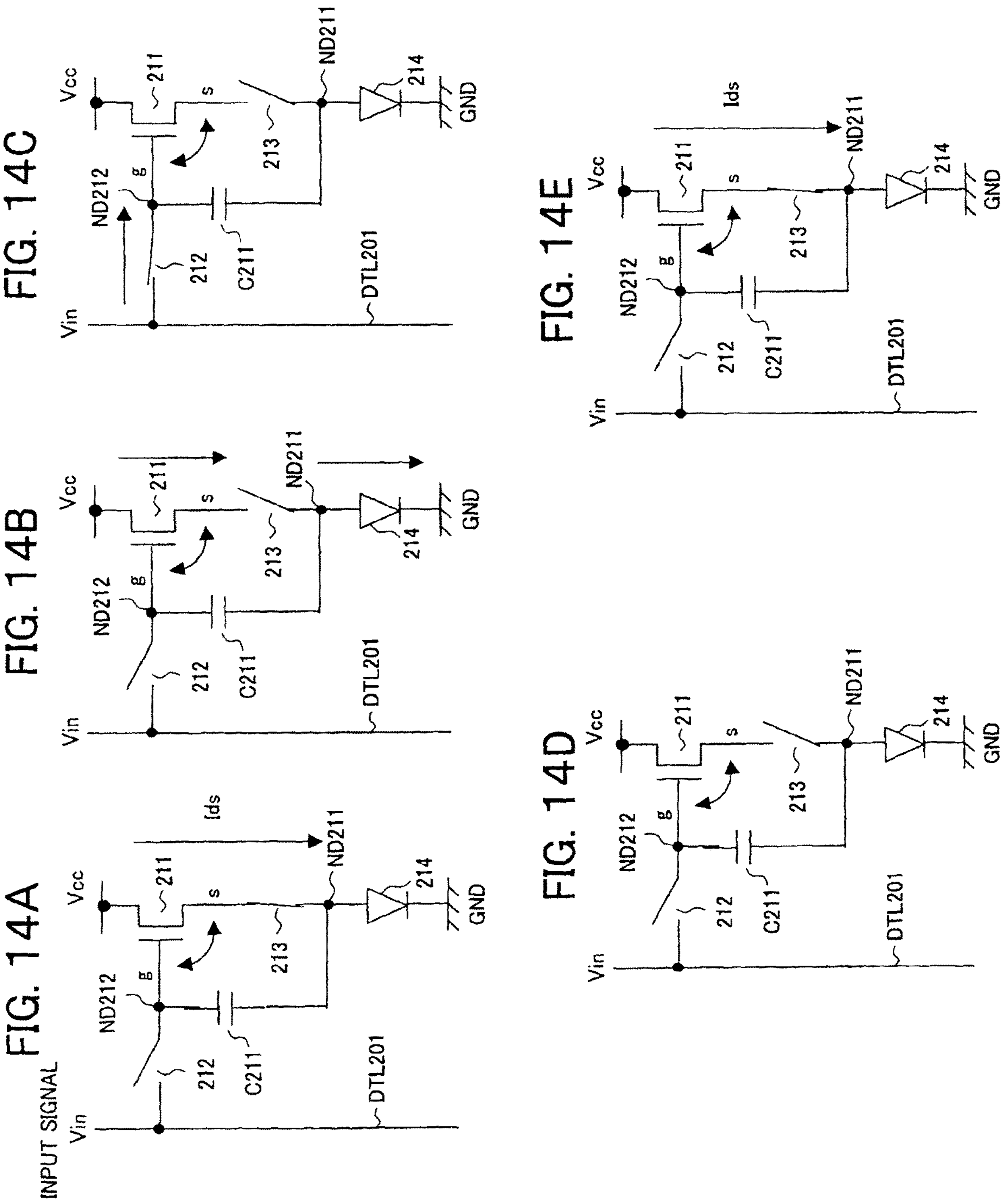
FIG. 14A is a view of an equivalent circuit for explaining the operation of the circuit of FIG. 13.
FIG. 14B is another view of an equivalent circuit for explaining the operation of the circuit of FIG. 13.
FIG. 14C is another view of an equivalent circuit for explaining the operation of the circuit of FIG. 13.
FIG. 14D is another view of an equivalent circuit for explaining the operation of the circuit of FIG. 13.
FIG. 14E is another view of an equivalent circuit for explaining the operation of the circuit of FIG. 13.

As a result, in the pixel circuit 201, as shown in FIG. 14A, the TFT 212 is held in the off state and the TFT 213 is held in the on state.

At this time, the current Ids flows to the TFT 211 as the drive transistor and the EL light emitting element 214.

Next, in the non-emitting period of the EL light emitting element 214, as shown in FIGS. 15A to 15D, the scanning signals ws[201], ws[202], . . . to the scanning lines WSL201, WSL202, . . . are held at the low level by the write scanner 204, and the drive signals ds[201], ds[202], . . . to the drive lines DSL201, DSL202, . . . are selectively set to the low level by the drive scanner 205.

As a result, in the pixel circuit 201, as shown in FIG. 14B, the TFT 212 is held in the off state and the TFT 213 is turned off.

At this time, the potential held at the EL light emitting element 214 falls since the source of supply disappears. The potential falls to the threshold voltage Vth of the EL light emitting element 214. However, since current also flows to the EL light emitting element 214, if the non-emitting period continues, the potential will fall to GND.

On the other hand, the TFT 211 as thr drive transistor is held in the on state since the gate potential is high. This boosting is performed in a short period. After boosting to the Vcc, no current is supplied to the TFT 211.

That is, in the pixel circuit 201 of the second embodiment, it is possible to operate without the supply of current in the pixel circuit during the non-emitting period and therefore possible to suppress the power consumption of the panel.

Next, in the non-emitting period of the EL light emitting element 214, as shown in FIGS. 15A to 15D, the drive signals ds[201], ds[202], . . . to the drive lines DSL201, DSL202, . . . are held at the low level by the drive scanner 205, and the scanning signals ws[201], ws[202], . . . to the scanning lines WSL201, WSL202, . . . are selectively set to the high level by the write scanner 204.

As a result, in the pixel circuit 201, as shown in FIG. 14C, the TFT 213 is held in the off state and the TFT 212 is turned on. Due to this, the input signal (Vin) propagated to the data line DTL201 by the horizontal selector 203 is written into the capacitor C211 as the pixel capacitor Cs.

At this time, as shown in FIG. 15F, since the anode side potential Va of the TFT 213 as the switching transistor, that is, the potential VND211 of the node ND211, is at the ground potential level (GND level), the capacitor C211 as the pixel capacitor Cs is held at a potential equal to the voltage Vin of the input signal.

After this, in the non-emitting period of the EL light emitting element 214, as shown in FIGS. 15A to 15D, the drive signals ds[201], ds[202], . . . to the drive lines DSL201, DSL202, . . . are held at the low level by the drive scanner 205, and the scanning signals ws[201], ws[202], . . . to the scanning lines WSL201, WSL202, . . . are selectively set to the low level by the write scanner 204.

As a result, in the pixel circuit 201, as shown in FIG. 14D, the TFT 212 is turned off and the write operation of the input signal to the capacitor C211 as the pixel capacitor ends.

After this, as shown in FIGS. 15A to 15D, the scanning signals ws[201], ws[202], . . . to the scanning lines WSL201, WSL202, . . . are held at the low level by the write scanner 204, and the drive signals ds[201], ds[202], . . . to the drive lines DSL201, DSL202, . . . are selectively set to the high level by the drive scanner 205.

As a result, in the pixel circuit 201, as shown in FIG. 14E, the TFT 213 is turned on.

By turning the TFT 213 on, current flows to the EL light emitting element 214 and the source potential of the TFT 211 falls. The source potential of the TFT 211 as the drive transistor fluctuates, but despite this, since there is a capacitor between the gate of the TFT 211 and the anode of the light emitting element 214, the gate-source potential is held at Vin. At this time, the TFT 211 as the drive transistor is driven in the saturated region, so the current Ids flowing through the TFT 211 becomes the value shown in the above equation 1. This is the gate-source voltage Vgs of the drive transistor.

Here, the TFT 213 operates in the nonsaturated region, so this is viewed as a simple resistance value. Accordingly, the gate-source voltage of the TFT 211 is Vin minus the value of the voltage drop due to the TFT 211. That is, the current flowing through the TFT 211 can be said to be determined by the Vin.

Due to the above, even if the EL light emitting element 214 deteriorates in its I-V characteristic along with the increase in the emitting period, in the pixel circuit 201 of the second embodiment, the potential of the node ND211 falls while the potential between the gate and source of the TFT 211 as thr drive transistor by is held constant, so the current flowing through the TFT 211 does not change.

Accordingly, the current flowing through the EL light emitting element 214 also does not change. Even if the I-V characteristic of the EL light emitting element 214 deteriorates, the current corresponding to the input voltage Vin constantly flows and therefore the past problem can be solved.

In addition, by raising the on voltage of the gate of the TFT 213, it is possible to suppress variation in the resistance value due to variation in the threshold value Vth of the TFT 213.

Note that, in FIG. 13, the potential of the cathode electrode of the light emitting element 214 is made the ground potential GND, but this may be made any other potential as well.

Figure 16:
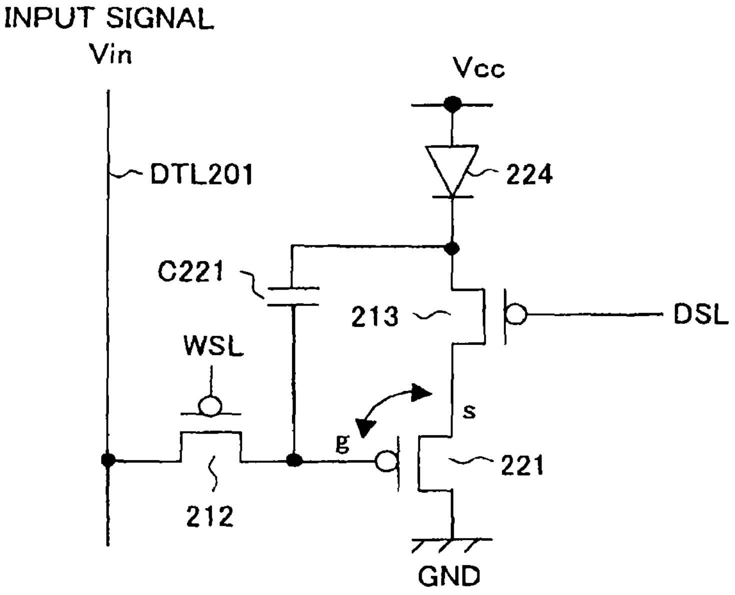
FIG. 16 is a circuit diagram of another example of the configuration of a pixel circuit according to the second embodiment.

Further, as shown in FIG. 16, the transistors of the pixel circuits need not be n-channel transistors. p-channel TFTs 221 to 223 may also be used to form each pixel circuit. In this case, the power source is connected to the anode side of the EL light emitting element 224, while the TFT 221 as the drive transistor is connected to the cathode side.

Further, the TFT 212 and TFT 213 as the switching transistors may also be transistors of different polarities from the TFT 211 as the drive transistor.

Here, the pixel circuit 201 according to the second embodiment and the pixel circuit 101 according to the first embodiment explained above will be compared.

The basic difference between the pixel circuit 201 according to the second embodiment and the pixel circuit 101 according to the first embodiment lies in the difference in the position of connection of the TFT 213 and TFT 113 as the switching transistors.

In general, the I-V characteristic of an organic EL element ends up deteriorating along with elapse. However, in the pixel circuit 101 according to the first embodiment, the potential difference Vs between the gate and source of the TFT 111 is held constant, so the current flowing through the TFT 111 is constant, therefore even if the I-V characteristic of the organic EL element deteriorates, the luminance is held.

In the pixel circuit 101 according to the first embodiment, when the TFT 112 is off and the TFT 113 is on, the source potential Vs of the drive transistor TFT 111 becomes the ground potential and the organic EL element 114 does not emit light and enters a non-emitting period. Simultaneously, the first electrode (one side) of the pixel capacitor also becomes the ground potential GND. However, even in the non-emitting period, the gate-source voltage continues to be held and current flows in the pixel circuit 101 from the power source (Vcc) to the GND.

In general, an organic EL element has an emitting period and a non-emitting period. The luminance of a panel is determined by the product of the intensity of the emission and the emitting period. Usually, the shorter the emitting period, the better the moving picture characteristics become, so it is preferable to use the panel in a short emitting period. To obtain the same luminance as with when shortening the emitting period, it is necessary to raise the intensity of the emission of the organic EL element and necessary to run a greater current through the drive transistor.

Here, the pixel circuit 101 according to the first embodiment will be considered further.

In the pixel circuit 101 according to the first embodiment, as explained above, current flows even during the non-emitting period. Therefore, if shortening the emitting period and raising the amount of current run, current continuously flows even during the non-emitting period, so the current consumption increases.

Further, in the pixel circuit 101 according to the first embodiment, power source potential VVCC and ground potential GND lines are necessary in the panel. Therefore, it is necessary to lay two types of lines inside the panel at the TFT side. The Vcc and GND have to be laid by a low resistance to prevent a voltage drop. Accordingly, if laying two types of lines, the layout area of the lines has to be increased. For this reason, if the pitch between pixels becomes smaller along with the higher definition of panels, laying of the transistors etc. is liable to become difficult. Simultaneously, the regions where the Vcc lines and GND lines overlap in the panel are liable to increase and the improvement of the yield is liable to be kept down.

As opposed to this, according to the pixel circuit 201 according to the second embodiment, the effects of the above first embodiment can be obtained of course and also the effects of reduction of the consumed current and lines and improvement of the yield can be obtained.

According to the second embodiment, source-follower output with no deterioration in luminance even with a change in the I-V characteristic of an EL light emitting element along with elapse becomes possible.

A source-follower circuit of n-channel transistors becomes possible, so it is possible to use an n-channel transistor as a drive element of an EL light emitting element while using current anode-cathode electrodes.

Further, it is possible to configure transistors of a pixel circuit by only n-channel transistors and possible to use the a-Si process in the fabrication of the TFTs. Due to this, a reduction of the cost of TFT boards becomes possible.

Further, according to the second embodiment, it is possible to slash the number of GND lines at the TFT side and layout of the surrounding lines and layout of the pixels become easier.

Further, it is possible to slash the number of GND lines at the TFT side, possible to eliminate the overlap of the GND lines and Vcc lines at the TFT board, and possible to improve the yield.

Further, it is possible to slash the number of GND lines at the TFT side, possible to eliminate the overlap of the GND lines and Vcc lines at the TFT board so as to lay the Vcc lines at a low resistance, and possible to obtain an image quality of a high uniformity.

Third Embodiment

Figure 17:
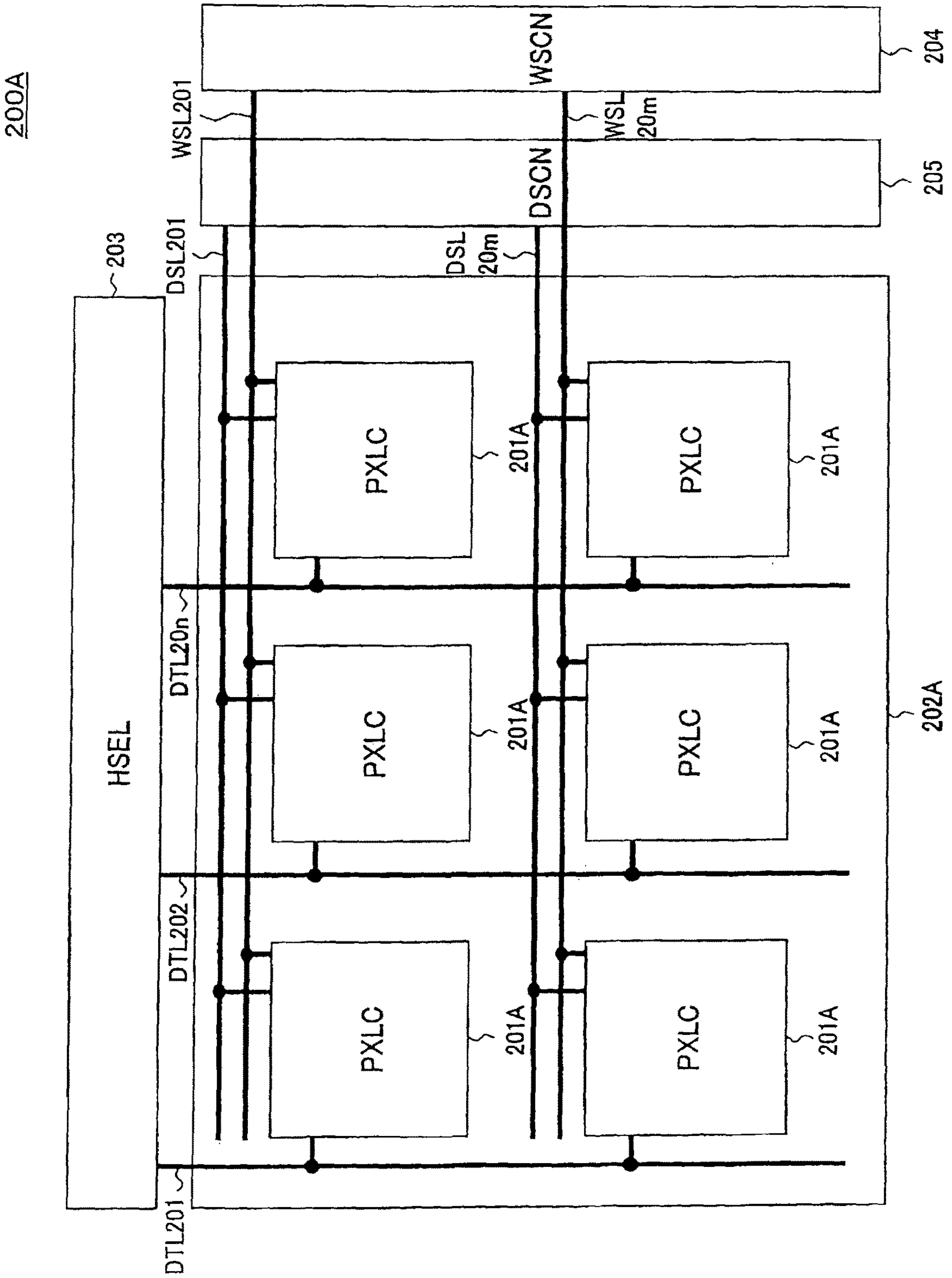
FIG. 17 is a block diagram of the configuration of an organic EL display device employing a pixel circuit according to a third embodiment.

FIG. 17 is a block diagram of the configuration of an organic EL display device employing a pixel circuit according to a third embodiment.

Figure 18:
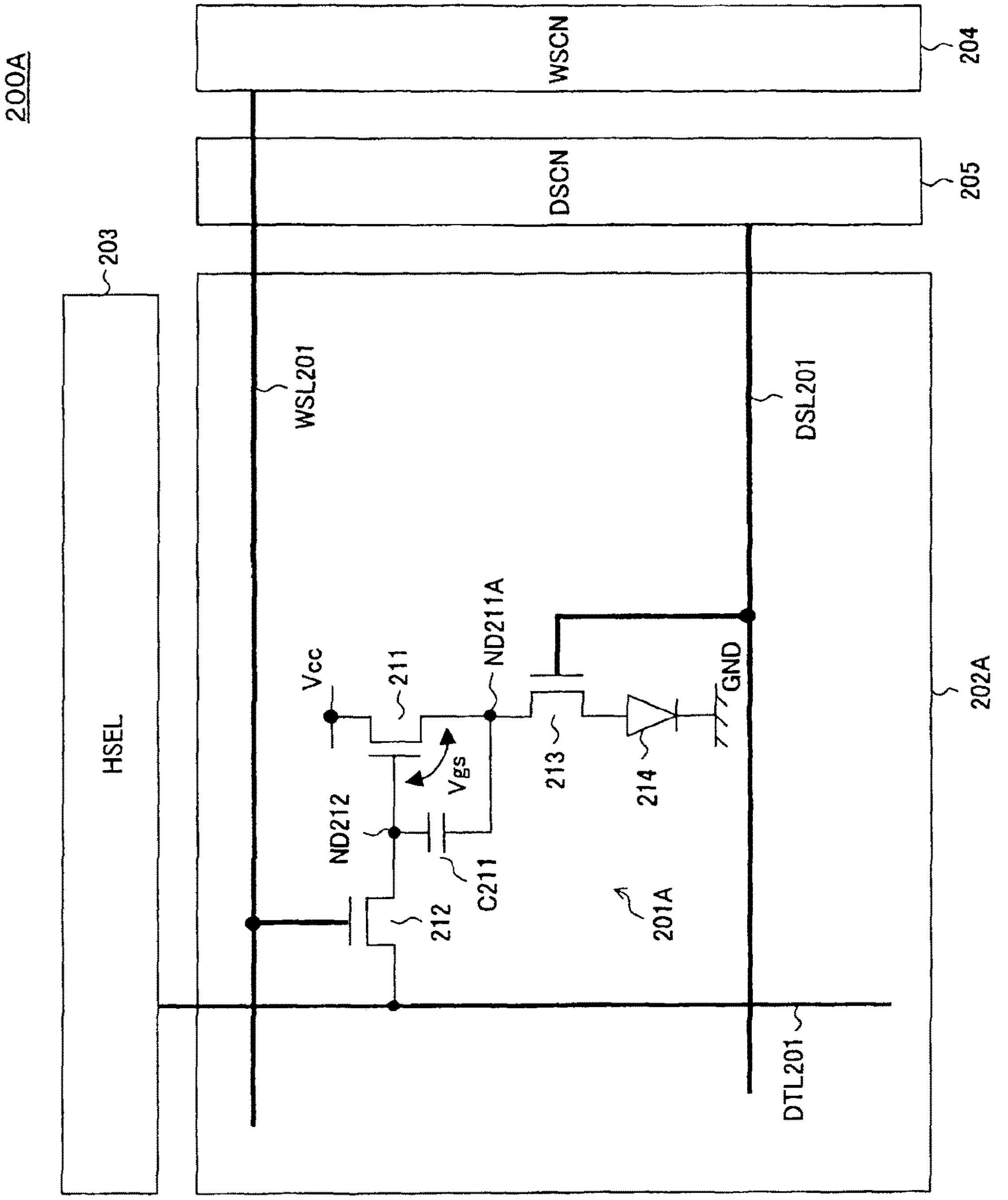
FIG. 18 is a circuit diagram of a specific configuration of a pixel circuit according to the third embodiment in the organic EL display device of FIG. 17.

FIG. 18 is a circuit diagram of the concrete configuration of a pixel circuit according to the third embodiment in the organic EL display device of FIG. 17.

The display device 200A according to the third embodiment differs from the display device 200 according to the second embodiment in the position of connection of the capacitor C211 as the pixel capacitor Cs in the pixel circuit.

Specifically, in the pixel circuit 201 according to the second embodiment, the capacitor C211 is connected between the gate of the TFT 211 as the drive transistor and the anode side of the EL light emitting element 214.

As opposed to this, in the pixel circuit 201A according to the third embodiment, the capacitor C211 is connected between the gate and source of the TFT 211 as the drive transistor. Specifically, a first electrode of the capacitor C211 is connected to the connection point (node ND211A) of the source of the TFT 211 and the TFT 213 as the switching transistor and a second electrode is connected to the node ND212.

The rest of the configuration is similar to that of the second embodiment explained above.

Next, the operation of the above configuration will be explained focusing on the operation of a pixel circuit with reference to FIGS. 19A to 19E and FIGS. 20A to 20F.

First, at the ordinary emitting state of the EL light emitting element 214, as shown in FIGS. 20A to 20D, the scanning signals ws[201], ws[202], . . . to the scanning lines WSL201, WSL202, . . . are selectively set to the low level by the write scanner 204, and the drive signals ds[201], ds[202], . . . to the drive lines DSL201, DSL202, . . . are selectively set to the high level by the drive scanner 205.

Figures 19A, 19B, 19C, 19D, 19E:
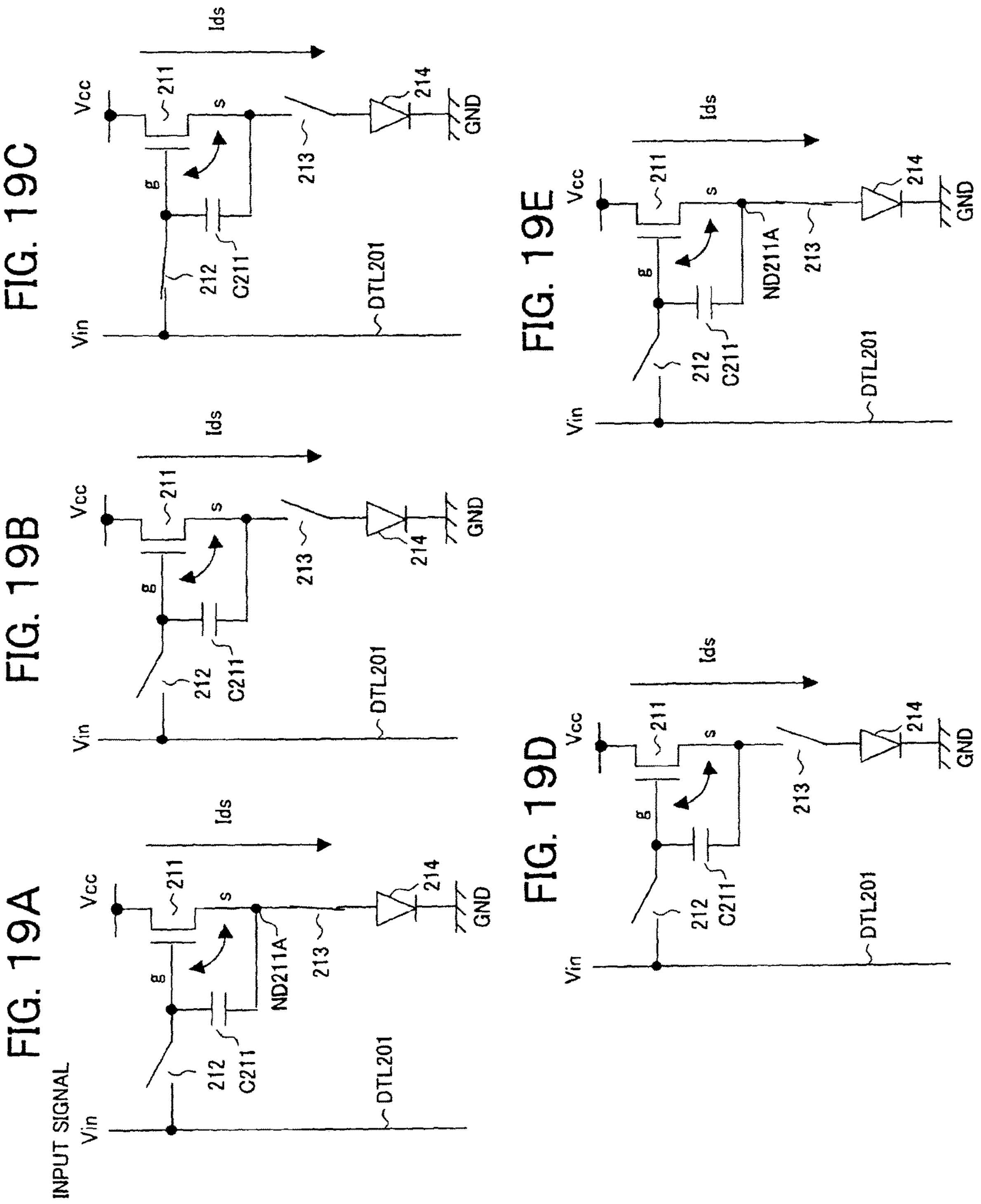
FIG. 19A is a view of an equivalent circuit for explaining the operation of the circuit of FIG. 18.
FIG. 19B is a view of another equivalent circuit for explaining the operation of the circuit of FIG. 18.
FIG. 19C is a view of another equivalent circuit for explaining the operation of the circuit of FIG. 18.
FIG. 19D is a view of another equivalent circuit for explaining the operation of the circuit of FIG. 18.
FIG. 19E is a view of another equivalent circuit for explaining the operation of the circuit of FIG. 18.

As a result, in the pixel circuit 201A, as shown in FIG. 19A, the TFT 212 is held in the off state and the TFT 213 is held in the on state.

At this time, the current Ids flows to the TFT 211 as the drive transistor and the EL light emitting element 214.

Next, in the non-emitting period of the EL light emitting element 214, as shown in FIGS. 20A to 20D, the scanning signals ws[201], ws[202], . . . to the scanning lines WSL201, WSL202, . . . are held at the low level by the write scanner

204, and the drive signals ds[201], ds[202], . . . to the drive lines DSL201, DSL202, . . . are selectively set to the low level by the drive scanner 205.

As a result, in the pixel circuit 201A, as shown in FIG. 19B, the TFT 212 is held in the off state and the TFT 213 is turned off.

At this time, the potential held at the EL light emitting element 214 falls since the source of supply disappears. The potential falls to the threshold voltage Vth of the EL light emitting element 214. However, since off current also flows to the EL light emitting element 214, if the non-emitting period continues, the potential will fall to GND.

On the other hand, the TFT 211 as the drive transistor is held in the on state since the gate potential is high. As shown in FIG. 20F, the source potential Vs of the TFT 211 is boosted to the power source voltage Vcc. This boosting is performed in a short period. After boosting to the Vcc, no current is supplied to the TFT 211.

That is, in the pixel circuit 201A of the third embodiment, it is possible to operate without the supply of current in the pixel circuit during the non-emitting period and therefore possible to suppress the power consumption of the panel.

Next, in the non-emitting period of the EL light emitting element 214, as shown in FIGS. 20A to 20D, the drive signals ds[201], ds[202], . . . to the drive lines DSL201, DSL202, . . . are held at the low level by the drive scanner 205, and the scanning signals ws[201], ws[202], . . . to the scanning lines WSL201, WSL202, . . . are selectively set to the high level by the write scanner 204.

As a result, in the pixel circuit 201A, as shown in FIG. 19C, the TFT 213 is held in the off state and the TFT 212 is turned on. Due to this, the input signal (Vin) propagated to the data line DTL201 by the horizontal selector 203 is written into the capacitor C211 as the pixel capacitor Cs.

At this time, as shown in FIG. 20F, since the source Vs of the TFT 213 as the switching transistor is the power source potential Vcc, the capacitor C211 as the pixel capacitor Cs is held at a potential equal to (Vin-Vcc) with respect to the voltage Vin of the input signal.

After this, in the non-emitting period of the EL light emitting element 214, as shown in FIGS. 20A to 20D, the drive signals ds[201], ds[202], . . . to the drive lines DSL201, DSL202, . . . are held at the low level by the drive scanner 205, and the scanning signals ws[201], ws[202], . . . to the scanning lines WSL201, WSL202, . . . are selectively set to the low level by the write scanner 204.

As a result, in the pixel circuit 201A, as shown in FIG. 19D, the TFT 212 is turned off and the write operation of the input signal to the capacitor C211 as the pixel capacitor ends.

After this, as shown in FIGS. 20A to 20D, the scanning signals ws[201], ws[202], . . . to the scanning lines WSL201, WSL202, . . . are held at the low level by the write scanner 204, and the drive signals ds[201], ds[202], . . . to the drive lines DSL201, DSL202, . . . are selectively set to the high level by the drive scanner 205.

As a result, in the pixel circuit 201A, as shown in FIG. 19E, the TFT 213 is turned on.

By turning the TFT 213 on, current flows to the EL light emitting element 214 and the source potential of the TFT 211 falls. The source potential of the TFT 211 as the drive transistor fluctuates, but despite this, since there is a capacitor between the gate and source of the TFT 211, the other transistors etc. are not connected, so the gate-source voltage of the TFT 211 is constantly held at (Vin-Vcc). At this time, the TFT 211 as the drive transistor is driven in the saturated region, so the current Ids flowing through the TFT 211 becomes the value shown in the above equation 1. This is the gate-source voltage Vgs of the drive transistor, that is, (Vin-Vcc).

That is, the current flowing through the TFT 211 can be said to be determined by the Vin.

Due to the above, even if the EL light emitting element 214 deteriorates in its I-V characteristic along with the increase in the emitting period, in the pixel circuit 201A of the third embodiment, the potential of the node ND211A falls while the potential between the gate and source of the TFT 211 as the drive transistor is held constant, so the current flowing through the TFT 211 does not change.

Accordingly, the current flowing through the EL light emitting element 214 also does not change. Even if the I-V characteristic of the EL light emitting element 214 deteriorates, the current corresponding to the input voltage Vin constantly flows and therefore the past problem can be solved.

In addition, since there is no transistor etc. other than the pixel capacitor Cs between the gate and source of the TFT 211, variation in the threshold value Vth will not cause any change of the gate-source voltage Vgs of the TFT 211 as the drive transistor like in the past system.

Note that, in FIG. 18, the potential of the cathode electrode of the light emitting element 214 is made the ground potential GND, but this may be made any other potential as well. Rather, making this the negative power source enables the potential of the Vcc to be lowered and enables the potential of the input signal voltage to be lowered. Due to this, design without burdening the external IC becomes possible.

Further, since no GND lines are required, the number of input pins to the panel can be slashed and pixel layout also becomes easier. In addition, since there are no longer intersecting parts of the Vcc and GND lines in the panel, the yield can also be easily improved.

Figure 21:
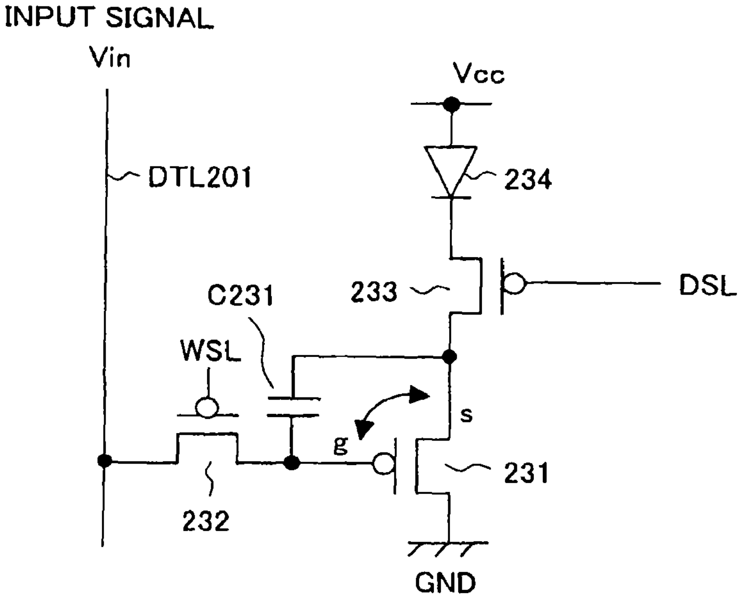
FIG. 21 is a circuit diagram of another example of the configuration of a pixel circuit according to the third embodiment.

Further, as shown in FIG. 21, the transistors of the pixel circuits need not be re-channel transistors. p-channel TFTs 231 to 233 may also be used to form each pixel circuit. In this case, the power source is connected to the anode side of the EL element 234, while the TFT 231 as the drive transistor is connected to the cathode side.

Further, the TFT 212 and TFT 213 as the switching transistors may also be transistors of different polarities from the TFT 211 as the drive transistor.

According to the third embodiment, source-follower output with no deterioration in luminance even with a change in the I-V characteristic of an EL light emitting element along with elapse becomes possible.

A source-follower circuit of n-channel transistors becomes possible, so it is possible to use an n-channel transistor as a drive element of an EL light emitting element while using current anode-cathode electrodes.

Further, it is possible to configure transistors of a pixel circuit by only n-channel transistors and possible to use the a-Si process in the fabrication of the TFTs. Due to this, a reduction of the cost of TFT boards becomes possible.

Further, according to the third embodiment, it is possible to slash the number of GND lines at the TFT side and layout of the surrounding lines and layout of the pixels become easier.

Further, it is possible to slash the number of GND lines at the TFT side, possible to eliminate the overlap of the GND lines and Vcc lines at the TFT board, and possible to improve the yield.

Further, it is possible to slash the number of GND lines at the TFT side, possible to eliminate the overlap of the GND lines and Vcc lines at the TFT board so as to lay the Vcc lines at a low resistance, and possible to obtain an image quality of a high uniformity.

Fourth Embodiment

Figure 22:
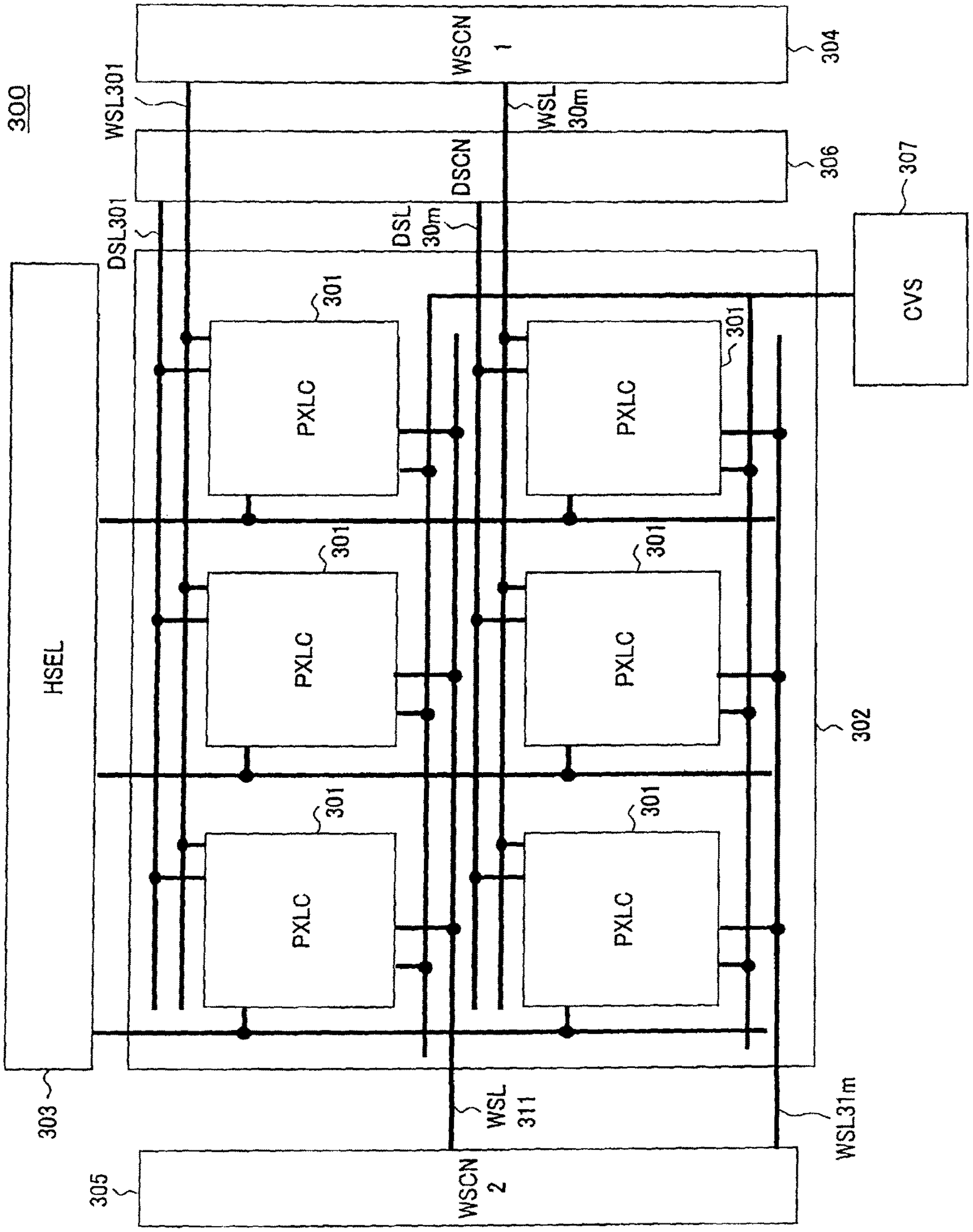
FIG. 22 is a block diagram of the configuration of an organic EL display device employing a pixel circuit according to a fourth embodiment.

FIG. 22 is a block diagram of the configuration of an organic EL display device employing a pixel circuit according to a fourth embodiment.

Figure 23:
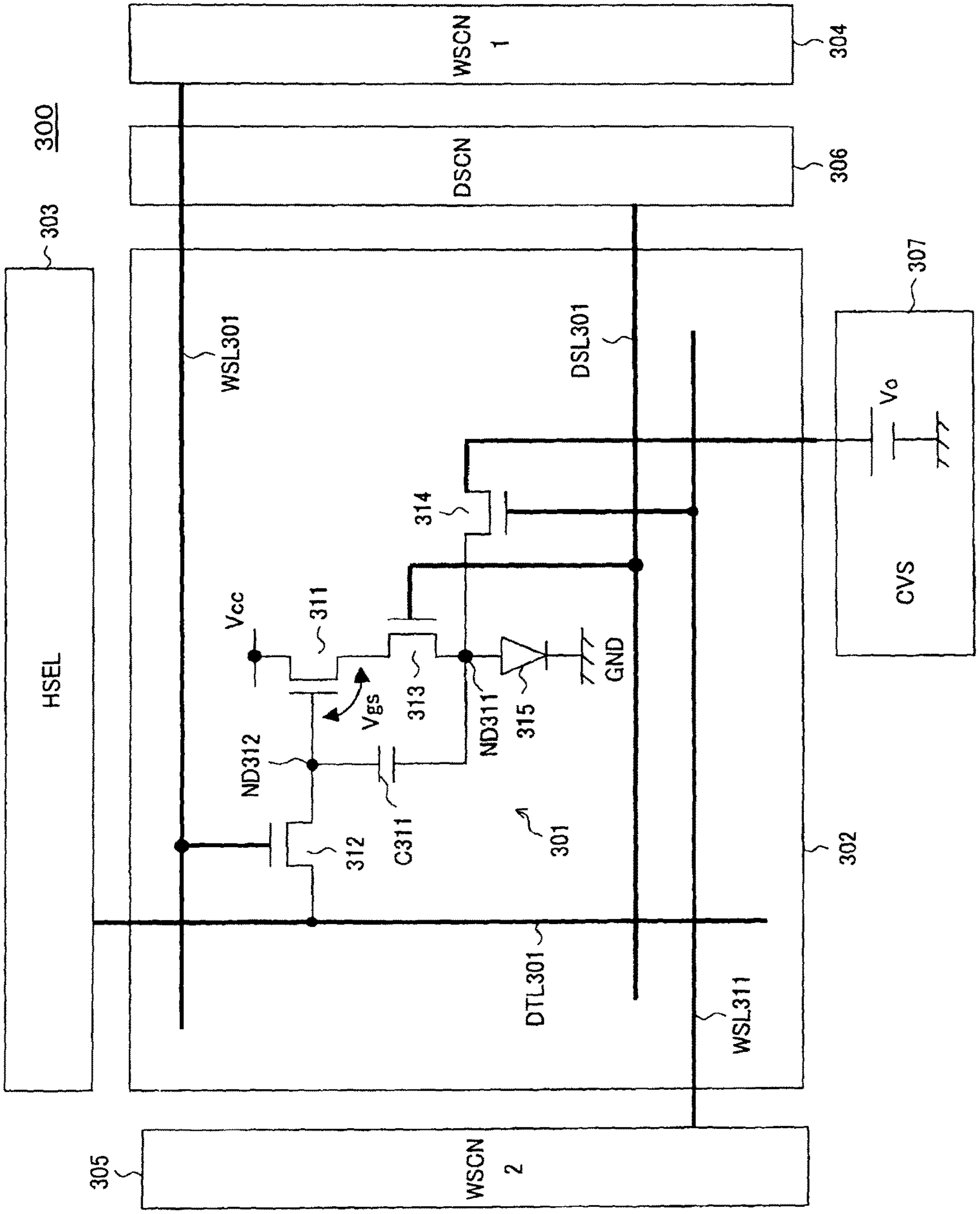
FIG. 23 is a circuit diagram of a specific configuration of a pixel circuit according to the fourth embodiment in the organic EL display device of FIG. 22.

FIG. 23 is a circuit diagram of the concrete configuration of a pixel circuit according to the fourth embodiment in the organic EL display device of FIG. 22.

The display device 300, as shown in FIG. 22 and FIG. 23, has a pixel array portion 302 having pixel circuits (PXLC) 301 arranged in an m×n matrix, a horizontal selector (HSEL) 303, a first write scanner (WSCN1) 304, a second write scanner (WSCN2) 305, a drive scanner (DSCN) 36, a constant voltage source (CVS) 307, data lines DTL301 to DTL30*n* selected by the horizontal selector 303 and supplied with a data signal in accordance with the luminance information, scanning lines WSL301 to WSL30*m* selectively driven by the write scanner 304, scanning lines WSL311 to WSL31*m* selectively driven by the write scanner 305, and drive lines DSL301 to DSL30*m* selectively driven by the drive scanner 306.

Note that while the pixel circuits 301 are arranged in an m×n matrix in the pixel array portion 302, FIG. 22 shows an example wherein the pixel circuits are arranged in a 2 (=m)×3 (=n) matrix for the simplification of the drawing.

Further, in FIG. 23 as well, the concrete configuration of one pixel circuit is shown for simplification of the drawing.

Each pixel circuit 301 according to the fourth embodiment has, as shown in FIG. 23, an n-channel TFT 311 to TFT 314, a capacitor C311, a light emitting element 315 made of an organic EL element (OLED), and nodes ND311 and ND312.

Further, in FIG. 23, DTL301 indicates a data line, WSL301 and WSL311 indicate scanning lines, and DSL301 indicates a drive line.

Among these components, the TFT 311 configures the field effect transistor according to the present invention, the TFT 312 configures the first switch, the TFT 313 configures the second switch, the TFT 314 configures the third switch, and the capacitor C311 configures the pixel capacitance element according to the present invention.

Further, the scanning line WSL301 corresponds to the first control line according to the present invention, the drive line DSL301 corresponds to the second control line, and the scanning line WSL311 corresponds to the third control line.

Further, the supply line of the power source voltage Vcc (power source potential) corresponds to the first reference potential, while the ground potential GND corresponds to the reference potential.

In each pixel circuit 301, a source and a drain of the TFT 313 are connected between a source of the TFT 311 and an anode of the light emitting element 315, a drain of the TFT 311 is connected to the power source potential Vcc, and a cathode of the light emitting element 315 is connected to the ground potential GND. That is, the TFT 311 as the drive transistor, the TFT 313 as the switching transistor, and the light emitting element 315 are connected in series between the power source potential Vcc and the ground potential GND. Further, the connection point of the anode of the light emitting element 315 and the TFT 313 constitutes a node ND311.

A gate of the TFT 311 is connected to the node ND312. Further, the capacitor C311 as a pixel capacitor Cs is connected between the nodes ND311 and ND312, that is, between the gate of the TFT 311 and the node ND311 (anode of the light emitting element 315). A first electrode of the capacitor C311 is connected to the node ND311, while a second electrode is connected to the node ND312.

A gate of the TFT 313 is connected to the drive line DSL301. Further, a source and a drain of the TFT 312 as the first switch are connected to the data line DTL301 and the node ND312. Further, a gate of the TFT 312 is connected to the scanning line WSL301.

Further, a source and a drain of the TFT 314 are connected between the node ND311 and the constant voltage source 307. A gate of the TFT 314 is connected to the scanning line WSL311.

In this way, the pixel circuit 301 according to the present embodiment is configured with the source of the TFT 311 as the drive transistor and the anode of the light emitting element 315 connected by the TFT 313 as the switching transistor, a capacitor C311 connected between the gate of the TFT 311 and the node ND311 (anode of the light emitting element 315), and a node ND311 is connected through the TFT 314 to the constant voltage source 307 (fixed voltage line).

Next, the operation of the above configuration will be explained focusing on the operation of a pixel circuit with reference to FIGS. 24A to 24E and FIGS. 25A to 25H.

Figures 25A, 25B, 25C, 25D, 25E, 25F, 25G, 25H:
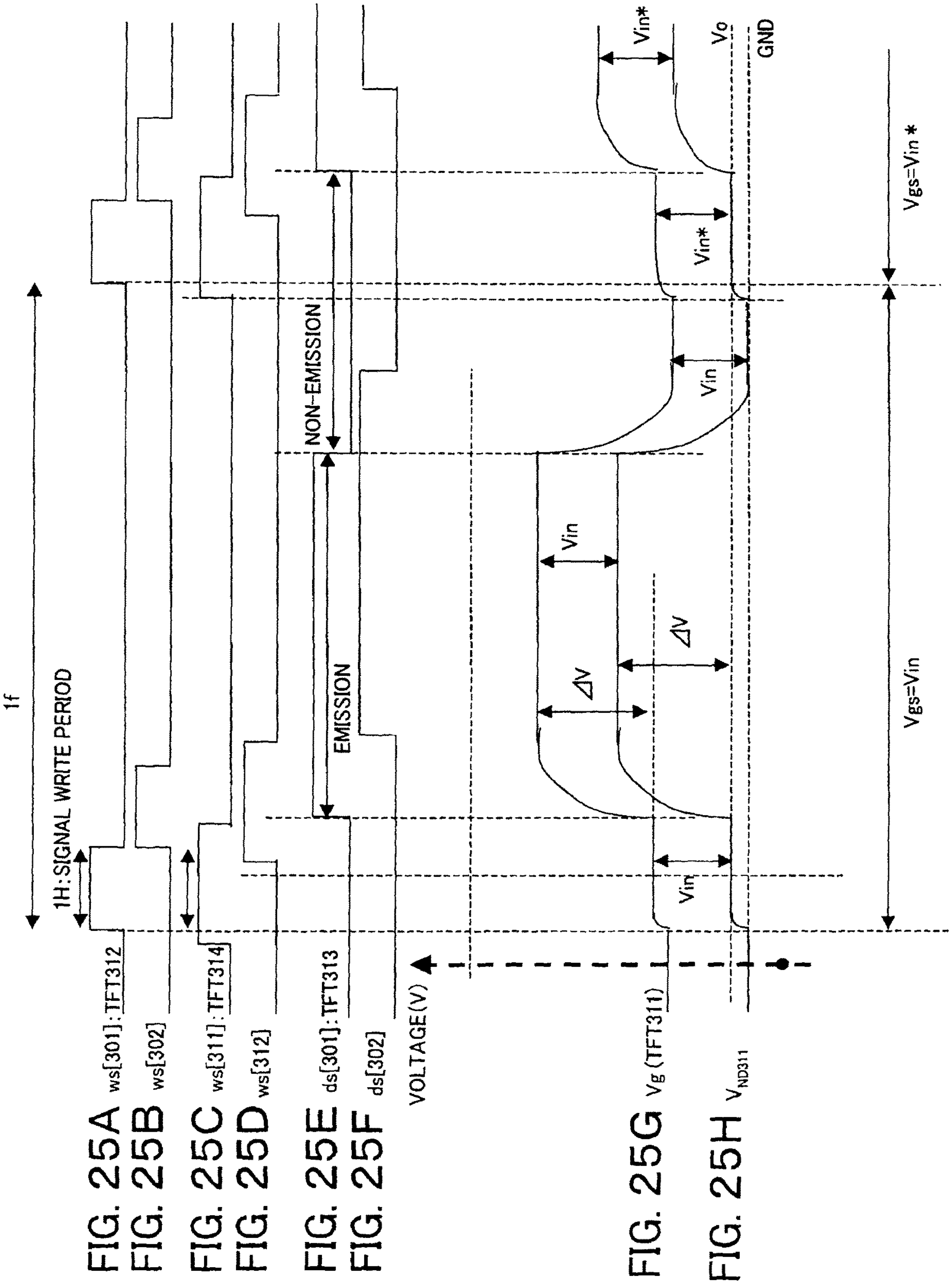
FIG. 25A is a timing chart for explaining the operation of the circuit of FIG. 23.
FIG. 25B is a timing chart for explaining the operation of the circuit of FIG. 23.
FIG. 25C is a timing chart for explaining the operation of the circuit of FIG. 23.
FIG. 25D is a timing chart for explaining the operation of the circuit of FIG. 23.
FIG. 25E is a timing chart for explaining the operation of the circuit of FIG. 23.
FIG. 25F is a timing chart for explaining the operation of the circuit of FIG. 23.
FIG. 25G is a timing chart for explaining the operation of the circuit of FIG. 23.
FIG. 25H is a timing chart for explaining the operation of the circuit of FIG. 23.

Note that FIG. 25A shows a scanning signal ws[301] applied to the first row scanning line WSL301 of the pixel array, FIG. 25B shows a scanning signal ws[302] applied to the second row scanning line WSL302 of the pixel array, FIG. 25C shows a scanning signal ws[311] applied to the first row scanning line WSL311 of the pixel array, FIG. 25D shows a scanning signal ws[312] applied to the second row scanning line WSL312 of the pixel array, FIG. 25E shows a drive signal ds[301] applied to the first row drivd line DSL301 of the pixel array, FIG. 25F shows a drive signal ds[302] applied to the second row drive line DSL302 of the pixel array, FIG. 25G shows a gate potential Vg of the TFT 311, and FIG. 25H shows an anode side potential of the TFT 311, that is, the potential VND311 of the node ND311.

First, at the ordinary emitting state of the EL light emitting element 315, as shown in FIGS. 25A to 25F, the scanning signals ws[301], ws[302], . . . to the scanning lines WSL301, WSL302, . . . are selectively set to the low level by the write scanner 304, the scanning signals ws[311], ws[312], . . . to the scanning lines WSL311, WSL312, . . . are selectively set to the low level by the write scanner 305, and the drive signals ds[301], ds[302], . . . to the drive lines DSL301, DSL302, . . . are selectively set to the high level by the drive scanner 306.

Figures 24A, 24B, 24C, 24D, 24E:
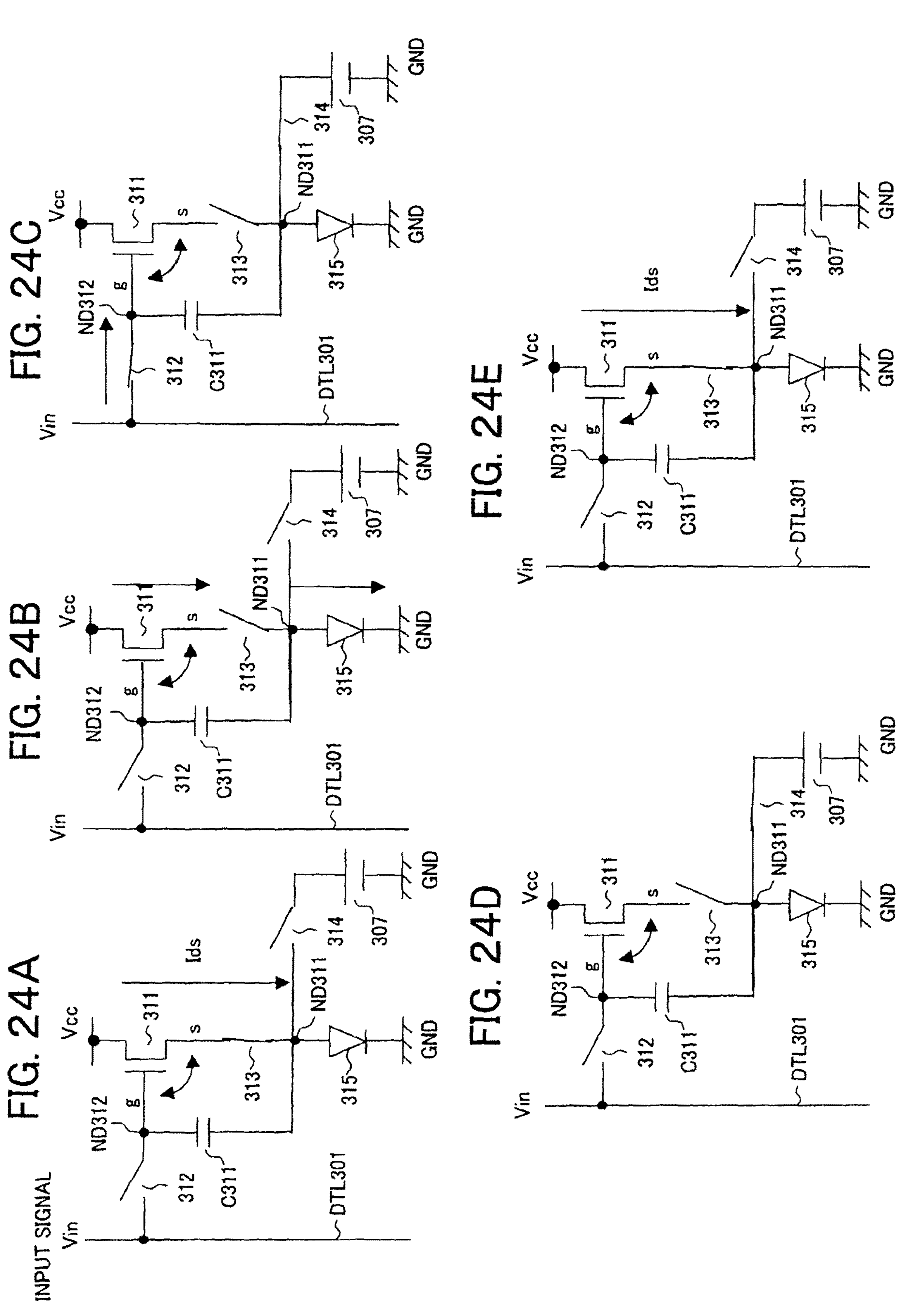
FIG. 24A is a view of an equivalent circuit for explaining the operation of the circuit of FIG. 23.
FIG. 24B is another view of an equivalent circuit for explaining the operation of the circuit of FIG. 23.
FIG. 24C is another view of an equivalent circuit for explaining the operation of the circuit of FIG. 23.
FIG. 24D is another view of an equivalent circuit for explaining the operation of the circuit of FIG. 23.
FIG. 24E is another view of an equivalent circuit for explaining the operation of the circuit of FIG. 23.

As a result, in the pixel circuit 301, as shown in FIG. 24A, the TFTs 312 and 314 are held in the off state and the TFT 313 is held in the on state.

At this time, since the TFT 311 as the drive transistor is driven in the saturated region, the current Ids flows to the TFT 311 and the EL element 315 with respect to the gate-source voltage Vgs.

Next, in the non-emitting period of the EL light emitting element 315, as shown in FIGS. 25A to 25F, the scanning signals ws[301], ws[302], . . . to the scanning lines WSL301, WSL302, . . . are held at the low level by the write scanner 304, the scanning signals ws[311], ws[312], . . . to the scanning lines WSL311, WSL312, . . . are held at the low level by the write scanner 305, and the drive signals ds[301], ds[302], . . . to the drive lines DSL301, DSL302, . . . are selectively set to the low level by the drive scanner 306.

As a result, in the pixel circuit 301, as shown in FIG. 24B, the TFT 312 and the TFT 314 are held in the off state and the TFT 313 is turned off.

At this time, the potential held at the EL light emitting element 315 falls since the source of supply disappears. The potential falls to the threshold voltage Vth of the EL light emitting element 315. However, since off current also flows to the EL light emitting element 315, if the non-emitting period continues, the potential will fall to GND.

On the other hand, the TFT 311 as the drive transistor is held in the on state since the gate potential is high. As shown in FIG. 25G, the source potential of the TFT 311 is boosted to the power source voltage Vcc. This boosting is performed in a short period. After boosting to the Vcc, no current is supplied to the TFT 311.

That is, in the pixel circuit 301 of the fourth embodiment, it is possible to operate without the supply of current in the pixel circuit during the non-emitting period and therefore possible to suppress the power consumption of the panel.

Next, in the non-emitting period of the EL light emitting element 315, as shown in FIGS. 25A to 25F, the drive signals ds[301], ds[302], . . . to the drive lines DSL301, DSL302, . . . are held at the low level by the drive scanner 306, the scanning signals ws[301], ws[302], . . . to the scanning lines WSL301, WSL302, . . . are selectively set to the high level by the write scanner 304, and the scanning signals ws[311], ws[312], . . . to the scanning lines WSL311, WSL312, . . . are selectively set to the high level by the write scanner 305.

As a result, in the pixel circuit 301, as shown in FIG. 24C, the TFT 312 and TFT 314 are turned on while the TFT 313 is held in the off state. Due to this, the input signal (Vin) propagated to the data line DTL301 by the horizontal selector 303 is written into the capacitor C311 as the pixel capacitor Cs.

When writing this signal line voltage, it is important that the TFT 314 be turned on. If there were no TFT 314, if the TFT 312 were turned on and the video signal were written in the pixel capacor Cs, coupling would enter the source potential Vs of the TFT 311. As opposed to this, if turning on the TFT 314 connecting the node ND311 to the constant voltage source 307, it will be connected to the low impedance line, so the voltage of the line would be written into the source potential side (node ND311) of the TFT 311.

At this time, if making the potential of the line Vo, the source potential (potential of the node ND311) of the TFT 311 as the drive transistor becomes Vo, so a potential equal to (Vin−Vo) is held with respect to the voltage Vin of the input signal at the pixel capacitor Cs.

After this, in the non-emitting period of the EL light emitting element 315, as shown in FIGS. 25A to 25F, the drive signals ds[301], ds[302], . . . to the drive lines DSL301, DSL302, . . . are held at the low level by the drive scanner 306, the scanning signals ws[311], ws[312], . . . to the scanning lines WSL311, WSL312, . . . are held at the high level by the write scanner 306, and the scanning signals ws[301], ws[302], . . . to the scanning lines WSL301, WSL302, . . . are selectively set to the low level by the write scanner 304.

As a result, in the pixel circuit 301, as shown in FIG. 24D, the TFT 312 is turned off and the write operation of the input signal to the capacitor C311 as the pixel capacitor ends.

At this time, the source potential of the TFT 311 (potential of node ND311) has to hold the low impedance, so the TFT 314 is left on.

After this, as shown in FIGS. 25A to 25F, while the drive signals ws[301], ws[302], . . . to the scanning lines WSL301, WSL302, . . . are held at the low level by the write scanner 304, the scanning signals ws[311], ws[312], . . . to the scanning lines WSL311, WSL312, . . . are set to the low level by the write scanner 305, then the drive signals ds[301], ds[302], . . . to the drive lines DSL301, DSL302, . . . are selectively set to the high level by the drive scanner 306.

As a result, in the pixel circuit 301, as shown in FIG. 24E, the TFT 314 is turned off and the TFT 313 becomes on.

By turning the TFT 313 on, current flows to the EL light emitting element 315 and the source potential of the TFT 311 falls. The source potential of the TFT 311 as the drive transistor fluctuates, but despite this, since there is a capacitor between the gate and source of the TFT 311, the gate-source voltage of the TFT 311 is constantly held at (Vin-Vo).

At this time, the TFT 311 as the drive transistor is driven in the saturated region, so the current Ids flowing through the TFT 311 becomes the value shown in the above equation 1. This is the gate-source voltage Vgs of the drive transistor, that is, (Vin-Vo).

That is, the current flowing through the TFT 311 can be said to be determined by the Vin.

In this way, by turning the TFT 314 on during a signal write period to make the source of the TFT 311 low in impedance, it is possible to make the source side of the TFT 311 of the pixel capacitor a fixed potential at all times, there is no need to consider deterioration of image quality due to coupling at the time of a signal line write operation, and it is possible to write the signal line voltage in a short time. Further, it is possible to increase the pixel capacity to take measures against leak characteristics.

Due to the above, even if the EL light emitting element 315 deteriorates in its I-V characteristic along with the increase in the emitting period, in the pixel circuit 301 of the fourth embodiment, the potential of the node ND311 falls while the potential between the gate and source of the TFT 311 as the drive transistor is held constant, so the current flowing through the TFT 311 does not change.

Accordingly, the current flowing through the EL light emitting element 315 also does not change. Even if the I-V characteristic of the EL light emitting element 315 deteriorates, the current corresponding to the input voltage Vin constantly flows and therefore the past problem can be solved.

In addition, since there is no transistor etc. other than the pixel capacitor Cs between the gate and source of the TFT 311, variation in the threshold value Vth will not cause any change of the gate-source voltage Vgs of the TFT 311 as the drive transistor like in the past system.

Figure 26:
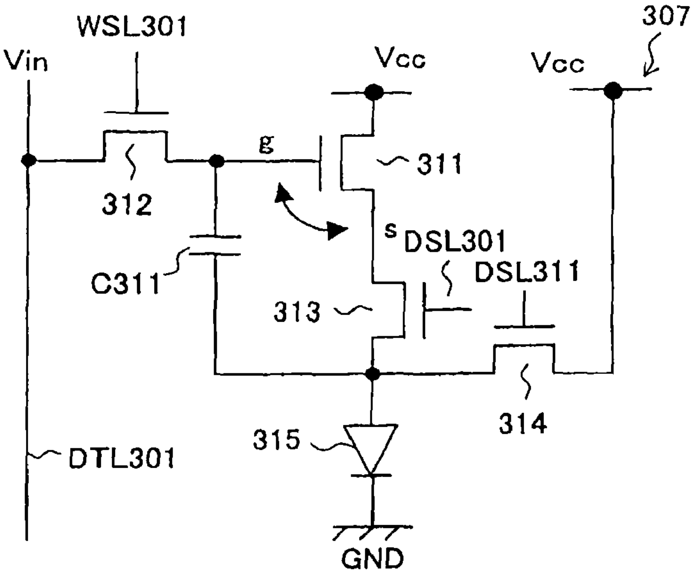
FIG. 26 is a circuit diagram of a pixel circuit having a fixed voltage line as the power source potential VCC.

Note that the potential of the line connected to the TFT 314 (constant voltage source) is not limited, but as shown in FIG. 26, if making the potential the same as Vcc, slashing the number of signal lines becomes possible. Due to this, the layout of the panel lines and pixel parts becomes easy. Further, the number of pads for panel input becomes possible.

Figure 27:
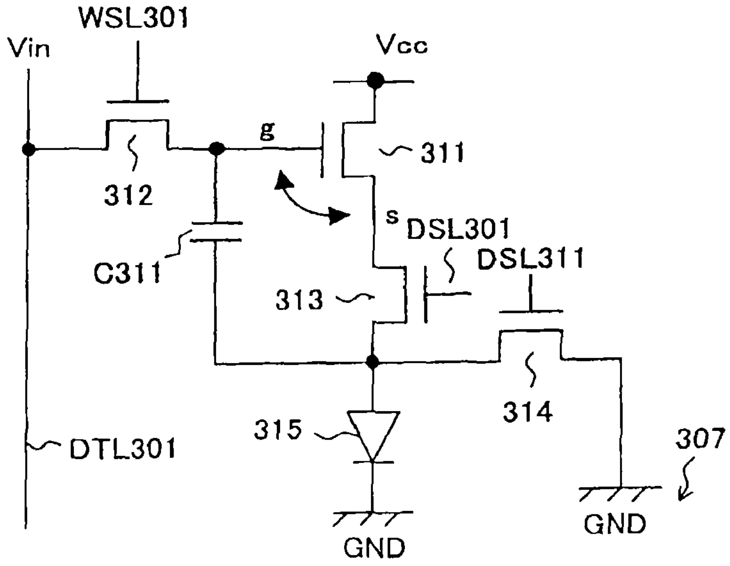
FIG. 27 is a circuit diagram of a pixel circuit having a fixed voltage line as the ground potential GND.

On the other hand, the gate-source voltage Vgs of the TFT 311 as the drive transistor, as explained above, is determined by Vin-Vo. Accordingly, for example as shown in FIG. 27, if setting Vo to a low potential such as the ground potential GND, the input signal voltage Vin can be prepared by the low potential near the GND level and boosting of the signal of the nearby ICs is not required. Further, it is possible to reduce the on voltage of the TFT 313 as the switching transistor and possible to eliminate the burden on the external ICs in design.

Further, in FIG. 23, the potential of the cathode electrode of the light emitting element 315 is made the ground potential GND, but this may be made any other potential as well. Rather, making this the negative power source enables the potential of the Vcc to be lowered and enables the potential of the input signal voltage to be lowered. Due to this, design without burdening the external IC becomes possible.

Figure 28:
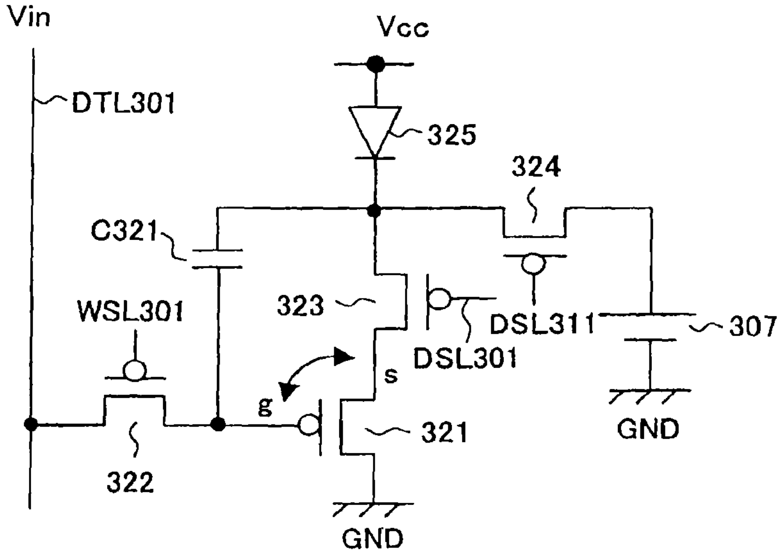
FIG. 28 is a circuit diagram of another example of the configuration of a pixel circuit according to the fourth embodiment.

Further, as shown in FIG. 28, the transistors of the pixel circuits need not be re-channel transistors. p-channel TFTs 321 to 324 may also be used to form each pixel circuit. In this case, the power source potential Vcc is connected to the anode side of the EL light emitting element 324, while the TFT 321 as the drive transistor is connected to the cathode side.

Further, the TFT 312, TFT 313, and TFT 314 as the switching transistors may also be transistors of different polarities from the TFT 311 as the drive transistor.

According to the fourth embodiment, source-follower output with no deterioration in luminance even with a change in the I-V characteristic of an EL element along with elapse becomes possible.

A source-follower circuit of n-channel transistors becomes possible, so it is possible to use an n-channel transistor as a drive element of an EL light emitting element while using current anode-cathode electrodes.

Further, it is possible to configure transistors of a pixel circuit by only n-channel transistors and possible to use the a-Si process in the fabrication of the TFTs. Due to this, a reduction of the cost of TFT boards becomes possible.

Further, according to the fourth embodiment, it is possible to write the signal line voltage in a short time even with for example a black signal and possible to obtain an image quality with a high uniformity. Simultaneously, it is possible to increase the signal line capacity and suppress leakage characteristics.

Further, it is possible to slash the number of GND lines at the TFT side and layout of the surrounding lines and layout of the pixels become easier.

Further, it is possible to slash the number of GND lines at the TFT side, possible to eliminate the overlap of the GND lines and Vcc lines at the TFT board, and possible to improve the yield.

Further, it is possible to slash the number of GND lines at the TFT side, possible to eliminate the overlap of the GND lines and Vcc lines at the TFT board so as to lay the Vcc lines at a low resistance, and possible to obtain an image quality of a high uniformity.

Still further, it is possible to make the input signal voltage near the GND and possible to lighten the load on the external drive system.

Fifth Embodiment

Figure 29:
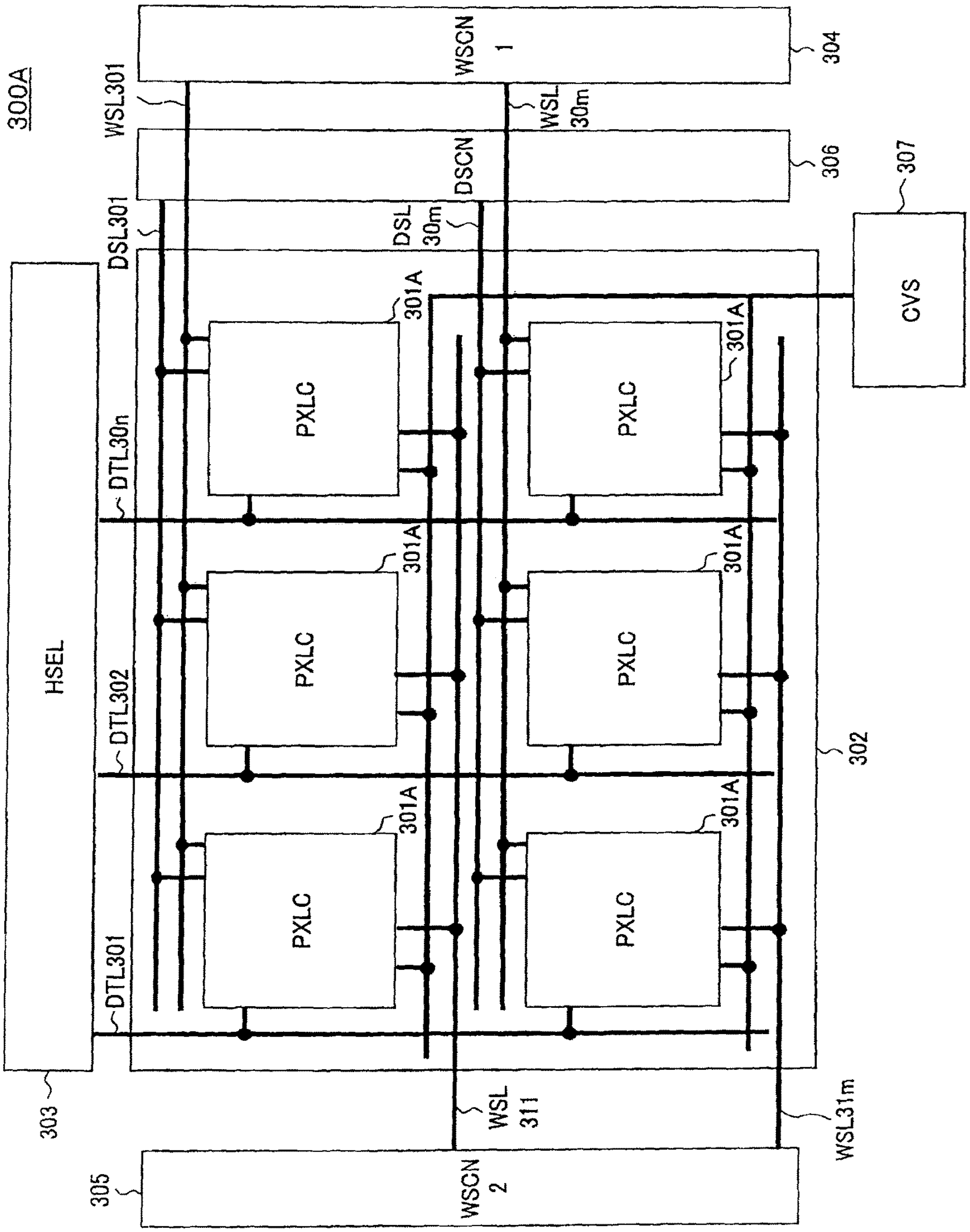
FIG. 29 is a block diagram of the configuration of an organic EL display device employing a pixel circuit according to a fifth embodiment.

FIG. 29 is a block diagram of the configuration of an organic EL display device employing a pixel circuit according to a fifth embodiment.

Figure 30:
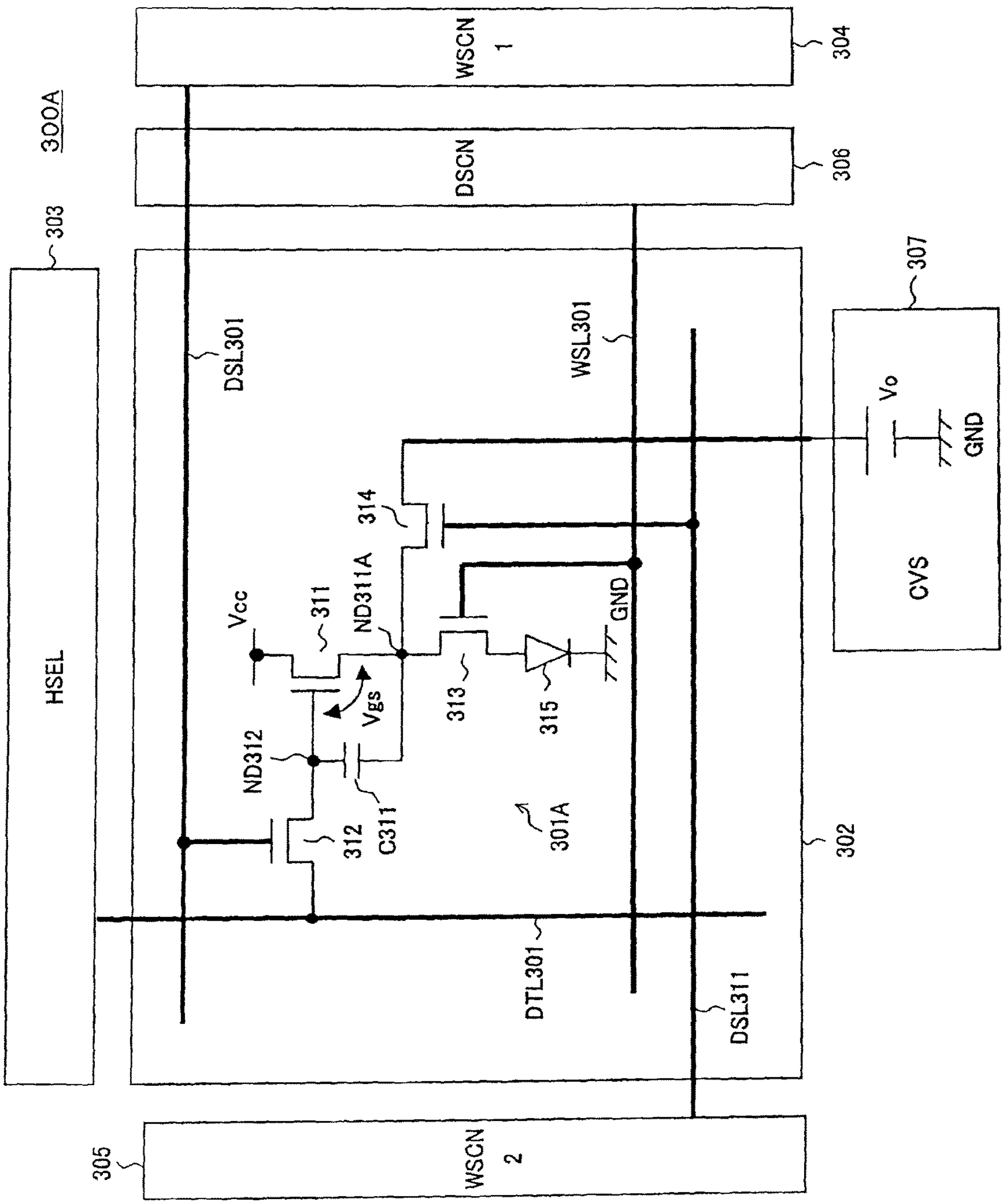
FIG. 30 is a circuit diagram of a specific configuration of a pixel circuit according to the fifth embodiment in the organic EL display device of FIG. 29.

FIG. 30 is a circuit diagram of the concrete configuration of a pixel circuit according to the fifth embodiment in the organic EL display device of FIG. 29.

The display device 300A according to the fifth embodiment differs from the display device 300 according to the fourth embodiment in the position of connection of the capacitor C311 as the pixel capacitor Cs in the pixel circuit.

Specifically, in the pixel circuit 301 according to the fourth embodiment, the capacitor C311 is connected between the gate of the TFT 311 as the drive transistor and the anode side of the EL light emitting element 315.

As opposed to this, in the pixel circuit 301A according to the fifth embodiment, the capacitor C311 is connected between the gate and source of the TFT 311 as the drive transistor. Specifically, a first electrode of the capacitor C311 is connected to the connection point (node ND311A) of the source of the TFT 311 and the TFT 313 as the switching transistor and a second electrode is connected to the node ND312.

The rest of the configuration is similar to that of the fourth embodiment explained above.

Next, the operation of the above configuration will be explained focusing on the operation of a pixel circuit with reference to FIGS. 31A to 31E and FIGS. 32A to 32H.

First, at the ordinary emitting state of the EL light emitting element 315, as shown in FIGS. 32A to 32F, the scanning signals ws[301], ws[302], . . . to the scanning lines WSL301, WSL302, . . . are selectively set to the low level by the write scanner 304, the scanning signals ws[311], ws[312], . . . to the scanning lines WSL311, WSL312, . . . are selectively set to the low level by the write scanner 305, and the drive signals ds[301], ds[302], . . . to the drive lines DSL301, DSL302, . . . are selectively set to the high level by the drive scanner 306.

Figure 31A:
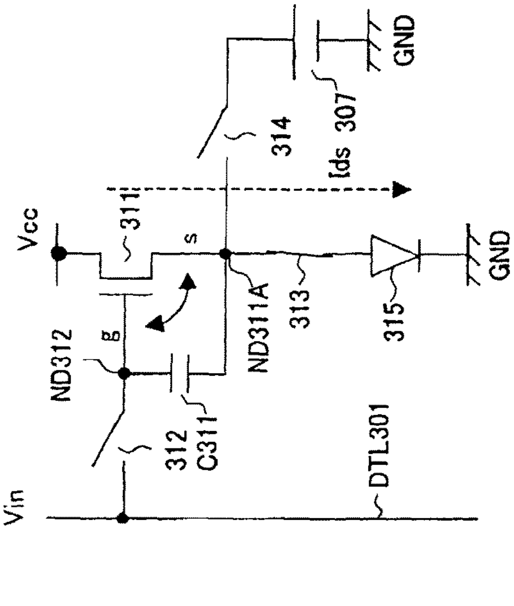
FIG. 31A is a view of an equivalent circuit for explaining the operation of the circuit of FIG. 30.

As a result, in the pixel circuit 301, as shown in FIG. 31A, the TFTs 312 and 314 are held in the off state and the TFT 313 is held in the on state.

At this time, the TFT 311 as the drive transistor is driven in the saturated region, so the current Ids flows to the TFT 311 and the EL light emitting element 315 with respect to the gate-source voltage Vgs.

Next, in the non-emitting period of the EL light emitting element 315, as shown in FIGS. 32A to 32F, the scanning signals ws[301], ws[302], . . . to the scanning lines WSL301, WSL302, . . . are selectively held at the low level by the write scanner 304, the scanning signals ws[311], ws[312], . . . to the scanning lines WSL311, WSL312, . . . are selectively held at the low level by the write scanner 305, and the drive signals ds[301], ds[302], . . . to the drive lines DSL301, DSL302, . . . are selectively set to the low level by the drive scanner 306.

Figure 31B:
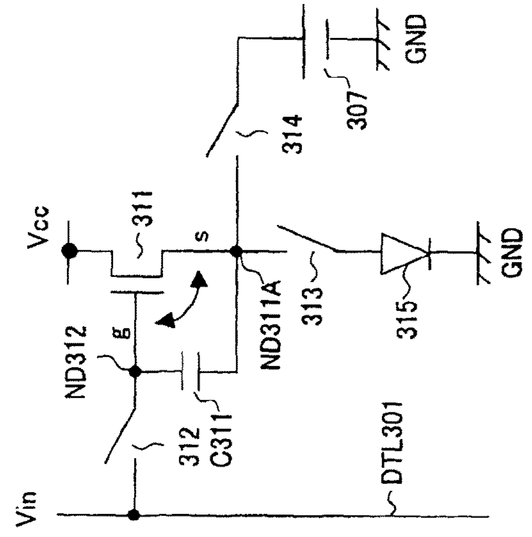
FIG. 31B is another view of an equivalent circuit for explaining the operation of the circuit of FIG. 30.

As a result, in the pixel circuit 301, as shown in FIG. 31B, the TFT 312 and TFT 314 are held in the off state and the TFT 313 is turned off.

At this time, the potential held at the EL light emitting element 315 falls since the source of supply disappears and the EL light emitting element 315 does not emit light. The potential falls to the threshold voltage Vth of the EL light emitting element 315. However, since off current also flows to the EL light emitting element 315, if the non-emitting period continues, the potential will fall to GND.

On the other hand, along with the voltage drop of the anode side of the EL light emitting element 315, the gate potential of the TFT 311 as the drive transistor falls through the capacitor C311. In parallel with this, current flows to the TFT 311 and the source potential rises.

Due to this, the TFT 311 becomes cut off and no current flows to the TFT 311.

That is, in the pixel circuit 301A of the fifth embodiment, it is possible to operate without the supply of current in the pixel circuit during the non-emitting period and therefore possible to suppress the power consumption of the panel.

Next, in the non-emitting period of the EL light emitting element 315, as shown in FIGS. 32A to 32F, while the drive signals ds[301], ds[302], . . . to the drive lines DSL301, DSL302, . . . are held at the low level by the drive scanner 306, the scanning signals ws[301], ws[302], . . . to the scanning lines WSL301, WSL302, . . . are selectively set to the high level by the write scanner 304, and the scanning signals ws[311], ws[312], . . . to the scanning lines WSL311, WSL312, . . . are selectively set to the high level by the write scanner 305.

Figure 31C:
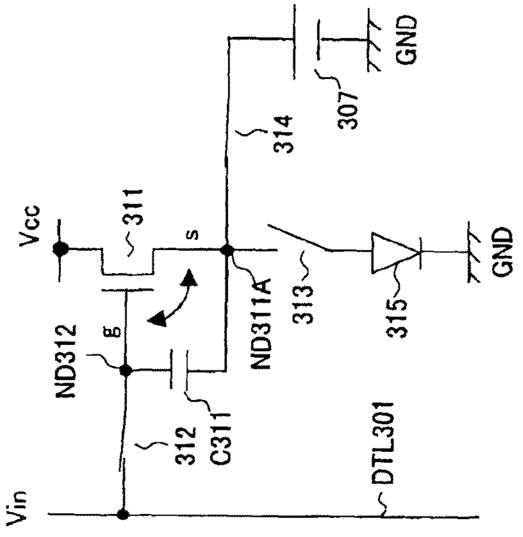
FIG. 31C is another view of an equivalent circuit for explaining the operation of the circuit of FIG. 30.

As a result, in the pixel circuit 301A, as shown in FIG. 31C, the TFT 313 is held in the off state and the TFT 312 and TFT 314 are turned on. Due to this, the input signal (Vin) propagated to the data line DTL301 by the horizontal selector 303 is written into the capacitor C311 as the pixel capacitor Cs.

When writing this signal line voltage, it is important that the TFT 314 be turned on. If there were no TFT 314, if the TFT 312 were turned on and the video signal were written in the pixel capacor Cs, coupling would enter the source potential Vs of the TFT 311. As opposed to this, if turning on the TFT 314 connecting the node ND311 to the constant voltage source 307, it will be connected to the low impedance line, so the voltage of the line would be written into the source potential of the TFT 311.

At this time, if making the potential of the line Vo, the source potential of the TFT 311 as the drive transistor becomes Vo, so a potential equal to (Vin-Vo) is held with respect to the voltage Vin of the input signal at the pixel capacitor Cs.

After this, in the non-emitting period of the EL light emitting element 315, as shown in FIGS. 32A to 32F, the drive signals ds[301], ds[302], . . . to the drive lines DSL301, DSL302, . . . are held at the low level by the drive scanner 306, the scanning signals ws[311], ws[312], . . . to the scanning lines WSL311, WSL312, . . . are held at the high level by the write scanner 305, and the scanning signals ws[301], ws[302], . . . to the scanning lines WSL301, WSL302, . . . are selectively set to the low level by the write scanner 304.

Figure 31D:
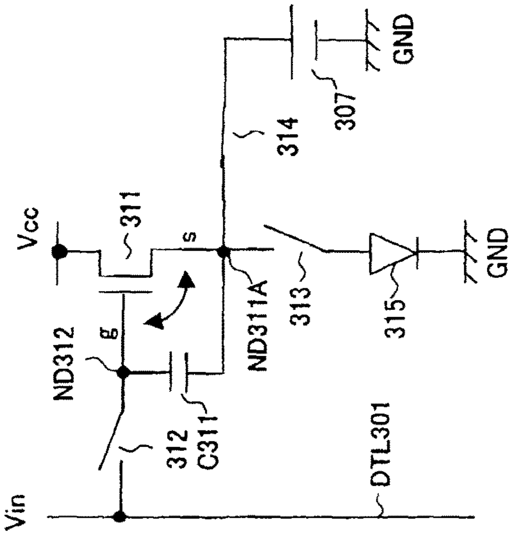
FIG. 31D is another view of an equivalent circuit for explaining the operation of the circuit of FIG. 30.

As a result, in the pixel circuit 301A, as shown in FIG. 31D, the TFT 312 is turned off and the write operation of the input signal to the capacitor C311 as the pixel capacitor ends.

At this time, the source potential of the TFT 311 has to hold the low impedance, so the TFT 314 is left on.

After this, as shown in FIGS. 32A to 32F, while the scanning signals ws[301], ws[302], . . . to the scanning lines WSL301, WSL302, . . . are held at the low level by the write scanner 304, scanning signals ws[311], ws[312], . . . to the scanning lines WSL311, WSL312, . . . are set to the low level by the write scanner 305, then the drive signals ds[301], ds[302], . . . to the drive lines DSL301, DSL302, . . . are selectively set to the high level by the drive scanner 306.

Figure 31E:
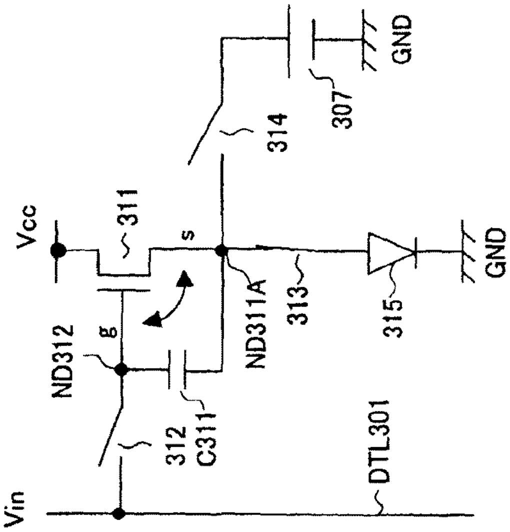
FIG. 31E is another view of an equivalent circuit for explaining the operation of the circuit of FIG. 30.
Figures 32A, 32B, 32C, 32D, 32E, 32F, 32G, 32H:
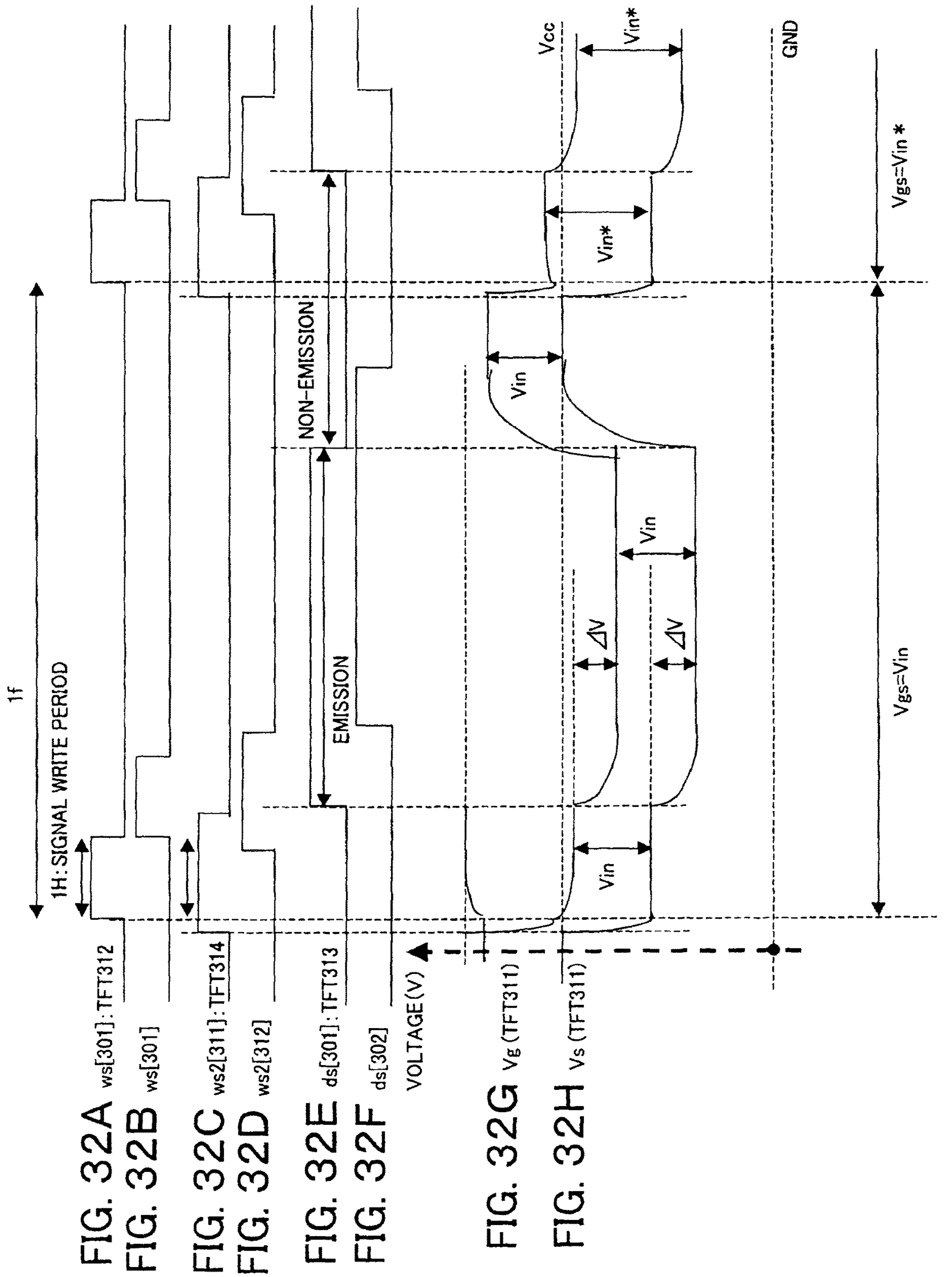
FIG. 32A is a timing chart for explaining the operation of the circuit of FIG. 30.
FIG. 32B is another timing chart for explaining the operation of the circuit of FIG. 30.
FIG. 32C is another timing chart for explaining the operation of the circuit of FIG. 30.
FIG. 32D is a timing chart for explaining the operation of the circuit of FIG. 30.
FIG. 32E is another timing chart for explaining the operation of the circuit of FIG. 30.
FIG. 32F is another timing chart for explaining the operation of the circuit of FIG. 30.
FIG. 32G is another timing chart for explaining the operation of the circuit of FIG. 30.
FIG. 32H is another timing chart for explaining the operation of the circuit of FIG. 30.

As a result, in the pixel circuit 301, as shown in FIG. 31E, the TFT 314 is turned off and the TFT 313 becomes on.

By turning the TFT 313 on, current flows to the EL light emitting element 315 and the source potential of the TFT 311 falls. The source potential of the TFT 311 as the drive transistor fluctuates, but despite this, since there is a capacity between the gate and source of the TFT 311, the gate-source voltage of the TFT 311 is constantly held at (Vin-Vcc).

Here, the TFT 313 drives in the non-saturated region, so this is viewed as a simple resistance value. Accordingly, the gate-source voltage of the TFT 311 is (Vin-Vo) minus the value of the voltage drop due to the TFT 313. That is, the current flowing through the TFT 311 can be said to be determined by the Vin.

In this way, by turning the TFT 314 on during a signal write period to make the source of the TFT 311 low in impedance, it is possible to make the source side of the TFT 311 of the pixel capacitor a fixed potential at all times, there is no need to consider deterioration of image quality due to coupling at the time of a signal line write operation, and it is possible to write the signal line voltage in a short time. Further, it is possible to increase the pixel capacity to take measures against leak characteristics.

At this time, the TFT 311 as the drive transistor constituted by is driven in the saturated region, so the current Ids flowing through the TFT 311 becomes the value shown in the above equation 1. This is the gate-source voltage Vgs of the drive transistor, that is, (Vin−Vcc).

That is, the current flowing through the TFT 311 can be said to be determined by the Vin.

Due to the above, even if the EL light emitting element 315 deteriorates in its I-V characteristic along with the increase in the emitting period, in the pixel circuit 201A of the fifth embodiment, the potential of the node ND311 falls while the potential between the gate and source of the TFT 311 as the drive transistor is held constant, so the current flowing through the TFT 311 does not change.

Accordingly, the current flowing through the EL light emitting element 315 also does not change. Even if the I-V characteristic of the EL light emitting element 315 deteriorates, the current corresponding to the input voltage Vin constantly flows and therefore the past problem can be solved.

Figure 33:
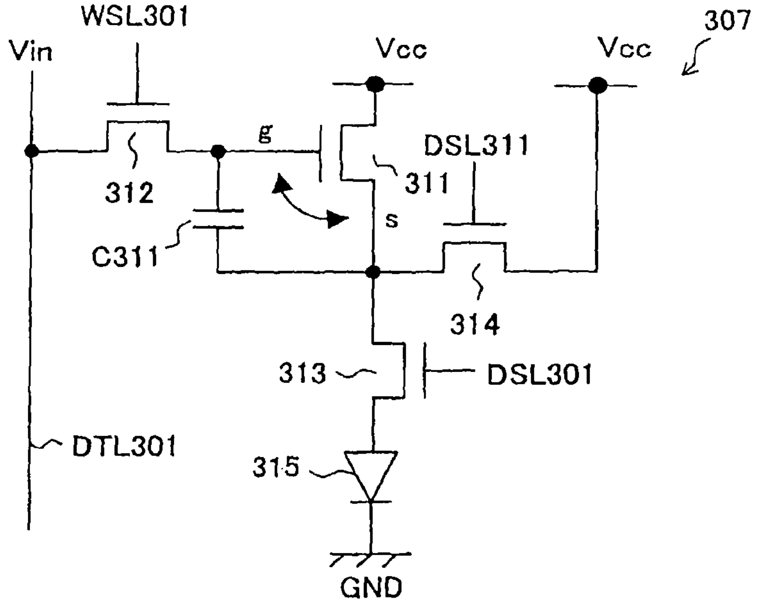
FIG. 33 is a circuit diagram of a pixel circuit having a fixed voltage line as the power source potential VCC.

Note that the potential of the line connected to the TFT 314 (constant voltage source) is not limited, but as shown in FIG. 33, if making the potential the same as Vcc, slashing the number of signal lines becomes possible. Due to this, the layout of the panel lines and pixel parts becomes easy. Further, the number of pads for panel input becomes possible.

Figure 34:
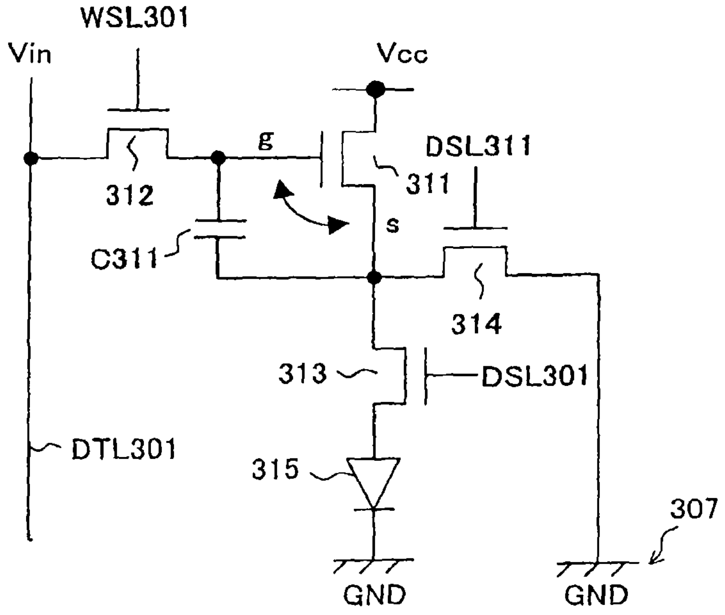
FIG. 34 is a circuit diagram of a pixel circuit having a fixed voltage line as the ground potential GND.

On the other hand, the gate-source voltage Vgs of the TFT 311 as the drive transistor, as explained above, is determined by Vin-Vo. Accordingly, for example as shown in FIG. 34, if setting Vo to a low potential such as the ground potential GND, the input signal voltage Vin can be prepared by the low potential near the GND level and boosting of the signal of the nearby ICs is not required. Further, it is possible to reduce the on voltage of the TFT 313 as the switching transistor and possible to eliminate the burden on the external ICs in design.

Further, in FIG. 30, the potential of the cathode electrode of the light emitting element 315 is made the ground potential GND, but this may be made any other potential as well. Rather, making this the negative power source enables the potential of the Vcc to be lowered and enables the potential of the input signal voltage to be lowered. Due to this, design without burdening the external IC becomes possible.

Figure 35:
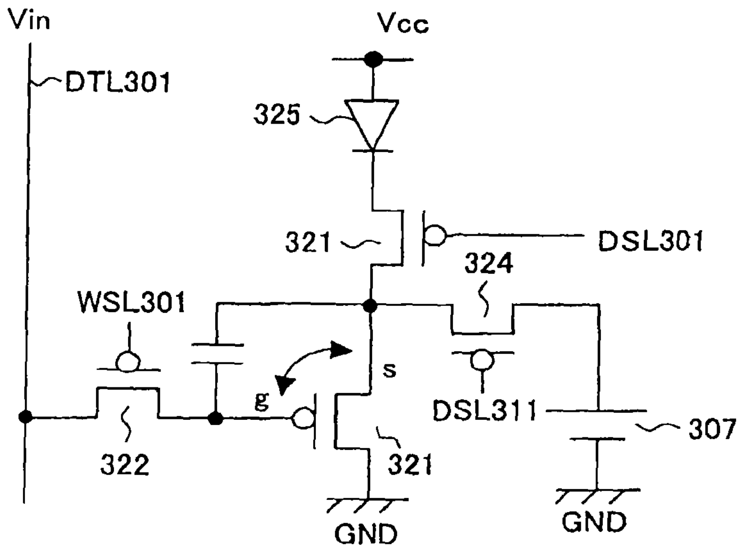
FIG. 35 is a circuit diagram of another example of the configuration of a pixel circuit according to the fifth embodiment.

Further, as shown in FIG. 35, the transistors of the pixel circuits need not be n-channel transistors. p-channel TFTs 321 to 324 may also be used to form each pixel circuit. In this case, the power source is connected to the anode side of the EL light emitting element 325, while the TFT 321 as the drive transistor is connected to the cathode side.

Further, the TFT 312, TFT 313, and TFT 314 as the switching transistors may also be transistors of different polarities from the TFT 311 as the drive transistor.

According to the fifth embodiment, source-follower output with no deterioration in luminance even with a change in the I-V characteristic of an EL element along with elapse becomes possible.

A source-follower circuit of n-channel transistors becomes possible, so it is possible to use an n-channel transistor as a drive element of an EL light emitting element while using current anode-cathode electrodes.

Further, it is possible to configure transistors of a pixel circuit by only n-channel transistors and possible to use the a-Si process in the fabrication of the TFTs. Due to this, a reduction of the cost of TFT boards becomes possible.

Further, according to the fifth embodiment, it is possible to write the signal line voltage in a short time even with for example a black signal and possible to obtain an image quality with a high uniformity. Simultaneously, it is possible to increase the signal line capacity and suppress leakage characteristics.

Further, it is possible to slash the number of GND lines at the TFT side and layout of the surrounding lines and layout of the pixels become easier.

Further, it is possible to slash the number of GND lines at the TFT side, possible to eliminate the overlap of the GND lines and Vcc lines at the TFT board, and possible to improve the yield.

Further, it is possible to slash the number of GND lines at the TFT side, possible to eliminate the overlap of the GND lines and Vcc lines at the TFT board so as to lay the Vcc lines at a low resistance, and possible to obtain an image quality of a high uniformity.

Still further, it is possible to make the input signal voltage near the GND and possible to lighten the load on the external drive system.

Sixth Embodiment

Figure 36:
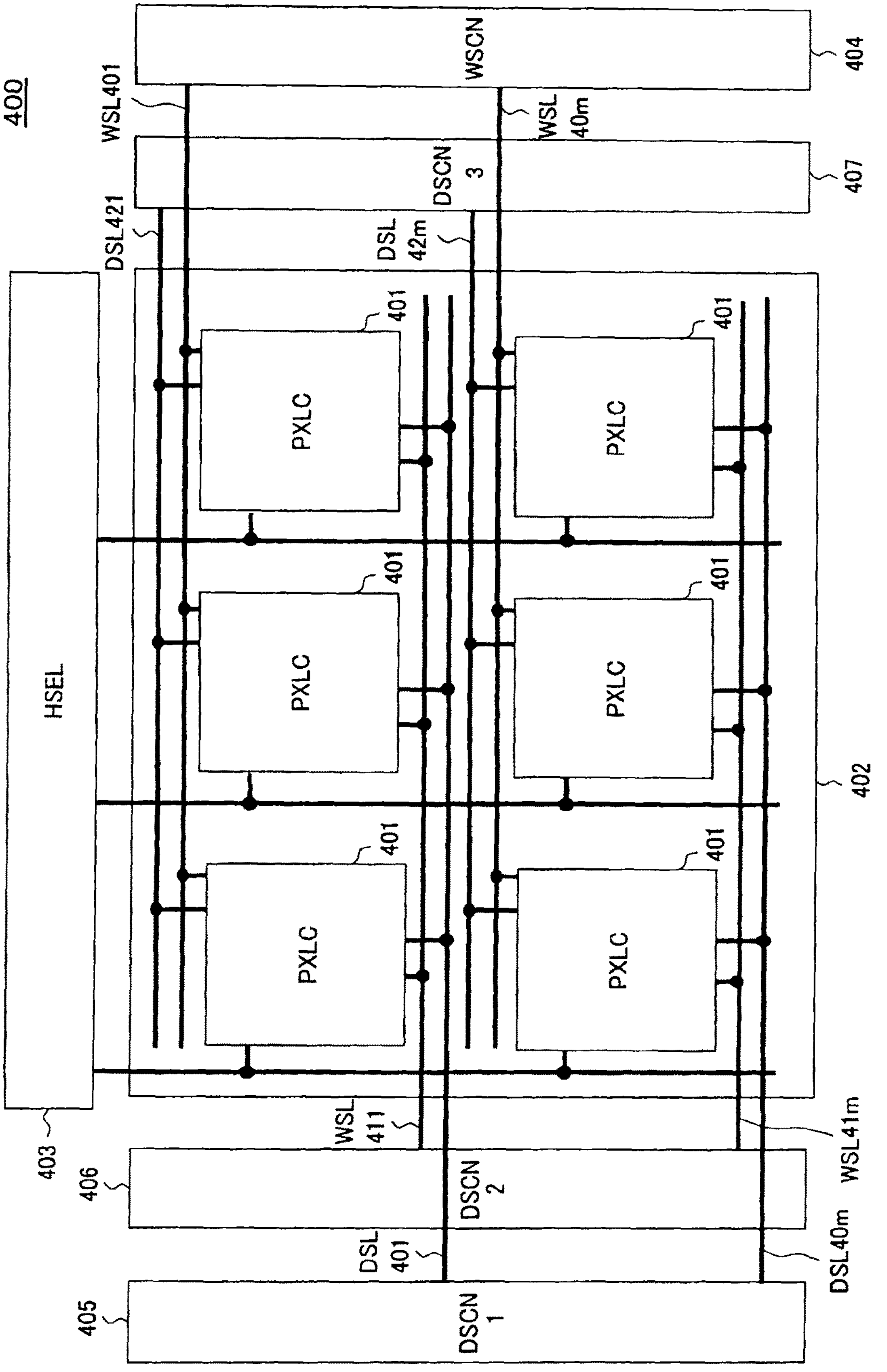
FIG. 36 is a block diagram of the configuration of an organic EL display device employing a pixel circuit according to a sixth embodiment.

FIG. 36 is a block diagram of the configuration of an organic EL display device employing pixel circuits according to a sixth embodiment.

Figure 37:
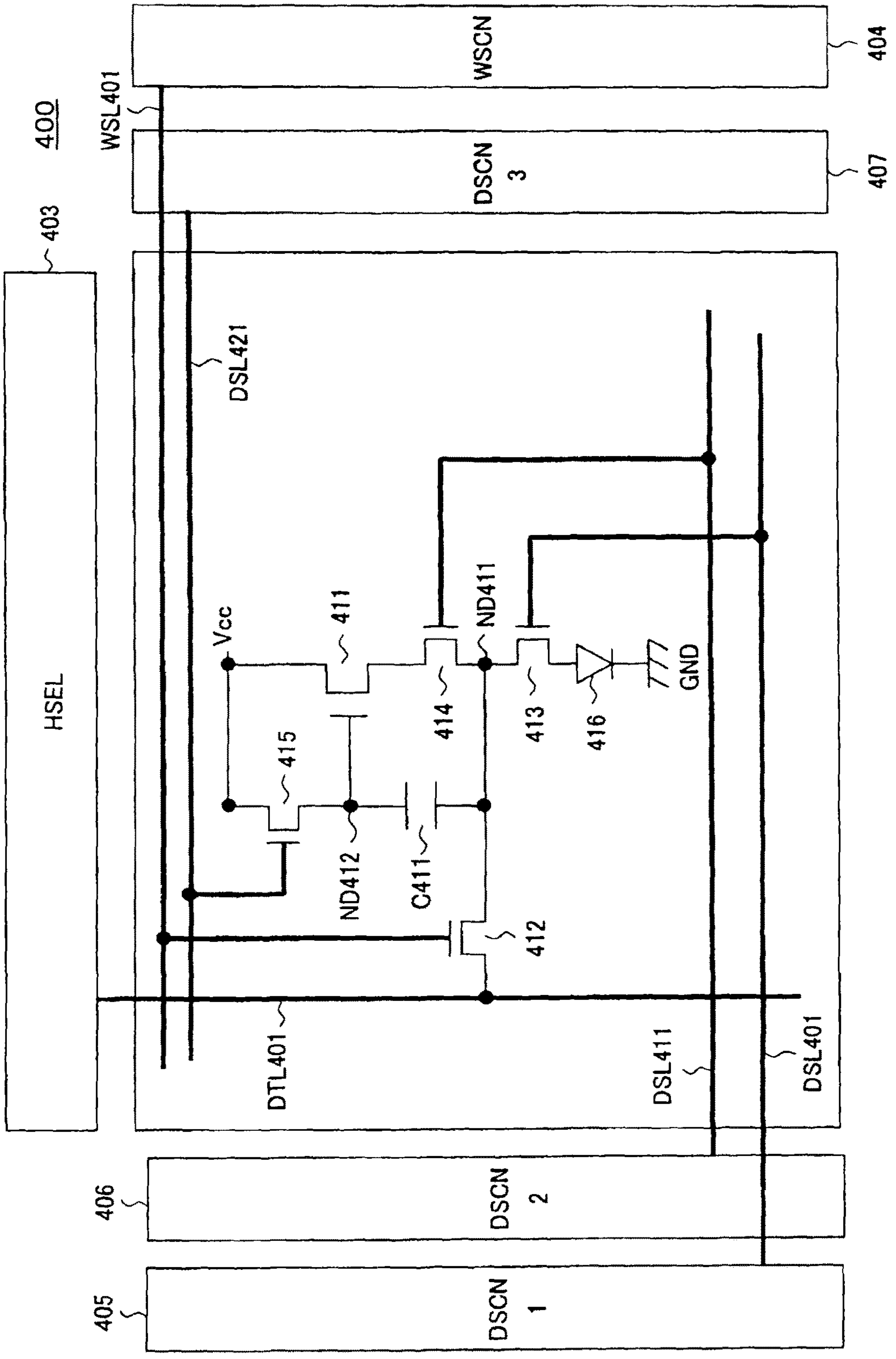
FIG. 37 is a circuit diagram of a specific configuration of a pixel circuit according to the sixth embodiment in the organic EL display device of FIG. 36.

FIG. 37 is a circuit diagram of the concrete configuration of a pixel circuit according to the sixth embodiment in the organic EL display device of FIG. 36.

This display device 400 has, as shown in FIG. 36 and FIG. 37, a pixel array portion 402 having pixel circuits (PXLC) 401 arranged in an m×n matrix, a horizontal selector (HSEL) 403, a write scanner (WSCN) 404, a first drive scanner (DSCN1) 405, a second drive scanner (DSCN2) 406, a third drive scanner (DSCN3) 407, data lines DTL401 to DTL40*n* selected by the horizontal selector 403 and supplied with a data signal in accordance with the luminance information, scanning lines WSL401 to WSL40*m* selectively driven by the write scanner 404, drive lines DSL401 to DSL40*m* selectively driven by the first drive scanner 405, drive lines DSL411 to DSL41*m* selectively driven by the second drive scanner 406, and drive lines DSL421 to DSL42*m* selectively driven by the third drive scanner 407.

Note that while the pixel circuits 401 are arranged in an m×n matrix in the pixel array portion 402, FIG. 36 shows an example wherein the pixel circuits are arranged in a 2 (=m)×3 (=n) matrix for the simplification of the drawing.

Further, in FIG. 37, the concrete configuration of one pixel circuit is shown for simplification of the drawing.

The pixel circuit 401 according to the sixth embodiment has, as shown in FIG. 37, re-channel TFT 411 to TFT 415, a capacitor C411, a light emitting element 416 made of an organic EL element (OLED), and nodes ND411 and ND412.

Further, in FIG. 37, DTL401 indicates a data line, WSL401 indicates a scanning line, and DSL401, DSL411, and DSL421 indicate drive lines.

Among these components, TFT 411 configures the field effect transistor according to the present invention, TFT 412 configures the first switch, TFT 413 configures the second switch, TFT 414 configures the third switch, TFT 415 configures the fourth switch, and the capacitor C411 configures the pixel capacitance element according to the present invention.

Further, the scanning line WSL401 corresponds to the first control line according to the present invention, the drive line DSL401 corresponds to the second control line, the drive line DSL411 corresponds to the third control line, and the drive line DSL421 corresponds to the fourth control line.

Further, the supply line (power source potential) of the power source voltage Vcc corresponds to the first reference potential, while the ground potential GND corresponds to the second reference potential.

In each pixel circuit 401, a source and a drain of the TFT 414 are connected between a source of the TFT 411 and the node ND411, a source and a drain of the TFT 413 are connected between the node ND411 and an anode of the light emitting element 416, a drain of the TFT 411 is connected to the power source potential Vcc, and a cathode of the light emitting element 416 is connected to the ground potential GND. That is, the TFT 411 as the drive transistor, the TFT 414 and TFT 413 as the switching transistors, and the light emitting element 416 are connected in series between the power source potential Vcc and the ground potential GND.

A gate of the TFT 411 is connected to the node ND412. Further, the capacitor C411 as a pixel capacitor Cs is connected between the gate and source of the TFT 411. A first electrode of the capacitor C411 is connected to the node ND411, while a second electrode is connected to the node ND412.

A gate of the TFT 413 is connected to the drive line DSL401. Further, a gate of the TFT 414 is connected to the drive line DSL411. Further, a source and a drain of the TFT 412 as the first switch are connected between the data line DTL401 and the node ND411 (connection point with first electrode of capacitor C411). Further, a gate of the TFT 412 is connected to the scanning line WSL401.

Further, a source and a drain of the TFT 415 are connected between the node ND412 and the power source potential Vcc. A gate of the TFT 415 is connected to the drive line DSL421.

In this way, the pixel circuit 401 according to the present embodiment is configured with the source of the TFT 411 as the drive transistor and the anode of the light emitting element 416 connected by the TFT 414 and TFT 413 as the switching transistors, a capacitor C411 connected between the gate of the TFT 411 and the source side node ND411, and the gate of the TFT 411 (node ND412) connected through the TFT 415 to the power source potential Vcc (fixed voltage line).

Next, the operation of the above configuration will be explained focusing on the operation of a pixel circuit with reference to FIGS. 38A to 38F, FIG. 39, and FIGS. 40A to 40H.

FIG. 40A shows a scanning signal ws[401] applied to the first row scanning line WSL401 of the pixel array, FIG. 40B shows a scanning signal ws[402] applied to the second row scanning line WSL402 of the pixel array, FIG. 40C shows drive signals ds[401] and ds[411] applied to the first row drive lines DSL401 and DSL411 of the pixel array, FIG. 40D shows drive signals ds[402] and d[412] applied to the second row drive lines DSL402 and DSL412 of the pixel array, FIG. 40E shows a drive signal ds[421] applied to the first row drive line DSL421 of the pixel array, FIG. 40F shows a drive signal ds[422] applied to the second row drive line DSL421 of the pixel array, FIG. 40G shows a gate potential Vg of the TFT 411, that is, the potential VND412 of the node ND412, and FIG. 40H shows an anode side potential of the TFT 411, that is, the potential VND411 of the node ND411.

Note that there is no problem no matter which of the TFT 413 and TFT 414 turns on or off, so as shown in FIG. 40C and FIG. 40D, the drive signals DS[401] and ds[411] and the drive signals ds[402] and ds[412] applied to the drive lines DSL401 and DSL411 and the drive lines DSL402 and DSL412 are made the same timing.

First, at the ordinary emitting state of the EL light emitting element 416, as shown in FIGS. 40A to 40F, the scanning signals ws[401], ws[402], . . . to the scanning lines WSL401, WSL402, . . . are selectively set to the low level by the write scanner 404, the drive signals ds[401], ds[402], . . . to the drive lines DSL401, DSL402, . . . are selectively set to the high level by the drive scanner 405, the drive signals ds[411], ds[412], . . . to the drive lines DSL411, DSL412, . . . are selectively set to the high level by the drive scanner 406, and the drive signals ds[421], ds[422], . . . to the drive lines DSL421, DSL422, . . . are selectively set to the low level by the drive scanner 407.

Figure 38A:
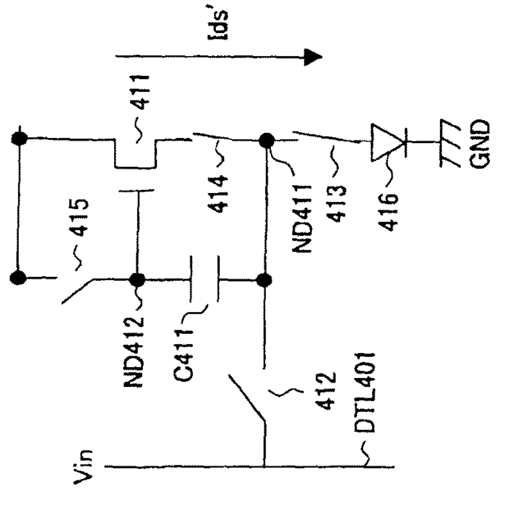
FIG. 38A is a view of an equivalent circuit for explaining the operation of the circuit of FIG. 37.

As a result, in the pixel circuit 401, as shown in FIG. 38A, the TFT 414 and TFT 413 are held in the on state and the TFT 412 and TFT 415 is held in the off state.

First, at the ordinary non-emitting state of the EL light emitting element 416, as shown in FIGS. 40A to 40F, the scanning signals ws[401], ws[402], . . . to the scanning lines WSL401, WSL402, . . . are held at the low level by the write scanner 404, the drive signals ds[421], ds[422], . . . to the drive lines DSL421, DSL422, . . . are held at the low level by the drive scanner 407, the drive signals ds[401], ds[402], . . . to the drive lines DSL401, DSL402, . . . are selectively set to the low level by the drive scanner 405, and the drive signals ds[411], ds[412], . . . to the drive lines DSL411, DSL412, . . . are selectively set to the low level by the drive scanner 406.

Figure 38B:
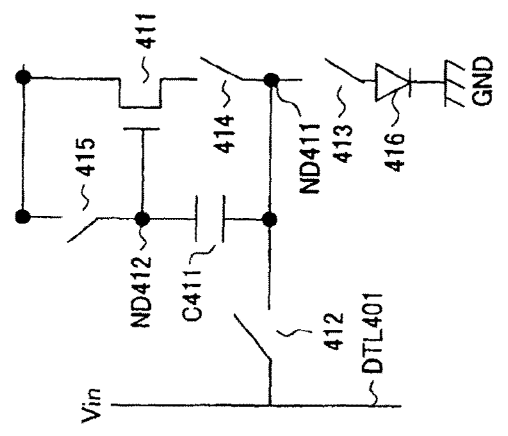
FIG. 38B is another view of an equivalent circuit for explaining the operation of the circuit of FIG. 37.

As a result, in the pixel circuit 401, as shown in FIG. 38B, the TFT 412 and TFT 415 are held in the off state and the TFTs 413 and 414 are turned off.

At this time, the potential held at the EL light emitting element 416 falls since the source of supply disappears. The EL light emitting element 416 stops emitting light. The potential falls to the threshold voltage Vth of the EL light emitting element 416. However, since off current also flows to the EL light emitting element 416, if the non-emitting period continues, the potential will fall to GND.

On the other hand, the TFT 411 as the drive transistor is held in the on state since the gate potential is high. The source potential of the TFT 411 is boosted to the power source voltage Vcc. This boosting is performed in a short period. After boosting to the Vcc, no current is supplied to the TFT 411.

That is, in the pixel circuit 401 of the sixth embodiment, it is possible to operate without the supply of current in the pixel circuit during the non-emitting period and therefore possible to suppress the power consumption of the panel.

In this state, next, as shown in FIGS. 40A to 40F, the drive signals ds[401], ds[402], . . . to the drive lines DSL401, DSL402, . . . are held at the low level by the drive scanner 405, the drive signals ds[411], ds[412], . . . to the drive lines DSL411, DSL412, . . . are held at the low level by the drive scanner 406, and in that state the drive signals ds[421], ds[422], . . . to the drive lines DSL421, DSL422, . . . are set to the high level by the drive scanner 407, then the scanning signals ws[401], ws[402], . . . to the scanning lines WSL401, WSL402, . . . are selectively set to the high level by the write scanner 404.

Figure 38C:
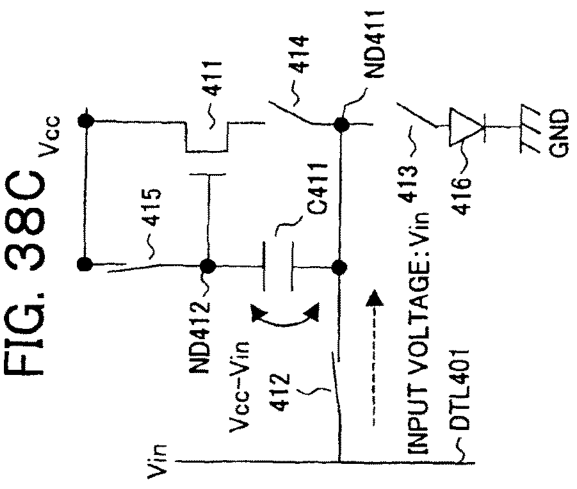
FIG. 38C is another view of an equivalent circuit for explaining the operation of the circuit of FIG. 37.

As a result, in the pixel circuit 401, as shown in FIG. 38C, the TFT 413 and TFT 414 are held in the off state and the TFT 412 and TFT 415 are turned on. Due to this, the input signal propagated to the data line DTL401 by the horizontal selector 403 is written into the capacitor C411 as the pixel capacitor Cs.

At this time, the capacitor C411 as the pixel capacitor Cs holds a potential equal to the difference (Vcc−Vin) between the power source voltage Vcc and the input voltage Vin.

After this, in the non-emitting period of the EL light emitting element 416, as shown in FIGS. 40A to 40F, the drive signals ds[401], ds[402], . . . to the drive lines DSL401, DSL402, . . . are held at the low level by the drive scanner 405, the drive signals ds[411], ds[412], . . . to the drive lines DSL411, DSL412, . . . are held at the low level by the drive scanner 406, and in that state the drive signals ds[421], ds[422], . . . to the drive lines DSL421, DSL422, . . . are selectively set to the low level by the drive scanner 407, then the scanning signals ws[401], ws[402], . . . to the scanning lines WSL401, WSL402, . . . are selectively set to the low level by the write scanner 404.

Figure 38D:
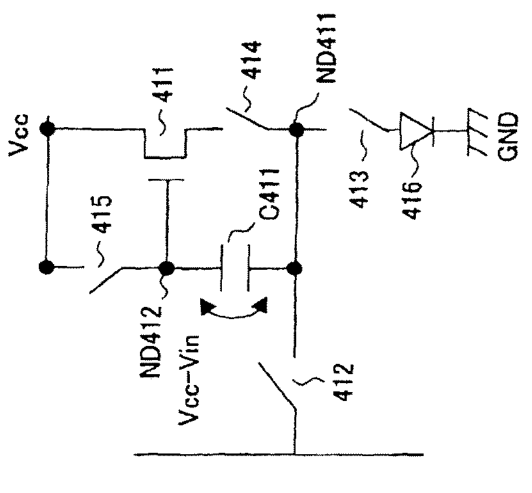
FIG. 38D is another view of an equivalent circuit for explaining the operation of the circuit of FIG. 37.

As a result, in the pixel circuit 401, as shown in FIG. 38D, the TFT 415 and TFT 412 turn off and the writing of the input signal to the capacitor C411 as the pixel capacitor ends.

At this time, the capacitor C411 holds a potential equal to the difference (Vcc−Vin) between the power source voltage Vcc and the input voltage Vin regardless of the potential of the capacitor end.

After this, as shown in FIGS. 40A to 40F, the drive signals ds[401], ds[402], . . . to the drive lines DSL401, DSL402, . . . are held at the low level by the drive scanner 405, the drive signals ds[421], ds[422], . . . to the drive lines DSL421, DSL422, . . . are held at the low level by the drive scanner 407, the scanning signals ws[401], ws[402], . . . to the scanning lines WSL401, WSL402, . . . are held at the low level by the write scanner 404, and in that state the drive signals ds[411], ds[412], . . . to the drive lines DSL411, DSL412, . . . are selectively set to the high level by the drive scanner 406.

Figure 38E:
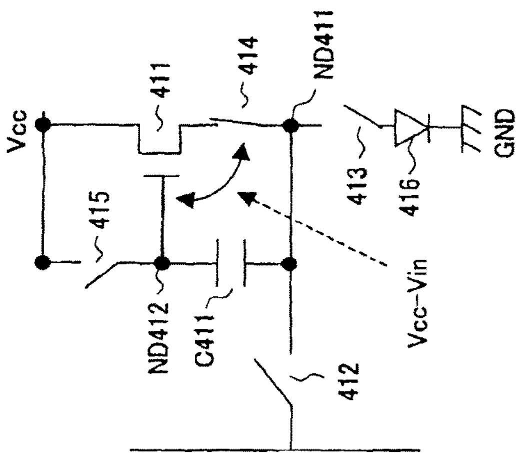
FIG. 38E is another view of an equivalent circuit for explaining the operation of the circuit of FIG. 37.

As a result, in the pixel circuit 401, as shown in FIG. 38E, the TFT414 turns on. By the TFT 414 turning on, the gate-source potential of the drive transistor TFT411 becomes the potential difference (Vcc−Vin) charged into the capacitor C411 as the pixel capacitor. Further, as shown in FIG. 40H, regardless of the value of the source potential of the TFT 411, the potential difference is held and the source potential of the drive transistor 411 rises to Vcc.

Further, as shown in FIGS. 40A to 40F, the drive signals ds[421], ds[422], . . . to the drive lines DSL421, DSL422, . . . are held at the low level by the drive scanner 407, the scanning signals ws[401], ws[402], . . . to the scanning lines WSL401, WSL402, . . . are held at the low level by the write scanner 404, the drive signals ds[411], ds[412], . . . to the drive lines DSL411, DSL412, . . . are held at the high level by the drive scanner 406, and in that state the drive signals ds[401], ds[402], . . . to the drive lines DSL401, DSL402, . . . are selectively held at the high level by the drive scanner 405.

Figure 38F:
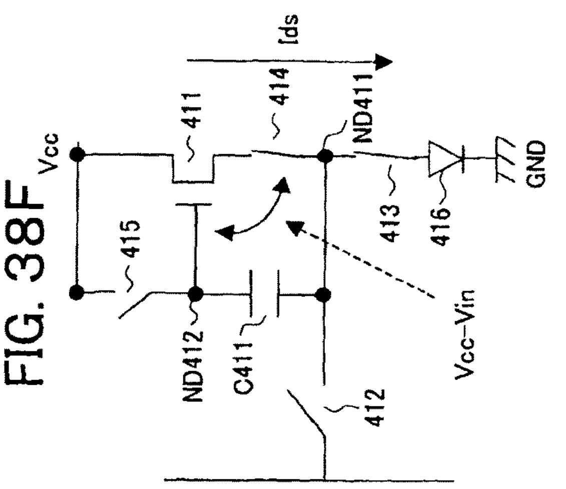
FIG. 38F is another view of an equivalent circuit for explaining the operation of the circuit of FIG. 37.

As a result, at the pixel circuit 401, as shown in FIG. 38F, TFT 413 turns on.

By turning the TFT 413 on, the source potential of the TFT 411 falls. In this way, despite the fact that the source potential of the TFT 411 as the drive transistor fluctuates, since there is a capacitance between the gate of the TFT 411 and the anode of the EL light emitting element 416, the gate-source potential of the TFT 411 is constantly held at (Vcc-Vin).

At this time, the TFT 411 as the drive transistor is driven in the saturated region, so the current value Ids flowing to the TFT 411 becomes the value shown in the above-mentioned equation 1. This is determined by the gate-source voltage Vgs of the drive transistor TFT 411.

This current also flows to the EL light emitting element 416. The EL light emitting element 416 emits light by a luminance proportional to the current value.

Figure 39:
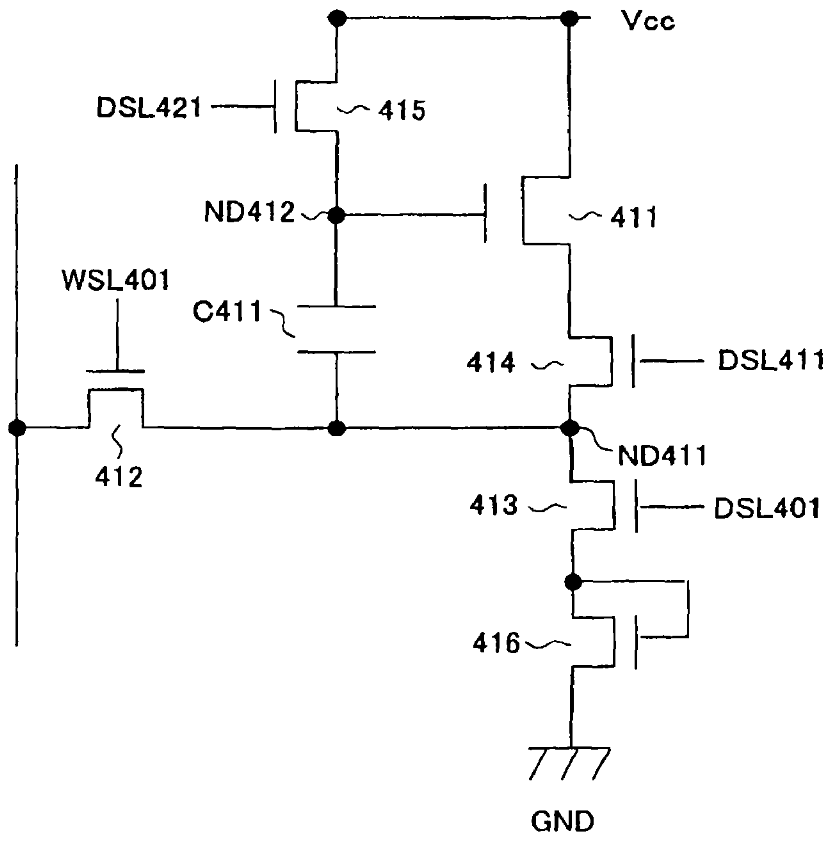
FIG. 39 is a view of an equivalent circuit for explaining the operation of the circuit of FIG. 37.

The equivalent circuit of the EL light emitting element can be described by transistors as shown in FIG. 39, so in FIG. 39, the potential of the node ND411 stops after rising to the gate potential at which the current Ids flows to the light emitting element 416. Along with the change of this potential, the potential of the node ND412 also changes. If the final potential of the node ND411 is Vx, the potential of the node ND412 is described as (Vx+Vcc−Vin) and the gate-source potential of the TFT 411 as the drive transistor is held at (Vx+Vcc).

Due to the above, even if the EL light emitting element 416 deteriorates in I-V characteristic along with the increase in the emitting time, in the pixel circuit 401 of the sixth embodiment, the potential of the node ND411 drops while the gate-source potential of the TFT 411 as the drive transistor is held constant, so the current flowing through the TFT 411 does not change.

Accordingly, the current flowing through the EL light emitting element 416 also does not change. Even if the I-V characteristic of the EL light emitting element 416 deteriorates, a current corresponding to the gate-source potential (Vcc−Vin) constantly flows. Therefore, the past problem relating to deterioration along with elapse of the EL can be solved.

Further, in the circuit of the present invention, since the fixed potential is only the power source Vcc in the pixel, no GND line which has to be laid thick is necessary. Due to this, it is possible to reduce the pixel area. Further, in the non-emitting period, the TFTs 413 and 414 are off and no current is run through the circuit. That is, by not running current through the circuit during the non-emitting period, it is possible to reduce the power consumption.

As explained above, according to the sixth embodiment, the source-follower output with no deterioration in luminance even with a change in the I-V characteristic of an EL element along with elapse becomes possible.

A source-follower circuit of n-channel transistors becomes possible, so it is possible to use an n-channel transistor as a drive element of a light emitting element while using current anode-cathode electrodes.

Further, it is possible to configure transistors of a pixel circuit by only n-channel transistors and possible to use the a-Si process in the fabrication of the TFTs. Due to this, a reduction of the cost of TFT boards becomes possible.

Further, in the present invention, it is possible to use the pixel power source for the fixed potential, so it is possible to reduce the pixel area and possible to expect higher definition of the panel.

Still further, by not running a current through the circuit while the EL light emitting element is not emitting light, the power consumption can be reduced.

As explained above, according to the present invention, source-follower output with no deterioration in luminance even with a change in the I-V characteristic of an EL element along with elapse becomes possible.

A source-follower circuit of n-channel transistors becomes possible, so it is possible to use an n-channel transistor as a drive element of a light emitting element while using current anode-cathode electrodes.

Further, it is possible to configure transistors of a pixel circuit by only n-channel transistors and possible to use the a-Si process in the fabrication of the TFTs. Due to this, a reduction of the cost of TFT boards becomes possible.

Further, it is possible to write the signal line voltage in a short time even with for example a black signal and possible to obtain an image quality with a high uniformity. Simultaneously, it is possible to increase the signal line capacity and suppress leakage characteristics.

Further, it is possible to slash the number of GND lines at the TFT side and layout of the surrounding lines and layout of the pixels become easier.

Further, it is possible to slash the number of GND lines at the TFT side, possible to eliminate the overlap of the GND lines and Vcc lines at the TFT board, and possible to improve the yield.

Further, it is possible to slash the number of GND lines at the TFT side, possible to eliminate the overlap of the GND lines and Vcc lines at the TFT board so as to lay the Vcc lines at a low resistance, and possible to obtain an image quality of a high uniformity.

Further, in the present invention, it is possible to use the pixel power source for the fixed potential, so it is possible to reduce the pixel area and possible to look forward to higher definition of the panel.

Still further, by not running a current through the circuit while the EL light emitting element is not emitting light, the power consumption can be reduced.

Still further, it is possible to make the input signal voltage near the GND and possible to lighten the load on the external drive system.

INDUSTRIAL APPLICABILITY

According to the pixel circuit, display device, and method of driving a pixel circuit of the present invention, source-follower output with no deterioration in luminance even with a change in the I-V characteristic of an EL element along with elapse becomes possible and a source-follower circuit of n-channel transistors becomes possible, so it is possible to use an re-channel transistor as a drive element of an EL element while using current anode-cathode electrodes, therefore the invention can be applied even to a large-sized and high definition active matrix type display.

LIST OF REFERENCES

100 . . . display device
101 . . . pixel circuit (PXLC)
102 . . . pixel array portion
103 . . . horizontal selector (HSEL)
104 . . . write scanner (WSCN)
105 . . . drive scanner (DSCN)
DTL101 to DTL10*n* . . . data line
WSL101 to WSL10*m* . . . scanning line
DSL101 to DSL10*m* . . . drive line
111 to 113 . . . TFT
114 . . . light emitting element
ND111, ND112 . . . node
200, 200A . . . display device
201, 201A . . . pixel circuit (PXLC)
202, 202A . . . pixel array portion
203 . . . horizontal selector (HSEL)

204 . . . write scanner (WSCN)
205 . . . drive scanner (DSCN)
DTL201 to DTL210*n* . . . data line
WSL201 to WSL20*m* . . . scanning line
DSL201 to DSL20*m* . . . drive line
211 to 213 . . . TFT
214 . . . light emitting element
ND211, ND211A, ND212 . . . node
300, 300A . . . display device
301, 301A . . . pixel circuit (PXLC)
302, 302A . . . pixel array portion
303 . . . horizontal selector (HSEL)
304, 305 . . . write scanner (WSCN)
306 . . . drive scanner (DSCN)
DTL301 to DTL30*n* . . . data line
WSL301 to WSL30*m*, WSL311 to WSL31*m* . . . scanning line
DSL301 to DSL30*m* . . . drive line
311 to 314 . . . TFT
ND311, ND311A, ND312 . . . node
400 . . . display device, 401 . . . pixel circuit (PXLC)
402 . . . pixel array portion
403 . . . horizontal selector (HSEL)
404 . . . write scanner (WSCN)
405 to 407 . . . drive scanner (DSCN)
DTL401 to DTL40*n* . . . data line
WSL401 to WSL40*m*, DSL401 to DSL40*m*, DSL411 to DSL41*m*, DSL421 to DSL42*m* . . .
drive line
411 to 415 . . . TFT
416 . . . light emitting element

The invention claimed is:

1. A display device comprising:
a plurality of pixel circuits; and
control circuitry configured to drive the plurality of pixel circuits, wherein
at least one of the plurality of pixel circuits includes
a light emitting element,
a capacitor,
a first transistor configured to supply a signal voltage supplied through a data signal line to the capacitor,
a drive transistor configured to supply driving current to the light emitting element according to the signal voltage stored in the capacitor,
a second transistor electrically connected between the drive transistor and the light emitting element, and
a third transistor electrically directly connected to a gate of the drive transistor.

2. The display device according to claim 1, wherein the third transistor is electrically directly connected to a first voltage line.

3. The display device according to claim 2, wherein the drive transistor is configured to supply the driving current from the first voltage line to the light emitting element according to the signal voltage stored in the capacitor.

4. The display device according to claim 1, further comprising a fourth transistor electrically directly connected to the drive transistor.

5. The display device according to claim 4, wherein the fourth transistor is electrically connected between the drive transistor and the second transistor.

6. The display device according to claim 4, wherein
a gate of the first transistor is electrically connected to a first control line,
a gate of the second transistor is electrically connected to a second control line,
a gate of the third transistor is electrically connected to a third control line, and
a gate of the fourth transistor is electrically connected to a fourth control line.

7. The display device according to claim 4, wherein each of the first transistor, the second transistor, the drive transistor, the third transistor, and the fourth transistor is constituted by an n-channel transistor.

8. The display device according to claim 1, wherein a cathode electrode of the light emitting element is electrically directly connected to a second voltage line.

9. The display device according to claim 1, wherein
a gate of the first transistor is electrically connected to a first control line,
a gate of the second transistor is electrically connected to a second control line, and
a gate of the third transistor is electrically connected to a third control line.

10. The display device according to claim 1, wherein each of the first transistor, the second transistor, the drive transistor, and the third transistor is constituted by an n-channel transistor.

* * * * *